United States Patent
Harada et al.

(10) Patent No.: US 6,246,442 B1
(45) Date of Patent: Jun. 12, 2001

(54) APPARATUS FOR DISPLAYING INFORMATION ARRANGED IN CELLS

(75) Inventors: Kazumi Harada, Tokyo; Fumiyuki Kato; Yutaka Tomioka, both of Yokohama, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/143,579

(22) Filed: Aug. 28, 1998

(30) Foreign Application Priority Data

Sep. 5, 1997 (JP) ................................................ 9-256200

(51) Int. Cl.$^7$ ........................................................ H04N 5/44
(52) U.S. Cl. ................................. 348/569; 345/327; 348/563; 348/906
(58) Field of Search ................................. 345/327, 342, 345/353; 348/563, 564, 569, 570, 906

(56) References Cited

U.S. PATENT DOCUMENTS

| | | | |
|---|---|---|---|
| 5,543,929 | * 8/1996 | Mankovitz et al. | 386/46 |
| 5,585,838 | * 12/1996 | Lawler et al. | 348/13 |
| 5,731,844 | * 3/1998 | Rauch et al. | 348/563 |
| 5,850,218 | * 12/1998 | LaJoie et al. | 345/327 |
| 5,940,073 | * 8/1999 | Klosterman et al. | 345/327 |
| 5,949,954 | * 9/1999 | Young et al. | 386/83 |
| 5,956,025 | * 9/1999 | Goulden et al. | 345/32 T |
| 5,969,715 | * 10/1999 | Dougherty et al. | 345/327 |
| 5,990,890 | * 11/1999 | Etheredge | 345/347 |
| 6,002,394 | * 12/1999 | Schein et al. | 345/327 |
| 6,005,565 | * 12/1999 | Legall et al. | 345/327 |
| 6,014,184 | * 1/2000 | Knee et al. | 348/731 |
| 6,025,837 | * 2/2000 | Matthews, III et al. | 345/327 |
| 6,028,599 | * 2/2000 | Yuen et al. | 345/327 |
| 6,029,193 | * 2/2000 | Yamamoto et al. | 709/217 |

FOREIGN PATENT DOCUMENTS 8-212038  8/1996 (JP) .................................. G06F/3/14

OTHER PUBLICATIONS

Ehrmantraut, M., Harder, T., Wittig, H., and Steinmetz, R., "The Personal Electronic Guide—Towards the Pre–Selection of Individual TV Programs", Proceedings of the Fifth International Conference on Information and Knowle.*

Greco, J., "Data Preparation for Interactive Electronic Program Guides", International Broadcasting Convention (Conf. Pub. No. 428), 1996, pp. 294–297.*

* cited by examiner

*Primary Examiner*—Ulka J. Chauhan
(74) *Attorney, Agent, or Firm*—Lowe Hauptman Gilman & Berner, LLP

(57) ABSTRACT

To display a broadcasting program guide table, in which a group of program guide elements of a broadcasting program guide is arranged in a cell for each broadcasting program guide, a group of particular program guide elements of one broadcasting program guide is selected in an information element selecting unit from a plurality of program guide elements of the broadcasting program guide according to a detail degree input by a user for each broadcasting program guide. The detail degree corresponds to an information volume of the group of particular program guide elements. In a display information table producing unit, a particular layout of a plurality of cells arranged along each display axis is determined according to the detail degree and particular program guide arrangement information stored in advance. The particular program guide arrangement information indicates a guide attribute along each display axis. The groups of particular program guide elements of the broadcasting program guides are set in the cells to be arranged along each display axis on the basis of the guide attribute, and an image of a broadcasting program guide table indicating the groups of particular program guide elements arranged in the cells is displayed in a display image output unit. Therefore, the user can easily compare the broadcasting program guides arranged at desired layout at the same desired detail degree.

38 Claims, 62 Drawing Sheets

FIG. 4

DATA STRUCTURE OF BROADCASTING PROGRAM GUIDE

FIELD NUMBER 1

ID

00 : DATE  ; JUNE 6, 1997

01 : DAY-OF-WEEK  ; FRIDAY

02 : START TIME  ; 14:00

03 : FINISH TIME  ; 15:54

04 : CHANNEL  ; 4

05 : TITLE  ; FRI. ROAD SHOW

06 : SUB-TITLE  ; BEST KID 3 FINAL CHALLENGE

07 : CAST  ; K.HARADA / F.KATO / U.TOMIOKA

08 : AUXILIARY INFORMATION  ; 1989, JP. / DIRECTED BY Y.MORISHITA

09 : G CODE  ; 497047

10 : GENRE CODE  ; 1

11 : COMMENTARY  ; COBRA GROUP PLANS TO CUT RELATIONSHIP BETWEEN HARADA AND KATO.

12 : REPRESENTATIVE PICTURE  ;

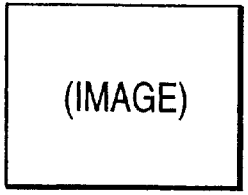

(IMAGE)

DETAIL CORRESPONDENCE TABLE

| FIRST DETAIL DEGREE | START TIME, TITLE, SUB-TITLE |
|---|---|
| SECOND DETAIL DEGREE | START TIME, TITLE, SUB-TITLE, CAST |
| THIRD DETAIL DEGREE | START TIME, TITLE, SUB-TITLE, CAST, AUXILIARY INFORMATION, COMMENTARY |
| ⋮ | ⋮ |
| FOURTH DETAIL DEGREE | START TIME, TITLE, SUB-TITLE, CAST, AUXILIARY INFORMATION, COMMENTARY, REPRESENTATIVE PICTURE, GENRE |

FIG. 7

LAYOUT CORRESPONDENCE TABLE

| DETAIL DEGREE | PROGRAM GUIDE ARRANGEMENT INFORMATION | CELL LAYOUT INFORMATION |
|---|---|---|
| FIRST | X=CHANNEL, Y=TIME | 8×6 |
| SECOND | X=CHANNEL, Y=TIME | 6×6 |
| THIRD | X=CHANNEL, Y=TIME | 3×3 |
| ⋮ | ⋮ | ⋮ |
| FIRST | X=GENRE, Y=TIME | 6×8 |
| SECOND | X=GENRE, Y=TIME | 4×6 |
| THIRED | X=GENRE, Y=TIME | 2×3 |
| ⋮ | ⋮ | ⋮ |

FIG. 8

| 14:00 FRI. ROAD SHOW "BEST KID 3 FINAL CHALLENGE" | 19:00 SATELLITE MOVIE THEATER "LEGEND OF WHITE HORSE" | 21:00 THUR. FOREIGN FILM THEATER "Mr. BASE BALL" | 22:00 CINEMA STREET 22 THUR. NOTED FILM THEATER "SILENT GREEN" | | |
|---|---|---|---|---|---|
| | | | | | |
| | | | | | |
| | | | | | |

FIG. 9

| 14:00 FRI. ROAD SHOW "BEST KID 3 FINAL CHALLENGE" CAST; K.HARADA, F.KATO, U.TOMIOKA | 19:00 SATELLITE MOVIE THEATER "LEGEND OF WHITE HORSE" CAST; L.DICAPRIO, K.TAKAKURA | 21:00 THUR. FOREIGN FILM THEATER "Mr. BASEBALL" CAST; G.BERN, E.BERKIN, C.FRITS | 22:00 CINEMA STREET 22 THUR. NOTED FILM THEATER "SILENT GREEN" CAST; T.SEREC D.HEIZBERD |
|---|---|---|---|
| | | | |
| | | | |
| | | | |

FIG. 10

| 14:00 FRI. ROAD SHOW "BEST KID 3 FINAL CHALLENGE" K.HARADA, F.KATO, U.TOMIOKA 1989, JP / DIRECTED BY Y.MORISHITA (COMMENTARY) COBRA GROUP PLANS TO CUT RELATIONSHIP BETWEEN HARADA AND KATO | 19:00 SATELLITE MOVIE THEATER "LEGEND OF WHITE HORSE" L.DICAPRIO, K.TAKAKURA 1998, USA / DIRECTED BY G.BERN (COMMENTARY) VERY YOUNG BROTHERS MEET A STRANGE WHITE HORSE |
|---|---|
|  |  |

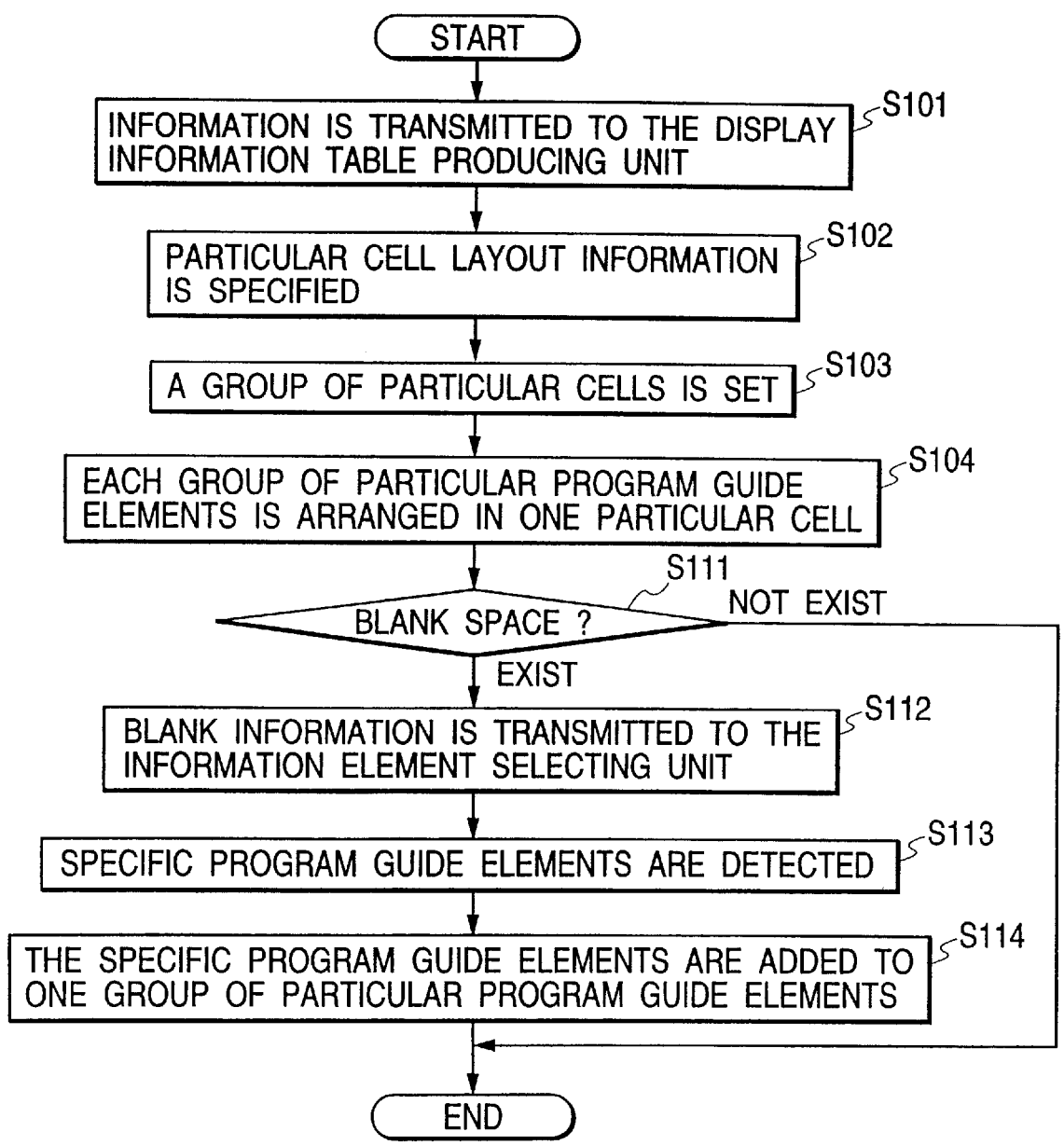

DISPLAY PRIORITY RANKING TABLE

| PRIORITY RANKING | ATTRIBUTES |
|---|---|
| 1 | START TIME |
| 2 | TITLE |
| 3 | SUB-TITLE |
| 4 | CAST |
| 5 | AUXILIARY INFORMATION |
| 6 | COMMENTARY |
| 7 | REPRESENTATIVE PICTURE |
| 8 | DATE |
| 9 | DAY-OF-WEEK |
| 10 | CHANNEL |
| 11 | G CODE |
| 12 | GENRE CODE |

FIG. 25

NEW DETAIL CORRESPONDENCE TABLE

| FIRST DETAIL DEGREE | TITLE, GENRE |
|---|---|
| SECOND DETAIL DEGREE | START TIME, TITLE, SUB-TITLE, CAST |
| THIRD DETAIL DEGREE | START TIME, TITLE, SUB-TITLE, CAST. AUXILIARY INFORMATION, COMMENTARY |
| ⋮ | ⋮ |
| FOURTH DETAIL DEGREE | START TIME, TITLE, SUB-TITLE, CAST, AUXILIARY INFORMATION, COMMENTARY, REPRESENTATIVE PICTURE, GENRE |

FIG. 26

NEW LAYOUT CORRESPONDENCE TABLE

| DETAIL DEGREE | PROGRAM GUIDE ARRANGEMENT INFORMATION | CELL LAYOUT INFORMATION |
|---|---|---|
| FIRST | X=CHANNEL, Y=TIME | 8×6 |
| SECOND | X=CHANNEL, Y=TIME | 6×6 |
| THIRD | X=CHANNEL, Y=TIME | 3×3 |
| ⋮ | ⋮ | ⋮ |
| FIRST | X=GENRE, Y=TIME | 8×8 |
| SECOND | X=GENRE, Y=TIME | 4×6 |
| THIRED | X=GENRE, Y=TIME | 2×3 |
| ⋮ | ⋮ | ⋮ |

FIG. 29

| | CH1 | CH3 | CH4 | CH6 | CH8 | CH10 |
|---|---|---|---|---|---|---|
| 7 | 00 NHK NEWS 7<br>40 MARRIAGE<br>50 TELE-MAP | | | | | |
| 8 | 00 LIFE<br>WORLD TRIP<br>45 LOCAL NEWS | | | | | |
| 9 | 00 NHK NEWS 9<br>30 CLOSE UP TODAY | | | | | |
| 10 | | | | | | |
| 11 | | | | | | |
| 12 | | | | | | |

FIG. 30

| | CH1 | CH3 | CH4 | CH6 |
|---|---|---|---|---|
| 7 | 00 NHK NEWS 7<br>▽TODAY'S NEWS<br>▽INSIDE AND<br>OUTSIDE<br>COUNTRY NEWS<br>40 MARRIAGE▽<br>FIRST MARRIAGE<br>& REMARRIAGE<br>58 TELE-MAP | | | |
| 8 | 00 LIFE WORLD<br>TRIP ▽WOODS<br>OF AUSTRALIA,<br>KING FISHER FILE<br>45 LOCAL<br>NEWS WEATHER<br>FORECAST FOR<br>TOMORROW | | | |
| 9 | 00 NHK NEWS 9<br>TODAY'S NEWS<br>▽INTERNATIONAL<br>INFORMATION<br>30 CLOSE UP<br>TODAY ▽TOPICS<br>OF THE DAY,<br>POLITICS<br>ECONOMY, CUL-<br>TURE, SPORTS | | | |
| 10 | | | | |

FIG. 31

| | CH1 | CH3 | CH4 |
|---|---|---|---|
| 7 | 00 NHK NEWS 7<br>▽TODAY'S NEWS<br>▽SPORTS ▽INSIDE AND OUTSIDE COUNTRY NEWS<br>▽WEATHER FORECAST M.MORITA<br>40 MARRIAGE ▽FIRST MARRIAGE & REMARRIAGE<br>CAST K.KURIHARA<br>58 TELE-MAP | | |
| 8 | 00 LIFE WORLD TRIP<br>▽WOODS OF AUSTRALIA LIFE OF A KING FISHER<br>NARRATOR ; H.YAGYU<br>COMMENTARY ; A KING FISHER FOSTERS HIS BABY IN WOODS OF AUSTRALIA<br>45 LOCAL NEWS, WEATHER FORECAST FOR TOMORROW | | |
| 9 | 00 NHK NEWS 9<br>TODAY'S NEWS<br>▽INTERNATIONAL INFORMATION, CASTER H.FUGISAWA<br>30 CLOSE UP TODAY<br>▽TOPICS OF THE DAY, POLITICS ECONOMY, CULTURE AND SPORTS<br>NARRATOR ; Y.KUNITANI | | |

INFORMATION STORED IN CELL LAYOUT AND GUIDE ARRANGEMENT STORING UNIT

1. EXAMPLES OF PROGRAM GUIDE ARRANGEMENT INFORMATION
    (X=CHANNEL, Y=TIME)

(X=GENRE, Y=TIME)

2. EXAMPLES OF DISPLAY AXES (X, Y)

AN ATTRIBUTE OF ONE DISPLAY AXIS IS SELECTED FROM PROGRAM GUIDE ELEMENTS (DATE, DAY-OF-WEEK, TIME, CHANNEL AND GENRE)

X=GENRE, Y=CHANNEL

X=CHANNEL

3. EXAMPLES OF DISPLAY UNIT

DATE         ;   1 DAY
    DAY-OF-WEEK  ;   1 WEEK
    TIME         ;   1 HOUR
    CHANNEL      ;   1 CHANNEL
    GENRE        ;   EACH GENRE

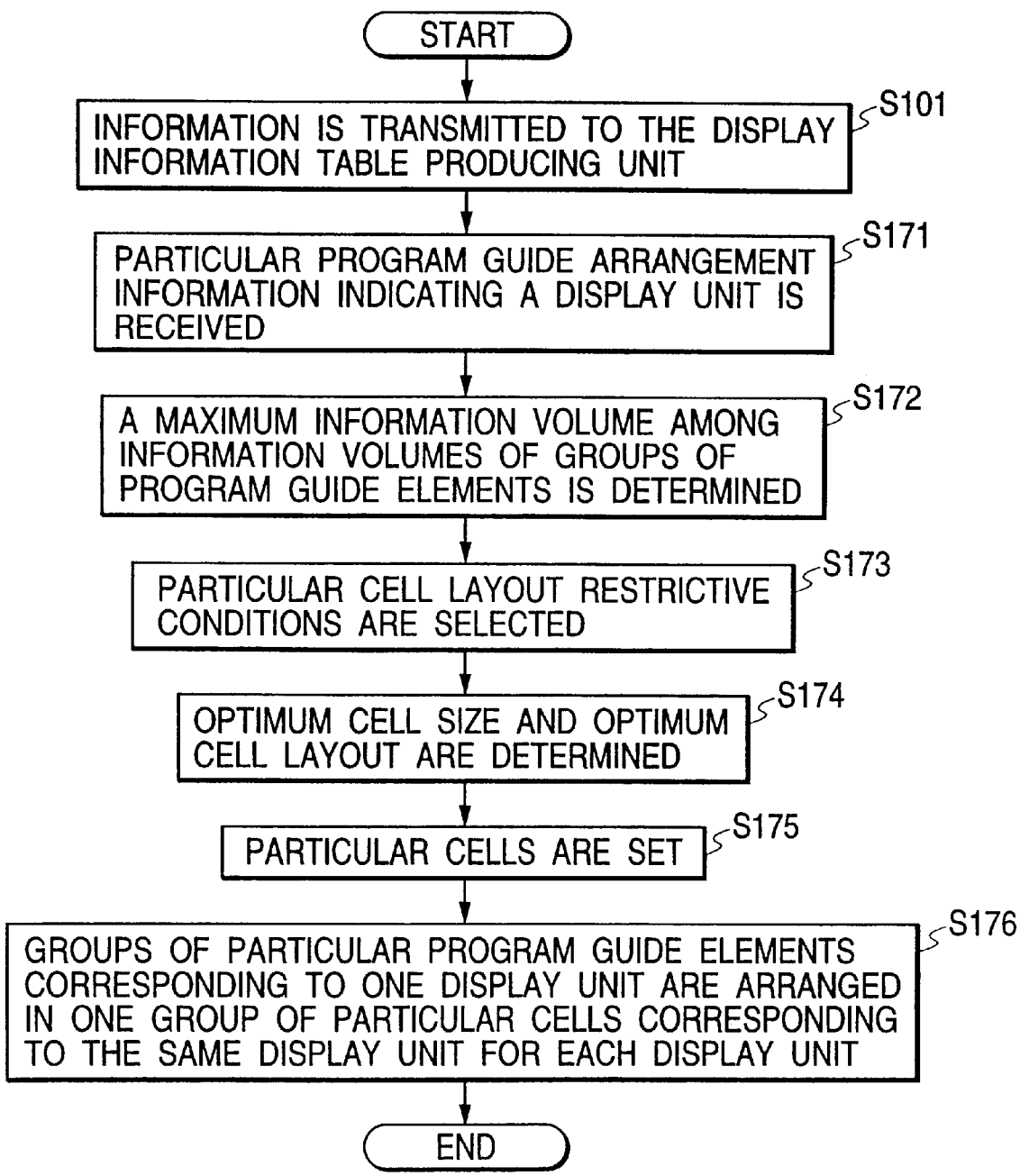

FIG. 41

| 6 | ① 00 LIVE NIGHT OF JAPAN | ③ 00 PUBLIC ENTERTAIN-MENTS | ④ 00 BOXING IN YOKOHAMA | ⑥ | ⑧ | ⑩ | ⑫ |
|---|---|---|---|---|---|---|---|
| 7 | ① | ③ | ④ | ⑥ | ⑧ | ⑩ | ⑫ |
| 8 | ① | ③ | ④ | ⑥ | ⑧ | ⑩ | ⑫ |
| 9 | ① | ③ | ④ | ⑥ | ⑧ | ⑩ | ⑫ |

FIG. 42

| | ① 00 LIVE ; NIGHT OF JAPAN ▽OUTDOOR PLAY IN KARASU TOWN ▽GEST, T.ISONO | ③ 00 PUBLIC ENTERTAINMENTS ▽KABUKI "OTOMI" ▽NARRATOR ; H.TONEGAWA | ④ 00 BOXING IN YOKOHAMA 1997 SUMMER WBC WORLD LIGHT-CLASS TITLE MATCH | ⑥ |
|---|---|---|---|---|
| 6 | ⑧ | ⑩ | ⑫ | |
| 7 | ① | ③ | ④ | ⑥ |
| | ⑧ | ⑩ | ⑫ | |

FIG. 43

| ① 00 LIVE; NIGHT OF JAPAN ▽OUTDOOR PLAY IN KARASU TOWN ▽GEST, T. ISONO ▽ COMMENTARY; KABUKI IS PLAYED IN TRADITIONAL FESTIVAL | ③ 00 PUBLIC ENTERTAINMENTS ▽KABUKI "OTOMI" ▽NARRATOR; H. TONEGAWA COMMENTARY; KUNITARO PLAYS HIS FAVORITE KYOGEN | ④ 00 BOXING IN YOKOHAMA 1977 SUMMER WBC WORLD LIGHT-CLASS TITLE MATCH COMMENTARY; Mr. SAKAMOTO CHALLENGES S. JHONSTON | ⑥ |
|---|---|---|---|
| ⑧ | ⑩ | ⑫ | |

| 14:00 FRI. ROAD SHOW "BEST KID 3 FINAL CHALLENGE" | 19:00 SATE-LLITE MOVIE THEATER "LEGEND OF WHITE HOR- | 21:00 THUR. FOREIGN FILM THEA-TER "Mr. BASEBALL" | 22:00 CINEMA STREET 22 THUR. NOTED FILM THEA-TER "SILENT | | | | |
|---|---|---|---|---|---|---|---|
| | | | | | | | |
| | | | | | | | |
| | | | | | | | |

FIG. 61

|   | ① | ③ | ④ | ⑥ |
|---|---|---|---|---|
| 6 | ⑧ | ⑩ | ⑫ |   |
|   | ① | ③ | ④ | ⑥ |
| 7 | ⑧ | ⑩ | ⑫ |   |
|   | ① | ③ | ④ | ⑥ |
| 8 | ⑧ | ⑩ | ⑫ |   |
|   | ① | ③ | ④ | ⑥ |
| 9 | ⑧ | ⑩ | ⑫ |   |

FIG. 62

|   | ① | ③ | ④ | ⑥ | ⑧ | ⑩ | ⑫ |
|---|---|---|---|---|---|---|---|
| 6 |   |   |   |   |   |   |   |
| 7 | ① | ③ | ④ | ⑥ | ⑧ | ⑩ | ⑫ |
| 8 | ① | ③ | ④ | ⑥ | ⑧ | ⑩ | ⑫ |
| 9 | ① | ③ | ④ | ⑥ | ⑧ | ⑩ | ⑫ |

APPARATUS FOR DISPLAYING INFORMATION ARRANGED IN CELLS

BACKGROUND OF THE INVENTION

1. Field of the Invention

The present invention relates to an information display apparatus in which pieces of information respectively arranged in a cell are selected at a desired detail degree and are displayed at a desired arrangement for a user to compare the pieces of information with each other at a look.

2. Description of the Related Art

2.1. Previously Proposed Art

An information display apparatus disclosed in the Published Unexamined Japanese Patent Application No. H8-212038 (1996) is known. As shown in FIG. 1, this information display apparatus 300 is composed of a processing apparatus 301, a display apparatus 302, an input unit having a mouse 303 and a keyboard 304 and a file 305. The processing apparatus 301 is composed of a window control unit 306, an application processing unit 307, a list display processing unit 308, a variable storage and reproduction processing unit 309 and a memory 310. The memory 310 is composed of an all data region 310a, a display region 310b, a list name region 310c and a variable list tables region 310d. The display apparatus 302 is composed of a setting image display plane 302a and a list data display plane 302b.

In this information display apparatus, pieces of list data often displayed as list information on the list data display plane 302b are recorded by using the all data region 310a, the display region 310b, the list name region 310c and the variable list table region 310d of the memory 310 and the variable storage and reproduction processing unit 309, and the pieces of recorded list data are used in each display operation to be displayed on the list data display plane 302b.

2.2. Problems to be Solved by the Invention

However, in cases where a user desires to change a detail degree of the list information displayed on the list data display plane 302b while maintaining a list-ability of the list information, the user desires to compare the pieces of list information with each other at a user's desired information volume on any of conditions as many as possible or the user desires to display a volume of list information arranged in a range observable at a look as large as possible while considering a good observation condition, there is a problem that the above conventional information display apparatus cannot satisfy the above user's request. Also, there is another problem that any information prepared based on a user's instruction according to read-out information cannot be displayed.

SUMMARY OF THE INVENTION

An object of the present invention is to provide, with due consideration to the drawbacks of such a conventional information display apparatus, an information display apparatus in which pieces of information are compared with each other at a user's desired volume level on condition that the pieces of information are arranged as many as possible.

The object is achieved by the provision of an information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

cell layout storing means for storing a group of cells fitting for a cell layout in an image display area for each cell layout, a size of the cell for one cell layout differing from that for another cell layout;

information arrangement storing means for storing a particular information arrangement indicating a particular attribute of each display axis to arrange pieces of information along each display axis on the basis of the particular attribute;

layout correspondence table holding means for holding a layout correspondence table in which the correspondence of one cell layout to one combination of one detail degree and one information arrangement stored in the information arrangement storing means is listed for each combination;

receiving means for receiving a particular detail degree indicating a detail degree of each piece of information to be displayed in each cell;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for receiving the particular information arrangement from the information arrangement storing means, specifying a particular cell layout corresponding to a particular combination of the particular detail degree received by the receiving means and the particular information arrangement by referring the layout correspondence table held in the layout correspondence table holding means, detecting a group of particular cells fitting for the particular cell layout from the cell layout storing means, setting the group of particular cells in the image display area at the particular cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

In the above configuration, when a user intends to display information in each of cells which are set in an image display area and are partitioned by a plurality of partition lines parallel to each display axis, a user inputs a particular detail degree to the receiving means. The particular detail degree corresponds to a user's desired volume of information arranged in each cell.

In the information element selecting means, the detail correspondence table is referred, and a group of particular information elements corresponding to the particular detail degree is specified. Because an information volume of one group of information elements corresponding to one detail degree is increased as the detail degree is heightened, the user can adjust an information volume of one group of information elements. Thereafter, one group of particular information elements of one piece of information is selected from the information elements of the piece of information stored in the information element storing means for each piece of information.

In the display information table producing means, a particular information arrangement indicating a particular attribute of each display axis is received from the information arrangement storing means, and a particular cell layout corresponding to a particular combination of the particular detail degree and the particular information arrangement is specified by referring the layout correspondence table. Thereafter, a group of particular cells fitting for the particular cell layout are detected from the cell layout storing means, and the group of particular cells is set in the image display area at the particular cell layout. Thereafter, one group of particular information elements of one piece of information is arranged in one particular cell for each piece of information, so that a display information table is produced.

Thereafter, an image of the display information table is displayed by the information displaying means.

Accordingly, because one group of particular information elements of one piece of information is arranged in each particular cell at a user's desired information volume indicated by the particular detail degree and because the pieces of information are arranged along each display axis on the basis of the particular attribute specified in the apparatus in advance, the user can compare the pieces of information with each other at a look at a user's desired volume level.

Also, because the user can adjust an information volume of one group of information elements, the user can set the pieces of information in the particular cells as many as possible.

The object is also achieved by the provision of an information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

cell layout storing means for storing a group of cells fitting for a cell layout in an image display area for each cell layout, a size of the cell for one cell layout differing from that for another cell layout;

information arrangement storing means for storing a plurality of information arrangements respectively indicating an attribute of each display axis to arrange pieces of information along each display axis on the basis of the attribute;

layout correspondence table holding means for holding a layout correspondence table in which the correspondence of one cell layout to one combination of one detail degree and one information arrangement stored in the information arrangement storing means is listed for each combination;

information arrangement displaying means for displaying the information arrangements stored in the information arrangement storing means;

receiving means for receiving a particular detail degree and selecting a particular information arrangement from the information arrangements displayed by the information arrangement displaying means, the particular information arrangement indicating a particular attribute of each display axis to arrange pieces of information along each display axis on the basis of the particular attribute;

information element selecting means for specifying a group of particular information elements corresponding to the particular detail degree received by the receiving means by referring the detail correspondence table held in the detail correspondence table holding means and selecting one group of particular information elements of one piece of information for each piece of information from the information elements of the pieces of information stored in the information element storing means;

display information table producing means for specifying a particular cell layout corresponding to a particular combination of the particular detail degree received by the receiving means and the particular information arrangement selected by the receiving means by referring the layout correspondence table held in the layout correspondence table holding means, detecting a group of particular cells fitting for the particular cell layout from the cell layout storing means, setting the group of particular cells in the image display area at the particular cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

In the above configuration, when a user inputs a particular detail degree to the receiving means, the information arrangements stored in the information arrangement storing means are displayed by the information arrangement displaying means, so that the user selects a particular information arrangement indicating a particular attribute of each display axis to arrange pieces of information along each display axis on the basis of the particular attribute.

Thereafter, one group of particular information elements of one piece of information is selected for each piece of information in the information element selecting means in the same manner.

In the display information table producing means, a particular cell layout corresponding to a particular combination of the particular detail degree and the particular information arrangement is specified by referring the layout correspondence table, a group of particular cells fitting for the particular cell layout are detected from the cell layout storing means, and the group of particular cells is set in the image display area at the particular cell layout. Thereafter, one group of particular information elements of one piece of information is arranged in one particular cell for each piece of information, so that a display information table is produced.

Thereafter, an image of the display information table is displayed by the information displaying means.

Accordingly, because one group of particular information elements of one piece of information is arranged in each particular cell at a user's desired information volume indicated by the particular detail degree and because the pieces of information are arranged along each display axis on the basis of the particular attribute selected by the user, the user can compare the pieces of information with each other at a look at a user's desired volume level.

Also, because the user can adjust an information volume of one group of information elements, the user can set the pieces of information in the particular cells as many as possible.

The object is also achieved by the provision of an information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

information arrangement storing means for storing a particular information arrangement indicating a particular attribute of each display axis to arrange pieces of information along each display axis on the basis of the particular attribute;

cell layout restrictive condition storing means for storing a plurality of cell layout restrictive conditions respectively denoting a restrictive condition for cells arranged in a cell layout;

receiving means for receiving a particular detail degree indicating a detail degree of each piece of information to be displayed in each cell;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for receiving the particular information arrangement from the information arrangement storing means, selecting one or more particular cell layout restrictive conditions from the cell layout restrictive conditions stored in the cell layout restrictive condition storing means according to the particular detail degree and the particular information arrangement, determining an optimum cell size and optimum layout of particular cells according to the groups of particular information elements of the pieces of information selected by the information element selecting means on condition that the particular cell layout restrictive conditions are satisfied, setting the particular cells in an image display area at the optimum cell size and optimum cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

In the above configuration, when a user inputs a particular detail degree to the receiving means, one group of particular information elements of one piece of information is selected for each piece of information in the information element selecting means in the same manner.

Thereafter, in the display information table producing means, the particular information arrangement stored in the information arrangement storing means is received, and one or more particular cell layout restrictive conditions are selected from the cell layout restrictive conditions stored in the cell layout restrictive condition storing means according to the particular detail degree and the particular information arrangement. Because each cell layout restrictive condition denotes a restrictive condition for a group of cells arranged in an image display area, a cell size and cell layout of the cells depend on the groups of particular information elements of the pieces of information arranged along each display axis on the basis of the particular attribute. Therefore, the particular cell layout restrictive conditions are selected according to the particular detail degree and the particular information arrangement.

Thereafter, an optimum cell size and optimum layout of particular cells planned to be arranged in the groups of particular information elements of the pieces of information are determined according to the groups of particular information elements of the pieces of information on condition that the particular cell layout restrictive conditions are satisfied, the particular cells are set in an image display area at the optimum cell size and optimum cell layout, and one group of particular information elements of one piece of information is arranged in one particular cell for each piece of information to produce a display information table, so that a display information table is produced.

Thereafter, an image of the display information table is displayed by the information displaying means.

Accordingly, because one group of particular information elements of one piece of information is arranged in each particular cell at a user's desired information volume indicated by the particular detail degree and because the pieces of information are arranged along each display axis on the basis of the particular attribute specified in the apparatus in advance, the user can compare the pieces of information with each other at a look at a user's desired volume level.

Also, because an optimum cell size and optimum layout of particular cells planned to be arranged in the groups of particular information elements of the pieces of information are determined on condition that one or more particular cell layout restrictive conditions automatically selected according to the particular detail degree and the particular information arrangement are satisfied, the user can set the pieces of information in the particular cells as many as possible at an optimum arrangement condition.

The object is also achieved by the provision of an information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

information arrangement storing means for storing a plurality of information arrangements respectively indicating an attribute of each display axis to arrange pieces of information along each display axis on the basis of the attribute;

cell layout restrictive condition storing means for storing a plurality of cell layout restrictive conditions respectively denoting a restrictive condition for cells arranged in a cell layout;

information arrangement displaying means for displaying the information arrangements stored in the information arrangement storing means;

receiving means for receiving a particular detail degree and selecting a particular information arrangement from the information arrangements displayed by the information arrangement displaying means, the particular information arrangement indicating a particular attribute of each display axis to arrange pieces of information along each display axis on the basis of the particular attribute;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for selecting one or more particular cell layout restrictive conditions from the cell layout restrictive conditions stored in the cell layout restrictive condition storing means according to the particular detail degree and the particular information arrangement received by the receiving means, determining an optimum cell size and optimum layout of particular cells according to the groups of particular information elements of the pieces of information selected by the information element selecting means on condition that the particular cell layout restrictive conditions are satisfied, setting the particular cells in an image display area at the optimum cell size and optimum cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

In the above configuration, when a user inputs a particular detail degree to the receiving means, the information arrangements stored in the information arrangement storing means are displayed by the information arrangement displaying means, so that the user selects a particular information arrangement indicating a particular attribute of each display axis to arrange pieces of information along each display axis on the basis of the particular attribute.

Thereafter, one group of particular information elements of one piece of information is selected for each piece of information in the information element selecting means in the same manner.

In the display information table producing means, one or more particular cell layout restrictive conditions are selected from the cell layout restrictive conditions stored in the cell layout restrictive condition storing means according to the particular detail degree and the particular information arrangement. Thereafter, an optimum cell size and optimum layout of particular cells planned to be arranged in the groups of particular information elements of the pieces of information are determined according to the groups of particular information elements of the pieces of information on condition that the particular cell layout restrictive conditions are satisfied, the particular cells are set in an image display area at the optimum cell size and optimum cell layout, and one group of particular information elements of one piece of information is arranged in one particular cell for each piece of information to produce a display information table, so that a display information table is produced.

Thereafter, an image of the display information table is displayed by the information displaying means.

Accordingly, because one group of particular information elements of one piece of information is arranged in each particular cell at a user's desired information volume indicated by the particular detail degree and because the pieces of information are arranged along each display axis on the basis of the particular attribute selected by the user, the user can compare the pieces of information with each other at a look at a user's desired volume level.

Also, because an optimum cell size and optimum layout of particular cells planned to be arranged in the groups of particular information elements of the pieces of information are determined on condition that one or more particular cell layout restrictive conditions automatically selected according to the particular detail degree and the particular information arrangement are satisfied, the user can set the pieces of information in the particular cells as many as possible at an optimum arrangement condition.

BRIEF DESCRIPTION OF THE DRAWINGS

The objects, features and advantages of the present invention will be apparent from the following description taken in conjunction with the accompanying drawings, in which:

FIG. 4 shows an example of a data structure of a plurality of program guide elements of one broadcasting program guide stored in an information element storing unit;

FIG. 7 shows a layout correspondence table in which the correspondence of one piece of cell layout information indicating one cell layout to one combination of a detail degree and program guide arrangement information is listed for each combination;

FIG. 8 shows a first example of a display image of a broadcasting program guide table produced in a display image producing unit;

FIG. 9 shows a second example of a display image of a broadcasting program guide table produced in the display image producing unit;

FIG. 10 shows a third example of a display image of a broadcasting program guide table produced in the display image producing unit;

FIG. 14 is a flow chart showing the procedure performed in a display information table producing unit according to the fourth embodiment;

FIG. 25 shows a new detail correspondence table produced according to the ninth embodiment of the present invention;

FIG. 26 shows a new layout correspondence table produced according to the ninth embodiment of the present invention;

FIG. 29 shows a plurality of groups of particular program guide elements of one particular group of broadcasting program guides arranged in each of particular cells which are arranged in a particular layout of 8 columns * 6 rows according to a first detail degree;

FIG. 30 shows a plurality of groups of particular program guide elements of one particular group of broadcasting program guides arranged in each of particular cells which are arranged in a particular layout of 8 columns * 6 rows according to a second detail degree;

FIG. 31 shows a plurality of groups of particular program guide elements of one particular group of broadcasting program guides arranged in each of particular cells which are arranged in a particular layout of 8 columns * 6 rows according to a third detail degree;

FIG. 33 shows one or more particular icons displayed in each particular cell as a broadcasting program guide table;

FIG. 39 shows display units of a plurality of program guide elements indicated by pieces of program guide arrangement information;

FIG. 40 is a flow chart showing the procedure performed in a display information table producing unit according to the fifteenth embodiment;

FIG. 41 shows a broadcasting program guide table produced according to the fifteenth embodiment when the first detail degree is input;

FIG. 42 shows a broadcasting program guide table produced according to the fifteenth embodiment when the second detail degree is input;

FIG. 43 shows a broadcasting program guide table produced according to the fifteenth embodiment when the third detail degree is input;

FIG. 46 shows a broadcasting program guide table produced according to the sixteenth embodiment;

FIG. 61 shows a group of particular cells set in an image display area according to the twenty-fourth embodiment when the first detail degree is input;

FIG. 62 shows a group of particular cells set in an image display area which is not obtained in the twenty-fourth embodiment even though the first detail degree is input;

FIG. 63 shows a group of particular cells set in an image display area according to the twenty-fourth embodiment when the second detail degree is input;

FIG. 64 shows a group of particular cells set in an image display area according to the twenty-fourth embodiment when the third detail degree is input;

DETAILED DESCRIPTION OF THE EMBODIMENTS

Preferred embodiments of an information display apparatus according to the present invention are described with reference to the drawings.

Figure 1:
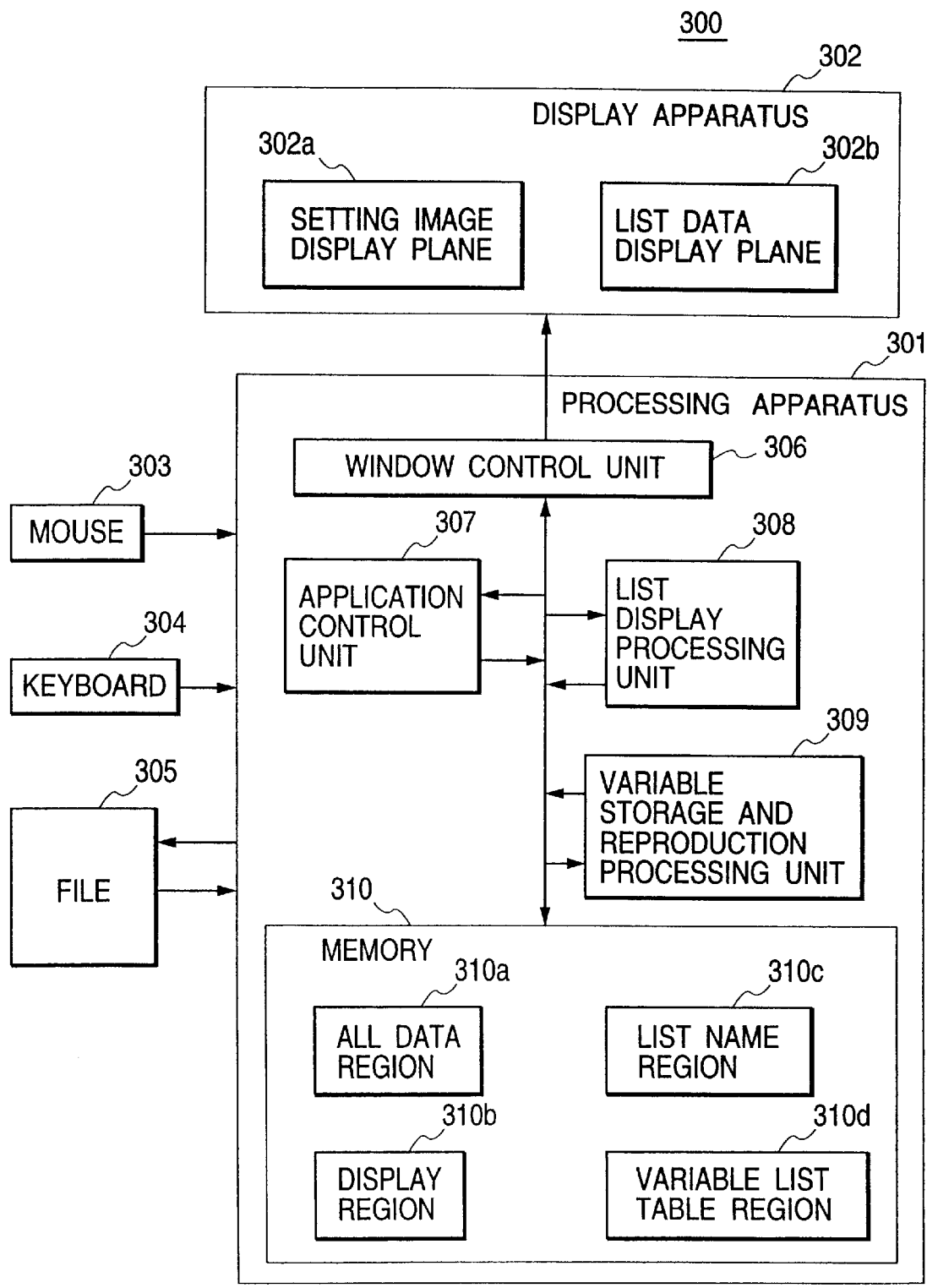
FIG. 1 is a block diagram of an information display apparatus disclosed in the Published Unexamined Japanese Patent Application No. H8-212038 (1996)
Figure 2:
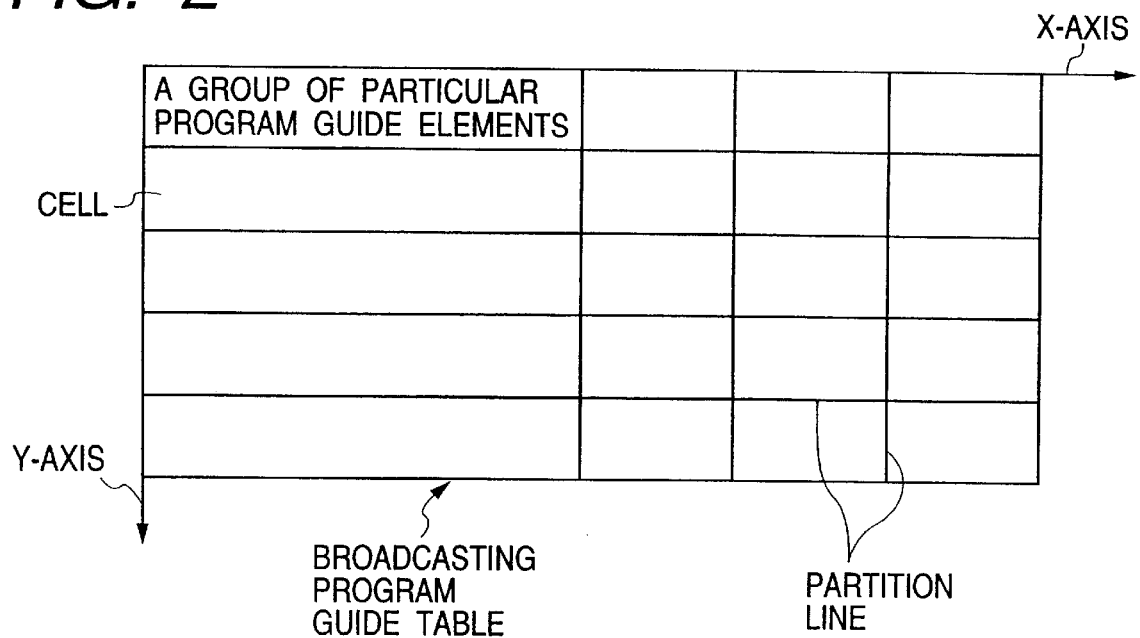
FIG. 2 shows a broadcasting program guide table in which a group of program guide elements of a broadcasting program guide is arranged in each of cells partitioned by partition lines parallel to each display axis.

In the present invention, as shown in FIG. 2, to display a broadcasting program guide table, in which a group of program guide elements of a broadcasting program guide is arranged in a cell for each broadcasting program guide, a group of particular program guide elements of one broadcasting program guide is selected from a plurality of program guide elements of the broadcasting program guide according to a particular detail degree input by a user for each broadcasting program guide, a particular layout of a plurality of cells for the broadcasting program guides is determined according to the particular detail degree and particular program guide arrangement information stored in the apparatus in advance, each group of particular program guide elements is arranged in one of the cells arranged in the particular layout, and the groups of particular program guide elements of the broadcasting program guides arranged in the cells are displayed in an image display area as a broadcasting program guide table.

Each broadcasting program guide corresponds to a television program, and the program guide elements of each broadcasting program guide are classified into pieces of attribute information such as date information, day-of-week information such as Sunday, Monday or the like, information of a broadcasting program start time, information of a broadcasting program finish time, information of a television channel, information of a broadcasting program title, information of a broadcasting program sub-title, information of the cast of the broadcasting program, auxiliary information of the broadcasting program, information of a G code of the broadcasting program, information of a genre code of the broadcasting program, information of a program commentary and information of a representative picture of the broadcasting program.

A display area of the broadcasting program guide table is partitioned into the cells by partition lines parallel to each display axis such as an X-axis and a Y-axis. Each display axis corresponds to information of a broadcasting program start time, information of a television channel, a genre code or the like. For example, in cases where the particular program guide arrangement information stored in the apparatus in advance indicates the television channel for the X-axis and the broadcasting program start time for the Y-axis, the X-axis corresponds to the television channel, the Y-axis corresponds to the broadcasting program start time information, a plurality of guides of broadcasting programs of a plurality of television channels are displayed along the X-axis, and a plurality of guides of broadcasting programs are displayed in the order of the broadcasting program start time along the Y-axis. Also, in cases where the particular program guide arrangement information indicates a type of genre such as a news genre, a sports genre, a movie genre or the like for the X-axis and the broadcasting program start time for the Y-axis, the X-axis corresponds to the type of genre, the Y-axis corresponds to the broadcasting program start time information, a plurality of guides of broadcasting programs corresponding to the same type of genre are selected according to the genre codes of the guides and are displayed along the X-axis, and a plurality of guides of broadcasting programs corresponding to the same type of genre are displayed in the order of the broadcasting program start time along the Y-axis.

(First Embodiment)

Figure 3:
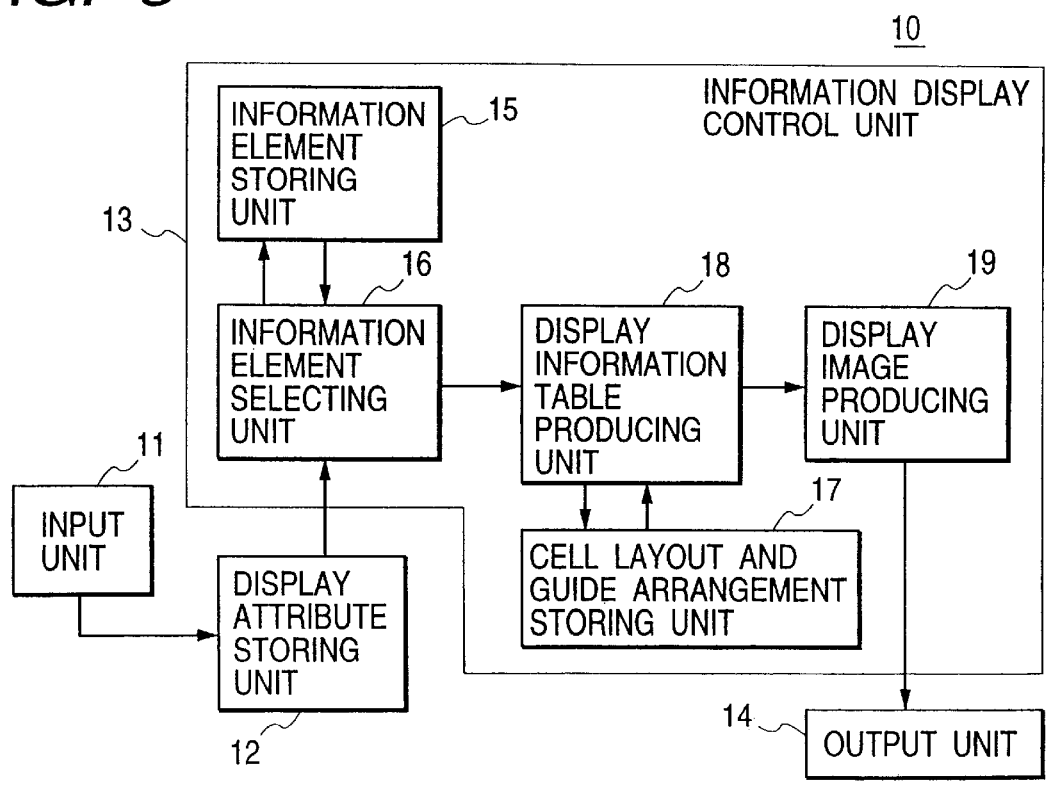
FIG. 3 is a block diagram of an information display apparatus according to a first embodiment of the present invention.

FIG. 3 is a block diagram of an information display apparatus according to a first embodiment of the present invention.

As shown in FIG. 3, an information display apparatus 10 comprises:

an input unit 11, such as a mouse or a keyboard, for receiving pieces of command data indicating an information display request and a particular detail degree;

an input display attribute storing unit 12 for storing the pieces of command data received in the input unit 11 as display attributes;

an information display control unit 13 for controlling a display condition of a broadcasting program guide table according to the display attributes stored in the display attribute storing unit 12; and an output unit 14, such as a printer or a display, for outputting an image of the broadcasting program guide table, of which a display condition is controlled by the information display control unit 13, to write or display the broadcasting program guide table in an image display area.

The information display control unit 13 comprises:

an information element storing unit 15 for storing a plurality of program guide elements of one broadcasting program guide for each broadcasting program guide, each broadcasting program guide representing a piece of information, and each program guide element of one broadcasting program guide representing an information element of one piece of information;

an information element selecting unit 16 for holding a detail correspondence table in which the correspondence of a group of program guide elements to a detail degree is listed for each of detail degrees, receiving the display attributes from the storing unit 12 and selecting a group of particular program guide elements corresponding to the particular detail degree in the detail correspondence table from the program guide elements of one broadcasting program guide stored in the information element storing unit 15 for each broadcasting program guide;

a cell layout and guide arrangement storing unit 17 for storing a group of cells fitting for a cell layout for each cell layout and storing particular program guide arrangement information, a size of the cell for one cell layout differing from that for another cell layout, the image display area being partitioned into the cells by a plurality of partition lines parallel to each display axis (for example, partition lines parallel to an X-axis and partition lines parallel to a Y-axis in a two-dimensional layout of the cells), and a piece of particular program guide arrangement information indicating a particular attribute (for example, the television channel, a type of genre or the like) of each display axis to arrange a plurality of broadcasting program guides in the broadcasting program guide table along each display axis on the basis of the particular attribute;

a display information table producing unit 18 for holding a layout correspondence table in which the correspondence of one piece of cell layout information indicating one cell layout to the combination of a detail degree and program guide arrangement information is listed for each combination type, receiving the particular detail degree from the selecting unit 16, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells of a particular cell layout indicated by the particular cell layout information from the cell layout and guide arrangement storing unit 17, setting the group of particular cells in the image display area, determining a plurality of particular broadcasting program guides planned to be arranged in the particular cells according to the particular program guide arrangement information, and arranging one group of particular program guide elements of one particular broadcasting program guide selected in the information element selecting unit 16 in one particular cell for each particular broadcasting program guide to produce a display information table indicating the groups of particular program guide elements arranged in the particular cells; and a display image producing unit 19 for producing a display image of the groups of particular program guide elements of the particular broadcasting program guides arranged in the particular cells according to the display information table produced in the display information table producing unit 18.

In the above configuration, an operation of the information display apparatus 10 is described. In this operation, a plurality of groups of program guide elements of a plurality of broadcasting program guides are displayed as many as possible to be compared with each other at the same detail degree and user's desired information volume level.

A plurality of program guide elements of each broadcasting program guide are stored in advance in the information element storing unit 15. FIG. 4 shows an example of a data structure of a plurality of program guide elements of one broadcasting program guide stored in the storing unit 15. As shown in FIG. 4, all program guide elements of each broadcasting program guide stored in the storing unit 15 are identified by a field number.

Thereafter, when a user inputs a display request and a particular detail degree to the input unit 11, the display request and the particular detail degree are temporarily stored in the storing unit 12 and are transmitted to the information element selecting unit 16. In the selecting unit 16, the correspondence of a group of program guide elements to a detail degree is stored for each detail degree as a detail correspondence table, and a group of particular program guide elements of one broadcasting program guide corresponding to the particular detail degree is specified by referring the detail correspondence table and is selected from a plurality of program guide elements of the broadcasting program guide for each broadcasting program guide.

Figures 5, 6:
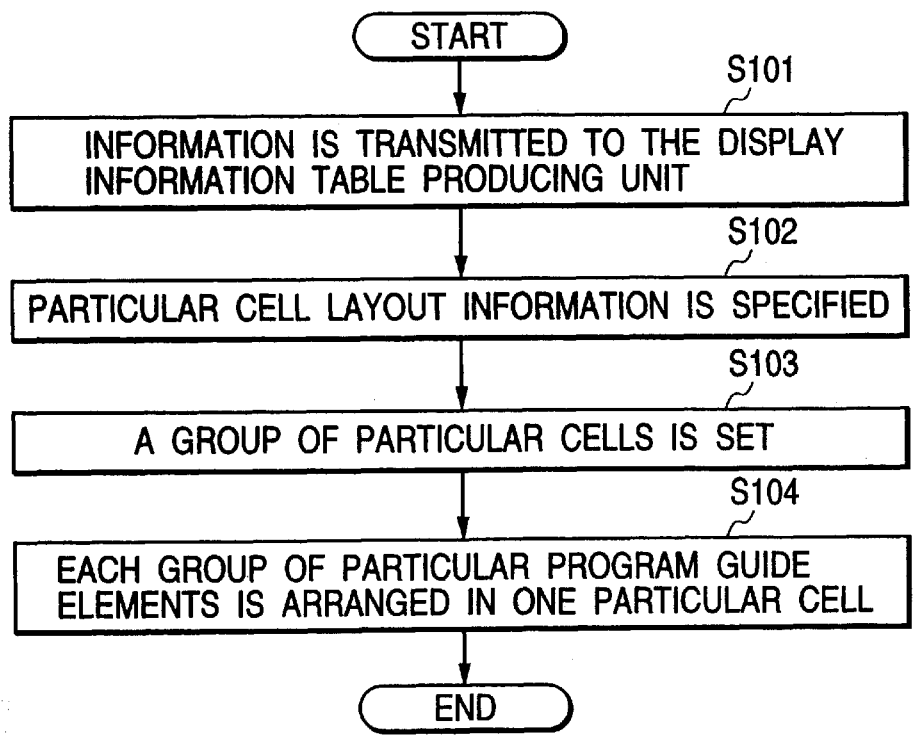
FIG. 5 shows a detail correspondence table, in which the correspondence of one group of program guide elements to one detail degree is listed for each detail degree.
FIG. 6 is a flow chart showing the procedure performed in a display information table producing unit according to the first embodiment.

FIG. 5 shows a detail correspondence table, in which the correspondence of one group of program guide elements to one detail degree is listed for each detail degree, stored in the selecting unit 16 as an example. As shown in FIG. 5, in cases where the particular detail degree indicates a first detail degree, a broadcasting start time of a television program, a title of the television program and a sub-title of the television program are selected from the program guide elements stored in the information element storing unit 15 as a group of particular program guide elements for each broadcasting program guide.

Thereafter, a broadcasting program guide table in which the groups of particular program guide elements are arranged in a plurality of particular cells is produced in the table producing unit 18 according to the particular detail degree and the particular program guide arrangement information stored in the storing unit 17.

FIG. 6 is a flow chart showing the procedure performed in the table producing unit 18.

As shown in FIG. 6, the particular detail degree and the groups of particular program guide elements of the broadcasting program guides are transmitted from the selecting unit 16 to the table producing unit 18, and the particular program guide arrangement information stored in the storing unit 17 is transmitted to the table producing unit 18 (step S101), and particular cell layout information indicating a particular cell layout is specified according to a particular combination of the particular detail degree and the particular program guide arrangement information by referring a layout correspondence table (step S102).

FIG. 7 shows an example of a layout correspondence table in which the correspondence of one piece of cell layout information indicating one cell layout to one combination of a detail degree and program guide arrangement information is listed for each combination. For example, in cases where the particular detail degree indicates the first detail degree and the particular program guide arrangement information indicates the television channel for the X-axis and the program broadcasting start time for the Y-axis, both the X-axis corresponding to the television channel and the Y-axis corresponding to the time are specified, and particular cell layout information indicating a particular cell layout of 8*8 cells in 8 columns and 8 rows, are specified by referring the layout correspondence table. Also, in cases where the particular detail degree indicates the first detail degree and the particular program guide arrangement information indicates a type of genre for the X-axis and the program broadcasting start time for the Y-axis, both the X-axis corresponding to the type of genre and the Y-axis corresponding to the time are specified, and particular cell layout information indicating a particular cell layout of 6*8 cells in 6 columns and 8 rows, are specified by referring the layout correspondence table.

Thereafter, a group of particular cells of a particular cell layout indicated by the particular cell layout information is detected from the cell layout and guide arrangement storing unit 17, and the group of particular cells is set in the image display area at the particular cell layout (step S103). Thereafter, a plurality of particular broadcasting program guides planned to be arranged in the particular cells are determined according to the particular program guide arrangement information, and one group of particular program guide elements of one particular broadcasting program guide selected in the information element selecting unit 16 is arranged in one particular cell for each particular broadcasting program guide to produce a broadcasting program guide table (step S104).

Thereafter, a display image of the groups of particular program guide elements of the particular broadcasting program guides arranged in the particular cells is produced in the display image producing unit 19 according to the broadcasting program guide table .

A first example of a display image of a broadcasting program guide table produced in the display image producing unit 19 is shown in FIG. 8 on condition that the first detail degree and the particular program guide arrangement information indicating a movie genre for the X-axis and the program broadcasting start time for the Y-axis are input by the user, a second example of a display image of a broadcasting program guide table produced in the display image producing unit 19 is shown in FIG. 9 on condition that the second detail degree and the particular program guide arrangement information indicating a movie genre for the X-axis and the program broadcasting start time for the Y-axis are input by the user, and a third example of a display image of a broadcasting program guide table produced in the display image producing unit 19 is shown in FIG. 10 on condition that the third detail degree and the particular program guide arrangement information indicating a movie genre for the X-axis and the program broadcasting start time for the Y-axis are input by the user.

Accordingly, in cases where the user desires to show a plurality of broadcasting program guides as many as possible for the purpose of determining a specific broadcasting program, because the user can specify a particular detail degree, a group of particular broadcasting program guides are specified according the particular program guide arrangement information stored in the apparatus in advance, a group of particular program guide elements corresponding to the particular detail degree is selected from a plurality of program guide elements of each particular broadcasting program guide, and the groups of particular program guide elements of the particular broadcasting program guides can be displayed. Therefore, pieces of guide information of the particular broadcasting program guides can be compared with each other at the same detail degree. Also, because all program guide elements are not displayed but a group of particular program guide elements is displayed for each particular broadcasting program guide, the number of broadcasting program guides observable at a look can be increased as many as possible.

Also, because the particular program guide arrangement information indicating a particular attribute (for example, the television channel, a type of genre or the like) of each display axis to arrange a plurality of particular broadcasting program guides along each display axis on the basis of the particular attribute is stored in the apparatus in advance, a layout of a plurality of cells in a broadcasting program guide table can be automatically determined according to the particular detail degree and the particular program guide arrangement information, and a plurality of broadcasting program guides can be regularly arranged along each display axis on the basis of the particular attribute indicated by the particular program guide arrangement information. Therefore, in cases where the user desires the display of a plurality of broadcasting program guides arranged along the channel axis (or the X-axis) and the time axis (or the Y-axis) in the same manner as those in a general television program guide table, the user can check a plurality of particular broadcasting program guides of a plurality of television channels arranged along the X-axis in the order of the broadcasting time at a look. Also, the user can check a plurality of particular broadcasting program guides belonging to the same type of genre arranged along the X-axis in the order of the broadcasting time at a look. That is, the user can compare a plurality of particular broadcasting program guides classified according to the user's request with each other.

Also, the number of particular broadcasting program guides arranged in the broadcasting program guide table is not only changed, but also a volume of information arranged in each cell is changed according to the particular detail degree. Therefore, the volume of information arranged in the broadcasting program guide table can be easily adjusted while considering the volume of information observable at a look.

Also, because all program guide elements of each particular broadcasting program guide are not displayed, the user can easily check each particular broadcasting program guide. Also, in cases where the user can desire to compare a plurality of groups of all program guide elements of a plurality of particular broadcasting program guides with each other, the user can show the groups of all program guide elements by specifying the particular detail degree to the highest detail degree to reduce the number of particular broadcasting program guides shown in the broadcasting program guide table. That is, the user can compare a plurality of particular broadcasting program guides at a desired detail degree.

(Second Embodiment)

In this embodiment, pieces of program guide arrangement information are set in a cell layout and guide arrangement storing unit in advance and are displayed for a user to select particular program guide arrangement information from the pieces of program guide arrangement information.

Figure 11:
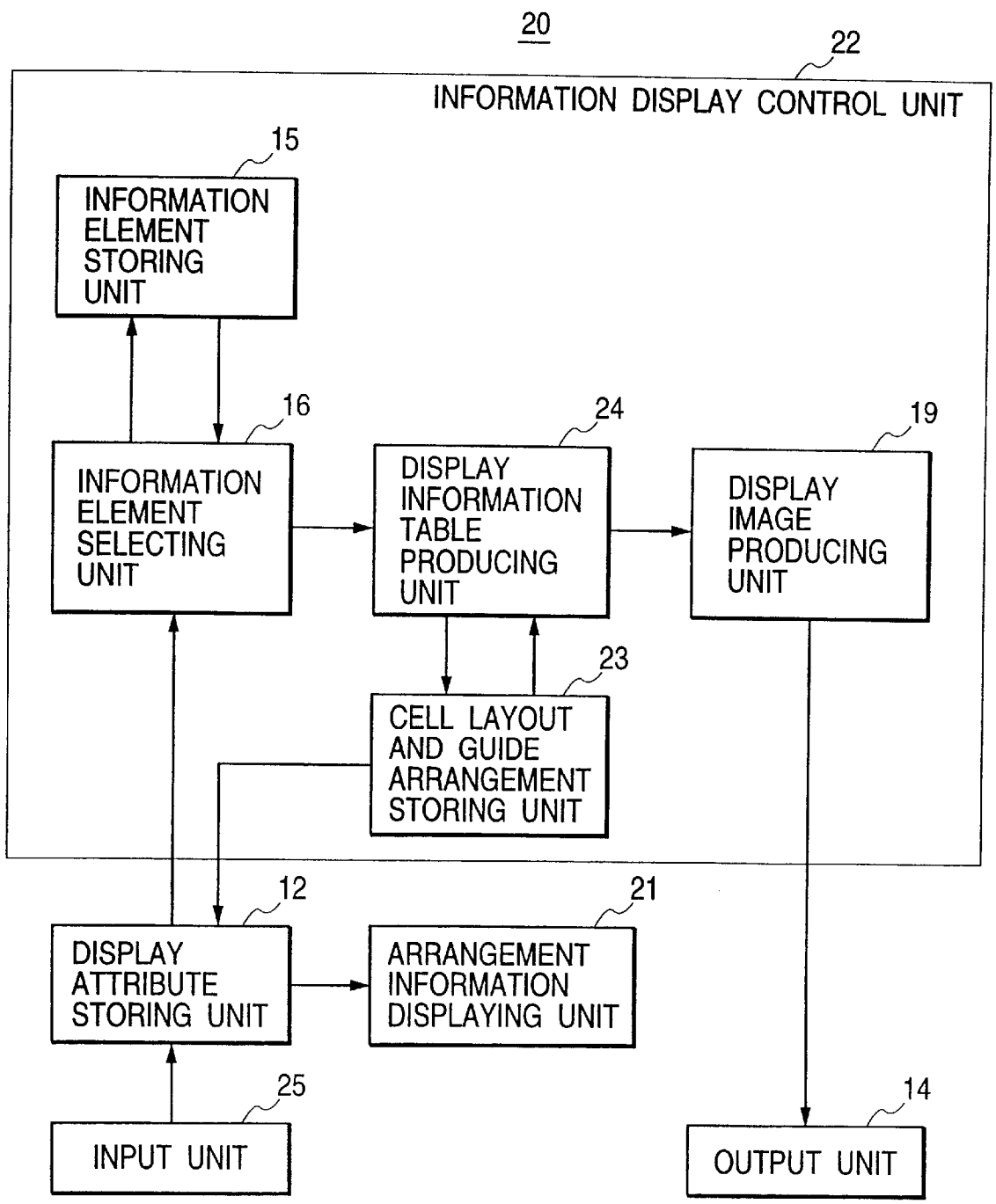
FIG. 11 is a block diagram of an information display apparatus according to a second embodiment of the present invention.

FIG. 11 is a block diagram of an information display apparatus according to a second embodiment of the present invention.

As shown in FIG. 11, an information display apparatus 20 comprises:
 an input unit 25 for receiving an information display request and a particular detail degree and receiving a piece of particular program guide arrangement information;
 an arrangement information displaying unit 21 for displaying pieces of program guide arrangement information in response to the information display request received in the input unit 25 for a user to select the particular program guide arrangement information, the pieces of program guide arrangement information respectively indicating a particular attribute of each display axis to arrange a plurality of broadcasting program guides in a broadcasting program guide table along each display axis on the basis of the particular attribute;
 the input display attribute storing unit 12 for storing the information display request, the particular detail degree and the particular program guide arrangement information received in the input unit 25 as display attributes;
 an information display control unit 22 for controlling a display condition of a broadcasting program guide table according to the display attributes stored in the display attribute storing unit 12 by making the user select the particular program guide arrangement information; and
 the output unit 14.

The information display control unit 22 comprises: the information element storing unit 15; the information element selecting unit 16;
 a cell layout and guide arrangement storing unit 23 for storing a group of cells fitting for a cell layout for each cell layout, storing pieces of program guide arrangement information and outputting the pieces of program guide arrangement information to the arrangement information displaying unit 21 through the storing unit 12 when the information display request is received in the input unit 25, the image display area being partitioned into the cells by partition lines parallel to each display axis (for example, partition lines parallel to an X-axis and partition lines parallel to a Y-axis in a two-dimensional layout of the cells);
 a display information table producing unit 24 for holding a layout correspondence table in which the correspondence of one piece of cell layout information indicating one cell layout to the combination of a detail degree and program guide arrangement information is listed for each combination type, receiving the groups of particular program guide elements from the information element selecting unit 16, receiving the particular detail degree and the particular program guide arrangement information from the information element selecting unit 16, specifying particular cell layout information corresponding to the particular detail degree and the particular program guide arrangement information by referring the layout correspondence table, detecting a group of particular cells fitting for a particular cell layout indicated by the particular cell layout information from the cell layout and guide arrangement storing unit 23, setting the group of particular cells in the image display area, determining a plurality of particular broadcasting program guides planned to be arranged in the particular cells according to the particular program guide arrangement information and arranging one group of particular program guide elements of one particular broadcasting program guide selected in the information element selecting unit 16 in one particular cell for each particular broadcasting program guide to produce a broadcasting program guide table indicating the groups of particular program guide elements arranged in the particular cells; and
 the display image producing unit 19 for producing a display image of the groups of particular program guide elements of the particular broadcasting program guides arranged in the particular cells according to the broadcasting program guide table produced in the display information table producing unit 24.

In the above configuration, when the user inputs an information display request and a particular detail degree to the input unit 25, the information display request is transmitted to the cell layout and guide arrangement storing unit 23 through the storing unit 12, and the pieces of program guide arrangement information stored in the cell layout and guide arrangement storing unit 23 are transmitted to the arrangement information displaying unit 21 through the display attribute storing unit 12 in response to the information display request. Therefore, the user can select one of the pieces of program guide arrangement information displayed in the arrangement information displaying unit 21. When the user selects a piece of particular program guide arrangement information indicating a particular attribute of each axis, the particular program guide arrangement information is transmitted with the particular detail degree to the information element selecting unit 16 through the storing unit 12.

Thereafter, a plurality of groups of particular program guide elements selected in the selecting unit 16 according to the particular detail degree in the same manner as in the first embodiment are transmitted with the particular detail degree and the particular program guide arrangement information to the table producing unit 24. In the table producing unit 24, particular cell layout information corresponding to the particular detail degree and the particular program guide arrangement information in the layout correspondence table is specified, and a plurality of particular cells arranged in a particular layout indicated by the particular cell layout information are detected from the cell layout and guide arrangement storing unit 23. The particular cells are set in the image display area, and one group of particular program guide elements of one particular broadcasting program guide is arranged in one particular cell for each particular broadcasting program guide. Therefore, a display image of the groups of particular program guide elements of the particular broadcasting program guides is produced in the producing unit 19 and is output to the output unit 14. In this case, it is applicable that the function of the arrangement information displaying unit 21 be performed by the output unit 14.

Accordingly, because pieces of program guide arrangement information stored in the storing unit 23 are displayed, a user can select particular program guide arrangement information. Therefore, the user can specify the arrangement of a plurality of particular broadcasting program guides along each axis according to the user's intention.

For example, in cases where the user selects particular program guide arrangement information indicating the television channel along the X-axis and the program broadcasting start time along the Y-axis, a plurality of broadcasting program guides are displayed in the image display area in the same manner as those in a general television program guide table. Also, in cases where the user selects particular program guide arrangement information indicating one type of genre along the X-axis and the program broadcasting start time along the Y-axis, the user can compare a plurality of particular broadcasting program guides relating to the type of genre with each other in the order of time. Therefore, the user can easily check many particular broadcasting program guides arranged according to his intention at a look.

(Third Embodiment)

In this embodiment, in cases where a user doe not desire to arrange a plurality of broadcasting program guides according to a piece of particular program guide arrangement information stored in the cell layout and guide arrangement storing unit 17, the user specify a piece of specific program guide arrangement information indicating a specific attribute of each display axis to arrange a plurality of broadcasting program guides along each display axis on the basis of the specific attribute, and a plurality of broadcasting program guides are arranged and displayed according to the specific program guide arrangement information.

Figure 12:
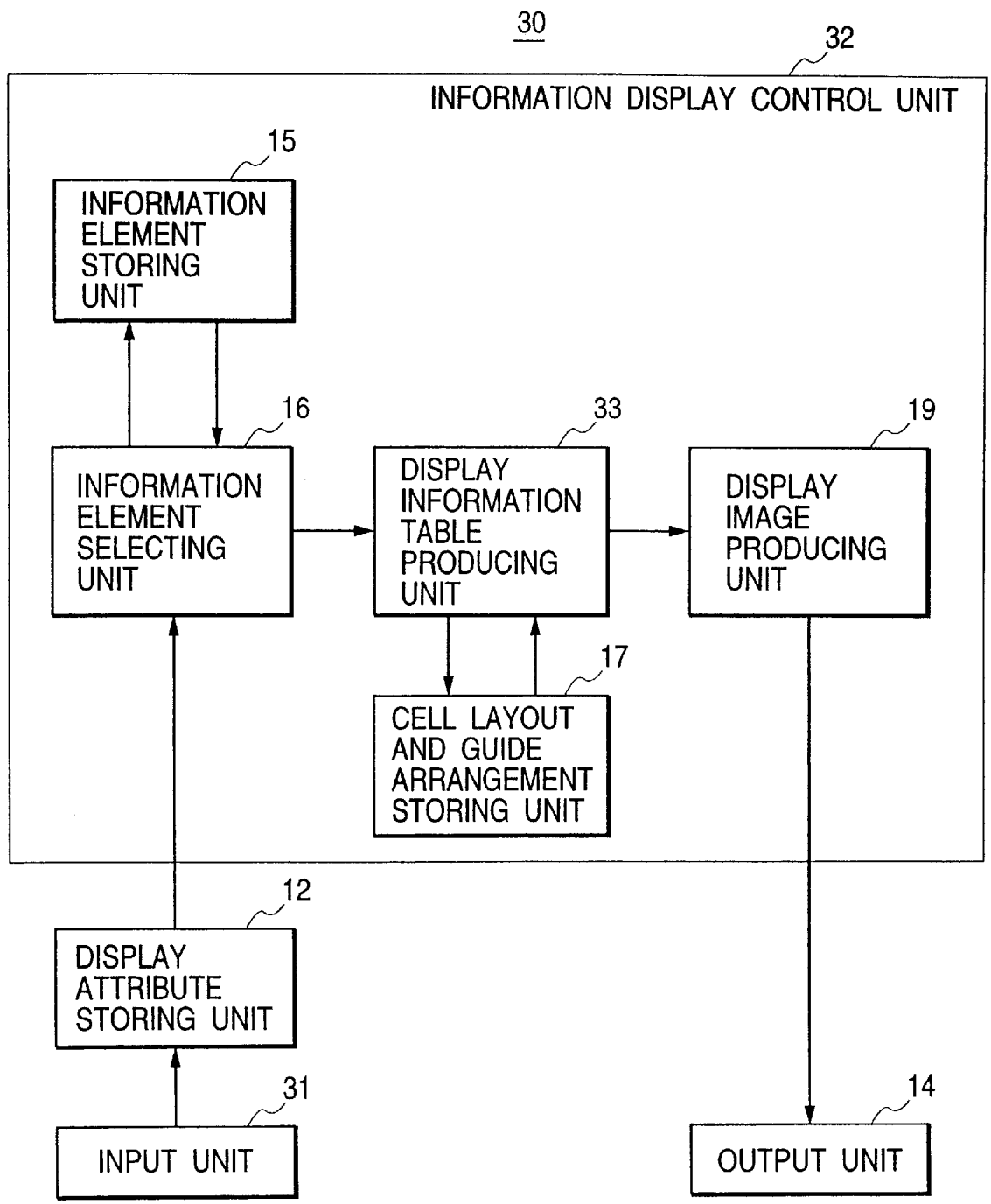
FIG. 12 is a block diagram of an information display apparatus according to a third embodiment of the present invention.

FIG. 12 is a block diagram of an information display apparatus according to a third embodiment of the present invention.

As shown in FIG. 12, an information display apparatus 30 comprises:

an input unit 31 for receiving an information display request, a particular detail degree and specific program guide arrangement information, the specific program guide arrangement information indicating a specific attribute of each display axis to arrange a plurality of broadcasting program guides along each display axis on the basis of the specific attributes like (X=channel, Y=time) or (X=genre, Y=time);

the input display attribute storing unit 12 for storing the pieces of command data received in the input unit 31 as display attributes;

an information display control unit 32 for controlling a display condition of a broadcasting program guide table according to the display attributes stored in the display attribute storing unit 12 by directly specifying the particular program guide arrangement information; and the output unit 14.

The information display control unit 32 comprises: the information element storing unit 15; the information element selecting unit 16; the cell layout and guide arrangement storing unit 17;

a display information table producing unit 33 for holding a layout correspondence table in which the correspondence of one piece of cell layout information indicating one cell layout to the combination of a detail degree and program guide arrangement information is listed for each combination type, specifying particular cell layout information corresponding to the particular detail degree and the specific program guide arrangement information by referring the layout correspondence table, detecting a group of particular cells fitting for a particular cell layout indicated by the particular cell layout information from the cell layout and guide arrangement storing unit 17, setting the group of particular cells in the image display area, determining a plurality of particular broadcasting program guides planned to be arranged in the particular cells according to the specific program guide arrangement information and arranging one group of particular program guide elements of one particular broadcasting program guide selected in the information element selecting unit 16 in one particular cell for each particular broadcasting program guide to produce a broadcasting program guide table indicating the groups of particular program guide elements arranged in the particular cells; and the display image producing unit 19.

In the above configuration, when a user inputs an information display request, a particular detail degree and specific program guide arrangement information to the input unit 31, a plurality of groups of particular program guide elements selected according to the particular detail degree are transmitted from the selecting unit 16 to the table producing unit 33. In the table producing unit 33, particular cell layout information indicating a particular cell layout is specified according to the particular detail degree transmitted from the selecting unit 16 and the specific program guide arrangement information transmitted from the storing unit 12 by referring a layout correspondence table, and a plurality of particular cells of the particular cell layout indicated by the particular cell layout information are detected from the storing unit 17. Thereafter, a plurality of particular broadcasting program guides planned to be arranged in the particular cells are determined, and one group of particular program guide elements of one particular broadcasting program guide selected in the information element selecting unit 16 is arranged in one particular cell for each particular broadcasting program guide according to the specific program guide arrangement information to produce a broadcasting program guide table.

Therefore, a display image of the groups of particular program guide elements of the particular broadcasting program guides arranged in the particular cells is produced in the display image producing unit 19 according to the broadcasting program guide table and is displayed in the output unit 14.

Accordingly, in cases where the user inputs the first detail degree and specific program guide arrangement information indicating (X=genre, Y=time) to the input unit 31, a particular layout, in which 6*8 cells are arranged in 6 columns and 8 rows, can be selected by referring the layout correspondence table.

Also, even though many layouts corresponding to many types of program guide arrangement information are listed in the layout correspondence table, because specific program guide arrangement information is directly input, one particular layout of cells can be reliably specified. Therefore, the user can display a plurality of broadcasting program guides along one or more desired display axes, so that the user can compare the broadcasting program guides arranged at desired order with each other.

In the third embodiment, it is applicable that a piece of specific cell layout information be input by the user in addition to the specific program guide arrangement information to set a group of particular cells in a specific layout indicated by the specific cell layout information.

(Fourth Embodiment)

In this embodiment, even though a group of program guide elements of one broadcasting program guide is arranged in a particular cell, a blank space occurs in the particular cell in cases where an information volume of the broadcasting program guide is lower than a volume of information capable to be arranged in the particular cell. Therefore, the particular cell having a blank space is detected, and another program guide element of the broadcasting program guide is added to the group of program guide elements to fill the blank space with the program guide element.

Figure 13:
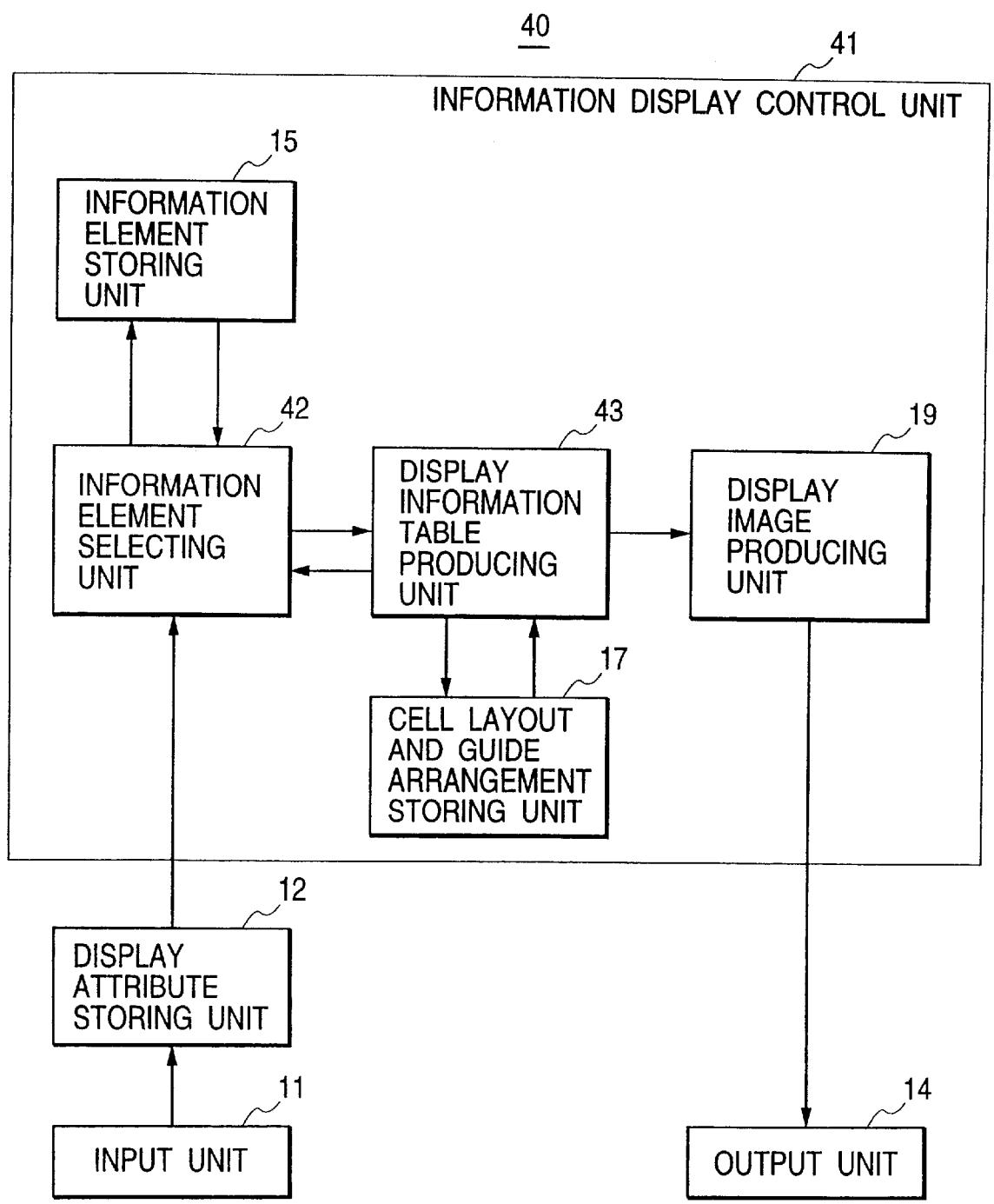
FIG. 13 is a block diagram of an information display apparatus according to a fourth embodiment of the present invention.

FIG. 13 is a block diagram of an information display apparatus according to a fourth embodiment of the present invention.

As shown in FIG. 13, an information display apparatus 40 comprises:

the input unit 11 for receiving an information display request and a particular detail degree; the input display attribute storing unit 12;

an information display control unit 41 for controlling a display condition of a broadcasting program guide table according to the display attributes stored in the display attribute storing unit 12 not to form any blank space in each cell; and the output unit 14.

The information display control unit 41 comprises:

the information element storing unit 15;

an information element selecting unit 42 for holding a detail correspondence table in which the correspondence of a group of program guide elements to a detail degree (or an information volume) is listed for each of detail degrees, receiving the display attributes from the storing unit 12, selecting a group of particular program guide elements corresponding to the particular detail degree in the detail correspondence table from the program guide elements of one broadcasting program guide stored in the information element storing unit 15 for each broadcasting program guide and selecting one or more program guide elements of one broadcasting program guide from the remaining program guide elements of the broadcasting program guide stored in the information element storing unit 15 according to blank information;

the cell layout and guide arrangement storing unit 17;

a display information table producing unit 43 for holding a layout correspondence table in which the correspondence of one piece of cell layout information indicating one cell layout to the combination of a detail degree and program guide arrangement information is listed for each combination type, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells of a particular cell layout indicated by the particular cell layout information from the cell layout and guide arrangement storing unit 17, setting the group of particular cells in the image display area, determining a plurality of particular broadcasting program guides planned to be arranged in the particular cells according to the particular program guide arrangement information, arranging one group of particular program guide elements of one particular broadcasting program guide selected in the information element selecting unit 42 in one particular cell for each particular broadcasting program guide, detecting a blank space existing in one particular cell identified by a cell identification number, in which one group of particular program guide elements of one particular broadcasting program guide identified by a field name is arranged, transmitting the blank information composed of a size of the blank space, the cell identification number and the field name to the information element selecting unit 42 to fill the blank space with another program guide element of the particular broadcasting program guide and producing a broadcasting program guide table in which the groups of particular program guide elements including the program guide element added to fill the blank space are arranged in the particular cells; and the display image producing unit 19.

In the above configuration, an operation performed in the information element selecting unit 42 and the display information table producing unit 43 is described with reference to FIG. 14.

FIG. 14 is a flow chart showing an operation performed in the information element selecting unit 42 and the display information table producing unit 43.

Figures 15A, 15B, 16:
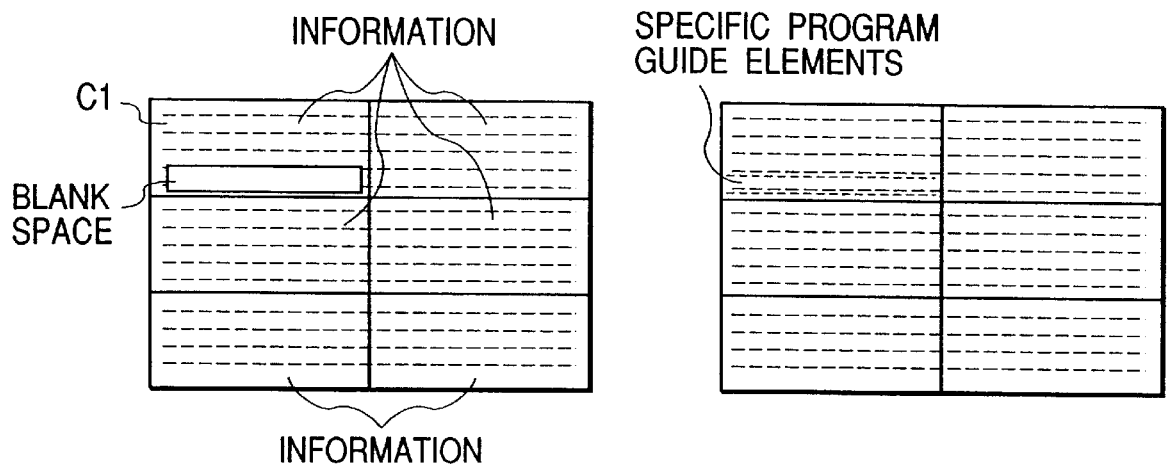
FIG. 15A shows a blank space existing in a particular cell C1.
FIG. 15B shows the blank space of the particular cell cl filled with one or more program guide elements.
FIG. 16 shows a display priority ranking table for a plurality of program guide elements of one broadcasting program guide.

After the steps S101 to S104 are performed in the same manner as in the first embodiment, it is checked in the table producing unit 43 whether or not a blank space exists in one or more particular cells (step S111). As shown in FIG. 15A, in cases where a blank space exists in a particular cell C1 identified by a cell identification number, a size of the blank space is detected, a field name identifying one particular broadcasting program guide, of which one group of particular program guide elements is arranged in the particular cell C1, is detected, and blank information composed of the size of the blank space, the cell identification number and the field name is transmitted to the information element selecting unit 42 (step S112). In the selecting unit 42, the particular broadcasting program guide stored in the storing unit 15 is specified according to the field name, and one or more specific program guide elements of the particular broadcasting program guide other than the group of particular program guide elements are detected according to the size of the blank space to fill the blank space with the program guide elements (step S113).

FIG. 16 shows a display priority ranking table for the program guide elements of one broadcasting program guide. As shown in FIG. 16, in cases where one group of particular program guide elements is arranged in the particular cell C1 in the step S104 according to the first detail degree, because the group of particular program guide elements corresponds to the broadcasting start time, the title and the sub-title for one broadcasting program, one or more specific program guide elements of the fourth ranking and following ranking such as information of the cast of the broadcasting program are detected.

Thereafter, the specific program guide elements are transmitted with the blank information to the table producing unit 43, the particular cell c1 is specified according to the cell identification number, and the specific program guide elements are added to the group of particular program guide elements of the particular broadcasting program guide arranged in the particular cell c1 (step S114). Therefore, as shown in FIG. 15B, the blank space of the particular cell c1 is filled with the program guide elements. The steps S112 to S114 are executed for each particular cell having a blank space.

Accordingly, even though a blank space occurs in a particular cell when one group of particular program guide elements of one broadcasting program guide selected according to the particular detail degree is arranged in the particular cell, because the blank space is filled with one or more specific program guide elements of the same broadcasting program guide, information of many groups of particular program guide elements can be arranged in the particular cells as large as possible.

(Fifth Embodiment)

In this embodiment, in cases where character information often displayed or particular character information such as genre information is selected by the selecting unit 16 to be arranged in a particular cell, a particular icon is arranged in the particular cell in place of the character information, or the particular cell is colored to prominently express the particular character information by a background color.

Figure 17:
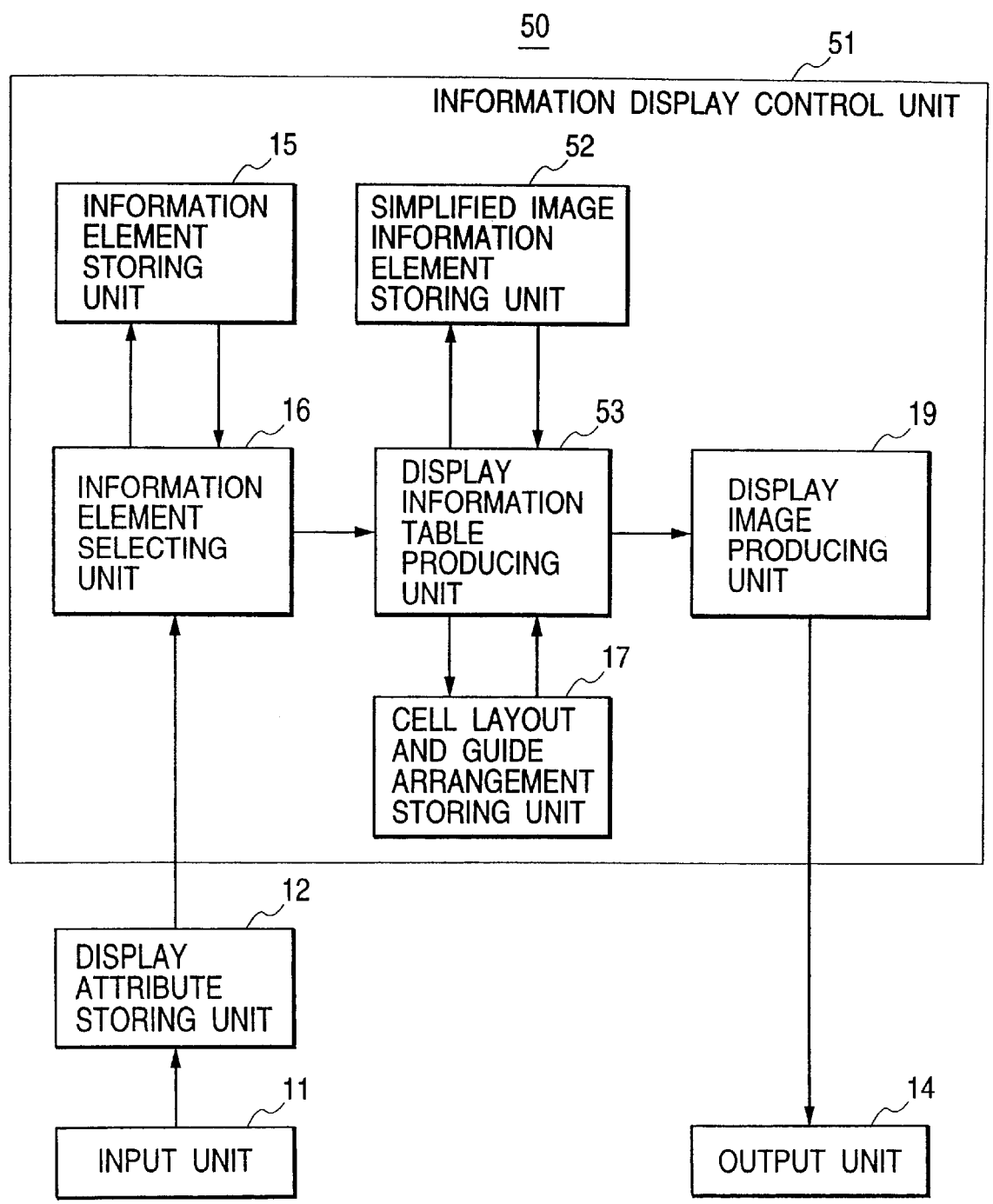
FIG. 17 is a block diagram of an information display apparatus according to a fifth embodiment of the present invention.

FIG. 17 is a block diagram of an information display apparatus according to a fifth embodiment of the present invention.

As shown in FIG. 17, an information display apparatus 50 comprises:

the input unit 11; the input display attribute storing unit 12;

an information display control unit 51 for controlling a display condition of a broadcasting program guide table according to the display attributes stored in the display attribute storing unit 12 to display an icon or a background color in place of character information indicating a program guide element; and the output unit 14.

The information display control unit 51 comprises:

the information element storing unit 15; the information element selecting unit 16; the cell layout and guide arrangement storing unit 17;

a simplified image information element storing unit 52 for storing a plurality of simplified image information elements respectively corresponding to one type of specific program guide element, each simplified image information element being an icon, a background color or the like;

display information table producing unit 53 for holding a layout correspondence table in which the correspondence of one piece of cell layout information indicating one cell layout to the combination of a detail degree and program guide arrangement information is listed for each combination type, receiving the groups of program guide elements selected in the selecting unit 16, receiving the particular program guide arrangement information from the cell layout and guide arrangement storing unit 17, checking whether or not one type of specific program guide element exists in one group of particular program guide elements, reading out a specific simplified image information element corresponding to one type of specific program guide element from the simplified image information element storing unit 52 in cases where the type of specific program guide element exists in the group of particular program guide elements, replacing the type of specific program guide element with the specific simplified image information element, specifying particular cell layout information corresponding to the particular detail degree and the particular program guide arrangement information by referring the layout correspondence table, detecting a group of particular cells of a particular cell layout indicated by the particular cell layout information from the cell layout and guide arrangement storing unit 17, setting the group of particular cells in the image display area, determining a plurality of particular broadcasting program guides planned to be arranged in the particular cells according to the particular program guide arrangement information and arranging one group of particular program guide elements of one particular broadcasting program guide in one particular cell for each particular broadcasting program guide; and the display image producing unit 19.

In the above configuration, an operation performed in the display information table producing unit 53 is described with reference to FIG. 18.

Figure 18:
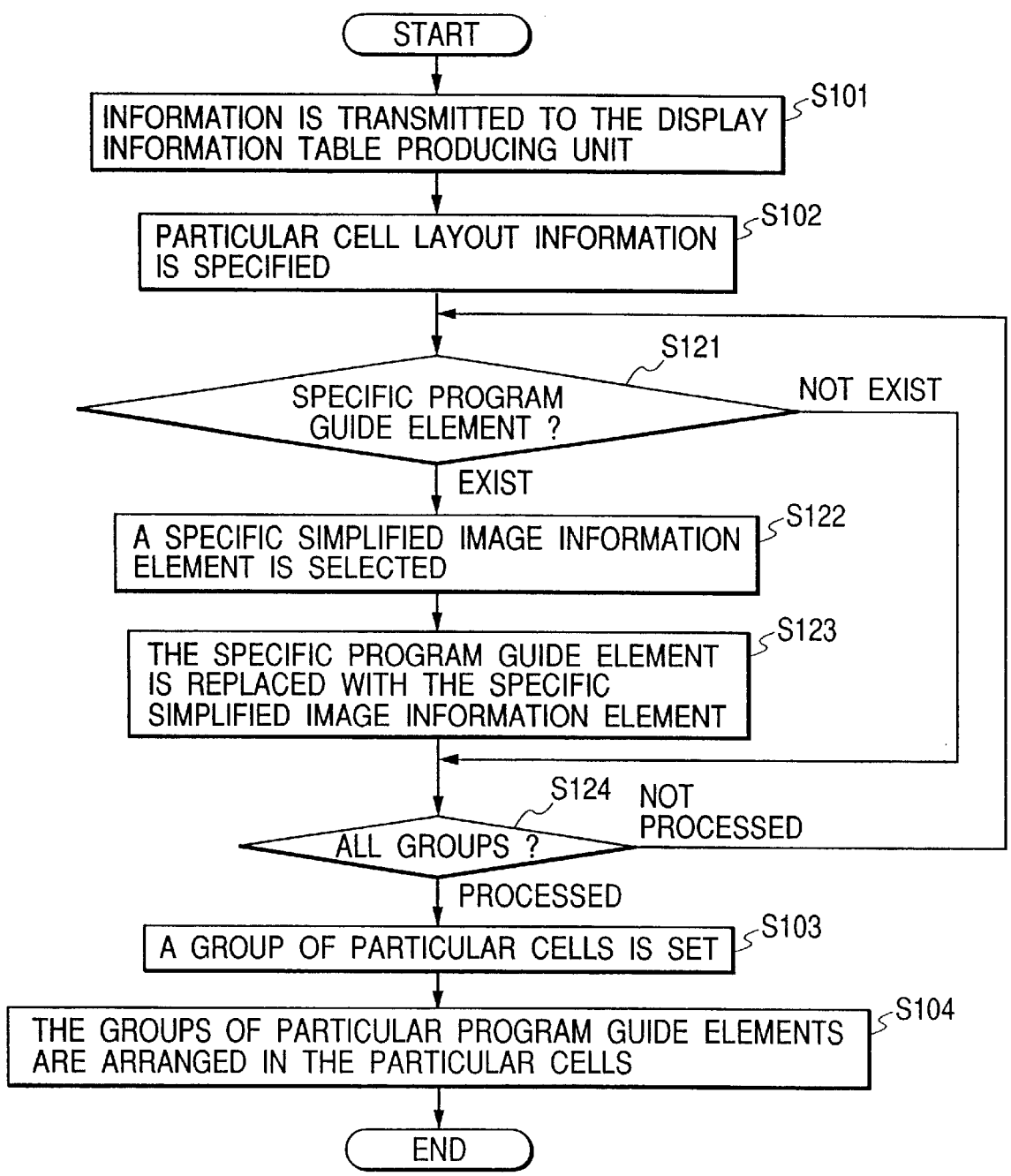
FIG. 18 is a flow chart showing the procedure performed in a display information table producing unit according to the fifth embodiment.

FIG. 18 is a flow chart showing an operation performed in the display information table producing unit 53.

After the steps S101 to S102 are performed in the same manner as in the first embodiment, it is checked whether or not one type of specific program guide element exists in one group of particular program guide elements of one particular broadcasting program guide (step S121). In cases where the type of specific program guide element exists in the group of particular program guide elements, a specific simplified image information element corresponding to the type of specific program guide element is selected from the simplified image information elements stored in the storing unit 52 (step S122), and the type of specific program guide element is replaced with the specific simplified image information element (step S123). For example, in cases where information of the television channel exists in one group of particular program guide elements, the information is replaced with a particular icon stored in the storing unit 52. Also, in cases where a genre code exists in one group of particular program guide elements, the genre code is replaced with a particular background color stored in the storing unit 52. The step S121 is performed for all groups of particular program guide elements (step S124).

Thereafter, a group of particular cells of the particular cell layout indicated by the particular cell layout information is detected from the cell layout and guide arrangement storing unit 17, and the group of particular cells of the particular cell layout is set in an image display area (step S103). Thereafter, one group of particular program guide elements of one particular broadcasting program guide, in which one type of specific program guide element is replaced with the specific simplified image information element corresponding to the type of specific program guide element when the steps S122 and S123 are performed, is arranged in one particular cell for each particular broadcasting program guide to produce a broadcasting program guide table (step S104).

Therefore, in cases where the particular icon is included in one group of particular program guide elements as one specific simplified image information element corresponding to the information of the television channel, the particular icon is displayed in place of the character information of the television channel. Also, in cases where a background color is included in one group of particular program guide elements of one particular broadcasting program guide, a particular cell, in which the group of particular program guide elements is arranged, is colored with the background color.

Accordingly, because one type of specific program guide element is replaced with a specific simplified image information element such as an icon or a background color, a display space of one group of particular program guide elements occupying one particular cell is reduced, so that information of the particular broadcasting program guide arranged in each particular cell can be increased as large as possible.

Also, because the user can visually recognize the specific simplified image information element included in one group of particular program guide elements, the user can quickly compare a plurality of particular broadcasting program guides arranged in a plurality of particular cells with each other.

(Sixth Embodiment)

In this embodiment, in cases where an information volume of one particular broadcasting program guide is too large to arrange the particular broadcasting program guide in one particular cell, a form-element analysis is performed for the particular broadcasting program guide to extract one or more important words, which indicate the gist of the particular broadcasting program guide, from the particular broadcasting program guide, and the important words are preferentially arranged in the particular cell in place of the particular broadcasting program guide.

Figure 19:
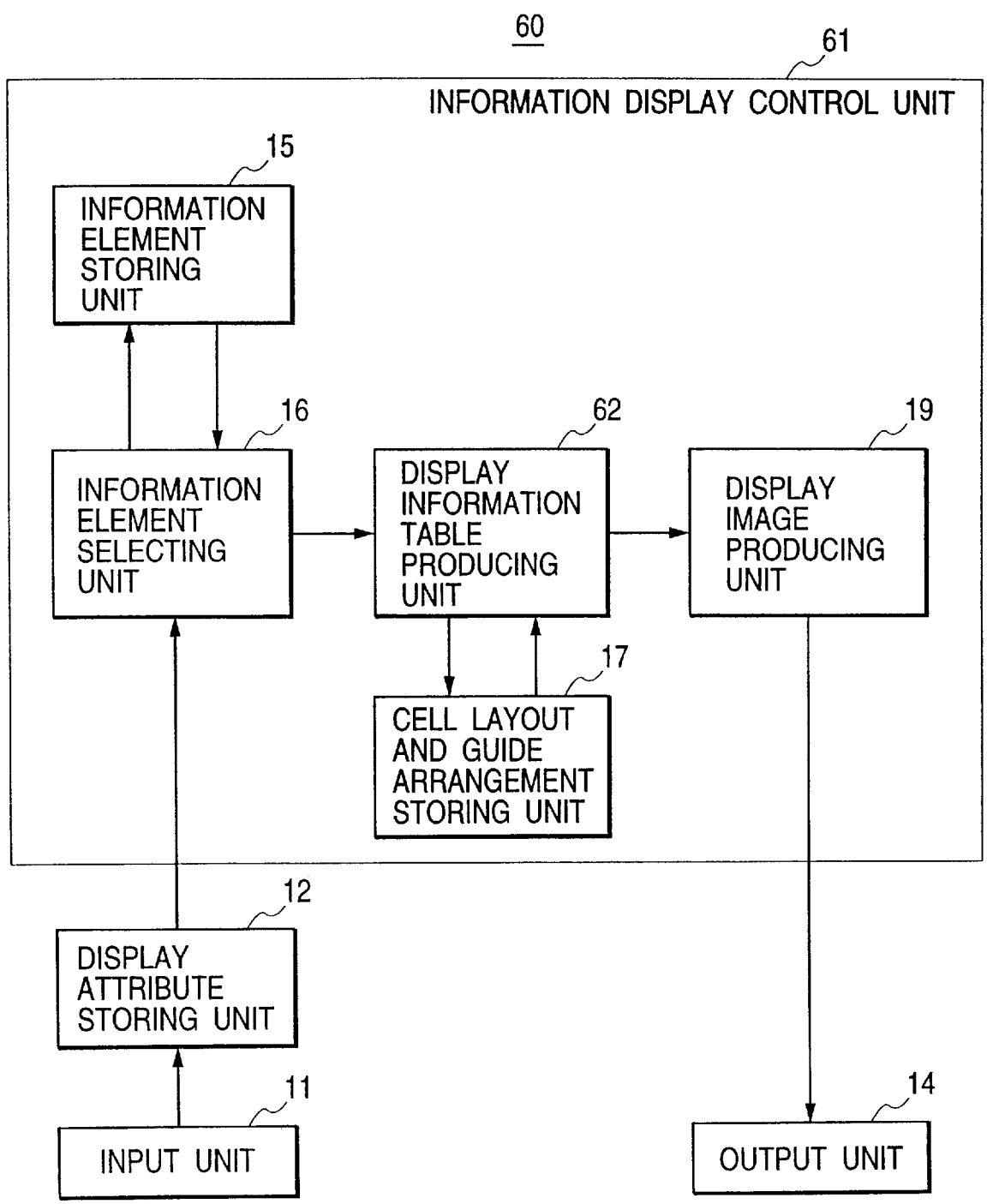
FIG. 19 is a block diagram of an information display apparatus according to a sixth embodiment of the present invention.

FIG. 19 is a block diagram of an information display apparatus according to a sixth embodiment of the present invention.

As shown in FIG. 19, an information display apparatus 60 comprises:

the input unit 11; the input display attribute storing unit 12;

an information display control unit 61 for controlling a display condition of a broadcasting program guide table according to the display attributes stored in the display attribute storing unit 12 to preferentially arrange one or more important words extracted from one broadcasting program guide in a cell in place of the broadcasting program guide in cases where an information volume of the broadcasting program guide is too large to be arranged in the cell; and the output unit 14.

The information display control unit 61 comprises: the information element storing unit 15; the information element selecting unit 16; the cell layout and guide arrangement storing unit 17;

a display information table producing unit 62 for holding a layout correspondence table in which the correspondence of one piece of cell layout information indicating one cell layout to the combination of a detail degree and program guide arrangement information is listed for each combination type, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells of a particular cell layout indicated by the particular cell layout information from the cell layout and guide arrangement storing unit 17, setting the group of particular cells in the image display area, determining a plurality of particular broadcasting program guides planned to be arranged in the particular cells arranged in the particular layout, detecting a specific group of particular program guide elements, of which an information volume is too large to arrange the specific group of particular program guide elements in one particular cell, from groups of particular program guide elements selected in the information element selecting unit 42, extracting one or more important words indicating the gist of the specific group of particular program guide elements from the specific group of particular program guide elements, preferentially arranging the important words in the particular cell in place of the specific group of particular program guide elements, and arranging one group of particular program guide elements of one particular broadcasting program guide in one particular cell for each particular broadcasting program guide in cases where an area of the particular cell is sufficient to arrange the group of particular program guide elements in the particular cell; and the display image producing unit 19.

In the above configuration, an operation performed in the display information table producing unit 62 is described with reference to FIG. 20.

Figure 20:
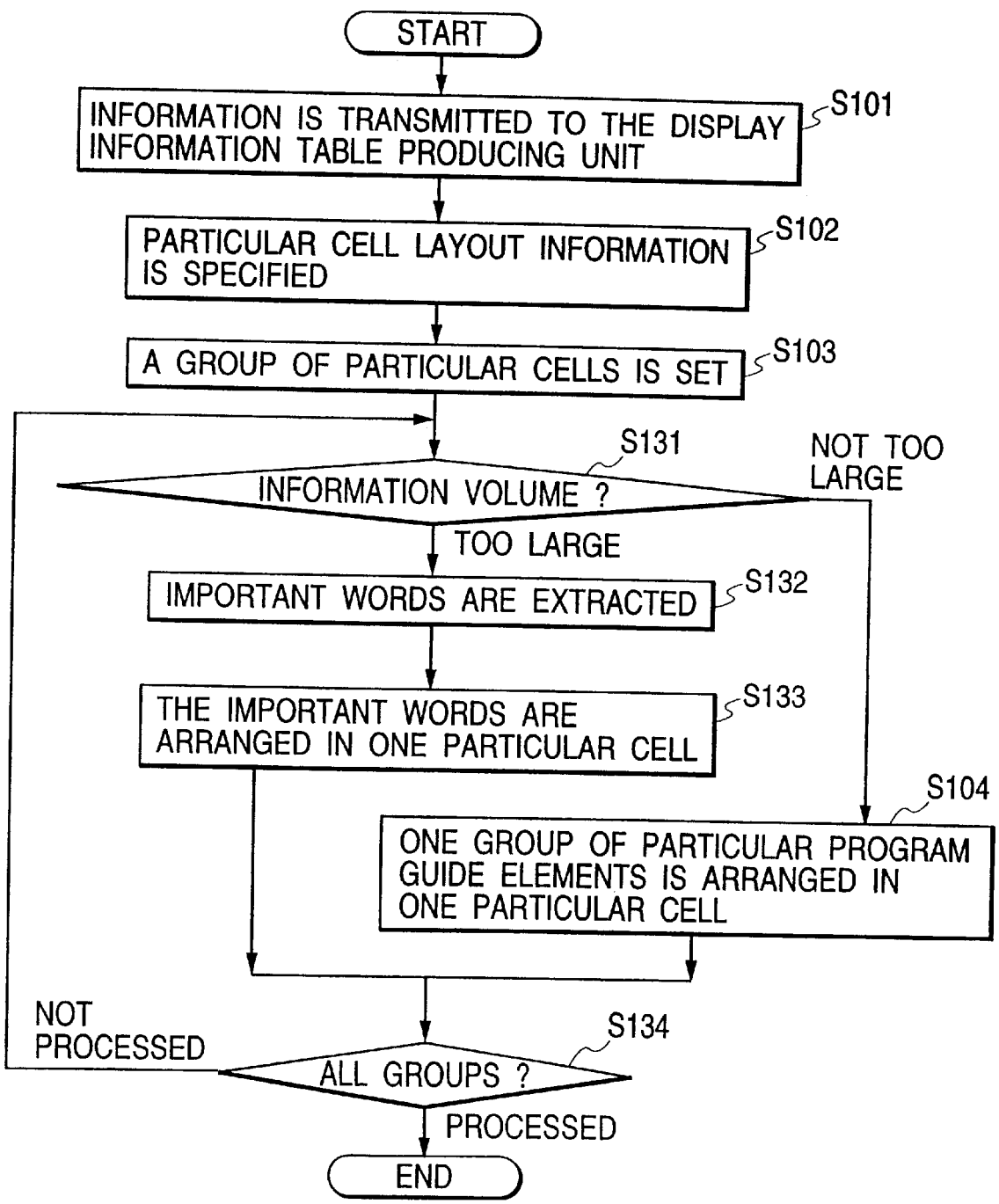
FIG. 20 is a flow chart showing the procedure performed in a display information table producing unit according to the sixth embodiment.

FIG. 20 is a flow chart showing an operation performed in the display information table producing unit 53.

After the steps S101 to S103 are performed in the same manner as in the first embodiment, it is checked whether or not an information volume of one group of particular program guide elements of each particular broadcasting program guide selected in the information element selecting unit 42 is too large to be arranged in one particular cell (step S131). In cases where an information volume of a specific group of particular program guide elements is too large to be arranged in one particular cell, a form-element analysis is performed for the specific group of particular program guide elements to extract one or more important words indicating the gist of the specific group of particular program guide elements from the specific group of particular program guide elements (step S132), and the important words are preferentially arranged in the particular cell (step S133). In contrast, in cases where an area of one particular cell is sufficient to arrange one group of particular program guide elements of one particular broadcasting program guide, the group of particular program guide elements is arranged in the particular cell (step S104) in the same manner as in the first embodiment. In cases where information volumes of all groups of particular program guide elements are checked in the step S131 (step S134), the procedure is finished.

Accordingly, even though an information volume of one group of particular program guide elements is too large to arrange the group of particular program guide elements in one particular cell, because one or more important words indicating the gist of the group of particular program guide elements are extracted from the group of particular program guide elements and the important words are preferentially arranged in the particular cell, the user can recognize the gist of the group of particular program guide elements, so that the user can compare a plurality of broadcasting program guides with each other.

In this embodiment, it is preferred that a plurality of important words extracted from one group of particular program guide elements be arranged in one particular cell in the importance order.

(Seventh Embodiment)

In this embodiment, in cases where an information volume of one group of particular program guide elements of one particular broadcasting program guide is too large to arrange the group of particular program guide elements in one particular cell, a character size for the group of particular program guide elements is made small on condition that a user can recognize characters expressing the group of particular program guide elements, and the group of particular program guide elements is arranged in the particular cell.

Figure 21:
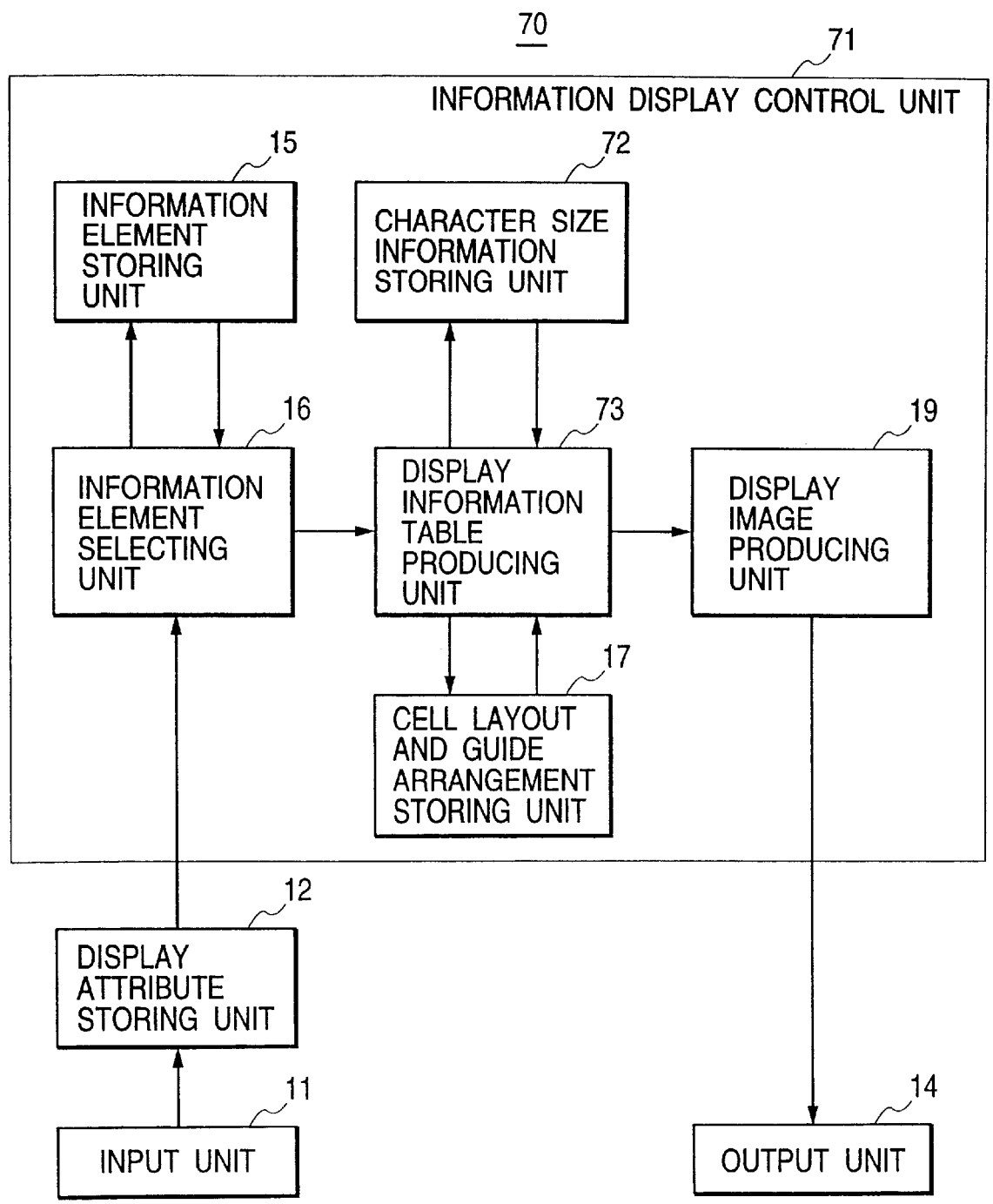
FIG. 21 is a block diagram of an information display apparatus according to a seventh embodiment of the present invention.

FIG. 21 is a block diagram of an information display apparatus according to a seventh embodiment of the present invention.

As shown in FIG. 21, an information display apparatus 70 comprises:

the input unit 11; the input display attribute storing unit 12;

an information display control unit 71 for controlling a display condition of a broadcasting program guide table according to the display attributes stored in the display attribute storing unit 12 to display one group of particular program guide elements of one particular broadcasting program guide in one particular cell in small type in cases where an information volume of the group of particular program guide elements is too large to arrange the group of particular program guide elements in one particular cell; and the output unit 14.

The information display control unit 71 comprises: the information element storing unit 15; the information element selecting unit 16; the cell layout and guide arrangement storing unit 17;

a character size information storing unit 72 for storing pieces of character size information respectively indicating one character size;

a display information table producing unit 73 for holding a layout correspondence table in which the correspondence of one piece of cell layout information indicating one cell layout to the combination of a detail degree and program guide arrangement information is listed for each combination type, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells of a particular cell layout indicated by the particular cell layout information from the cell layout and guide arrangement storing unit 17, setting the group of particular cells in the image display area, determining a plurality of particular broadcasting program guides planned to be arranged in the particular cells arranged in the particular layout, checking whether or not one type of specific program guide element exists in one group of particular program guide elements of each particular broadcasting program guide, detecting a specific group of particular program guide elements, of which an information volume is too large to arrange the specific group of particular program guide elements in one particular cell, from groups of particular program guide elements selected in the information element selecting unit 42, selecting a piece of particular character size information from the pieces of character size information stored in the storing unit 72 on condition that an area of the particular cell is sufficient to arrange the specific group of particular program guide elements expressed by small-sized characters according to the particular character size information, expressing the specific group of particular program guide elements by small-sized characters according to the particular character size information, and arranging the groups of particular program guide elements including the specific group of particular program guide elements in the particular cells; and the display image producing unit 19.

In the above configuration, an.operation performed in the display information table producing unit 73 is described with reference to FIG. 20.

Figure 22:
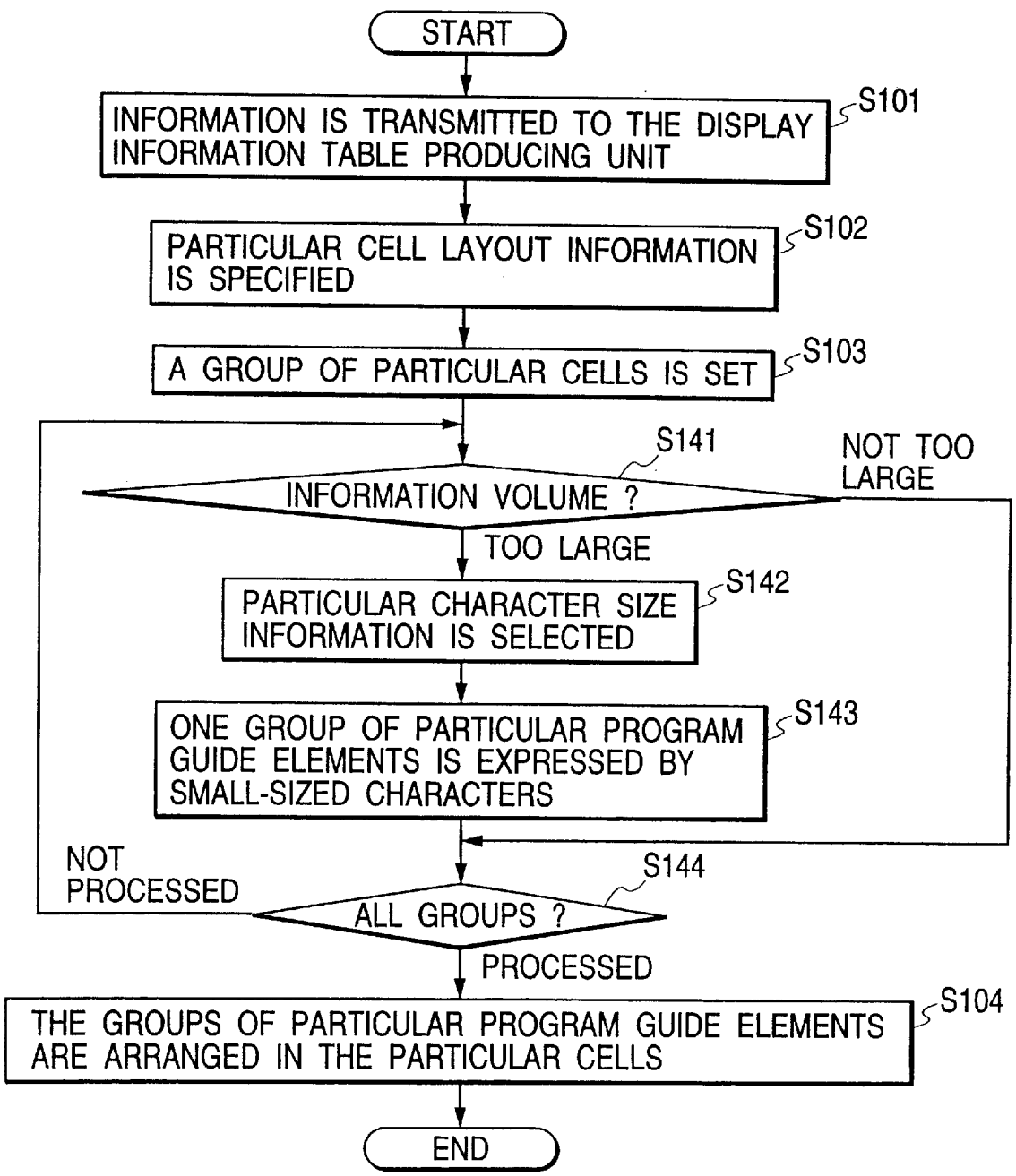
FIG. 22 is a flow chart showing the procedure performed in a display information table producing unit according to the seventh embodiment.

FIG. 22 is a flow chart showing an operation performed in the display information table producing unit 73.

After the steps S101 to S103 are performed in the same manner as in the first embodiment, it is checked whether or not an information volume of one group of particular program guide elements of one particular broadcasting program guide selected in the information element selecting unit 42 is too large to be arranged in one particular cell (step S141). In cases where an information volume of the group of particular program guide elements is too large to be arranged in one particular cell, a piece of particular character size information is selected from the pieces of character size information stored in the storing unit 72 on condition that an area of the particular cell is sufficient to arrange the group of particular program guide elements expressed by small-sized characters according to the particular character size information (step S142), and the group of particular program guide elements is expressed by small-sized characters according to the particular character size information (step S143). The step S141 is performed for each group of particular program guide elements (step S144). Thereafter, the groups of particular program guide elements are arranged in the particular cells in the same manner as in the first embodiment (step S104).

Accordingly, even though an information volume of a specific group of particular program guide elements is too large to arrange the specific group of particular program guide elements in one particular cell, because a character size for the specific group of particular program guide elements is made small, the specific group of particular program guide elements can be reliably arranged in the particular cell. Therefore, an information volume of groups of particular program guide elements can be displayed as a list as large as possible.

(Eighth Embodiment)

In this embodiment, the correspondence of a group of program guide elements to a detail degree (or an information volume) is displayed for each of detail degrees, a user specifies one detail degree to select a group of program guide elements from a plurality of program guide elements of one broadcasting program guide for each broadcasting program guide, and the group of program guide elements is arranged in one particular cell for each broadcasting program guide.

Figure 23:
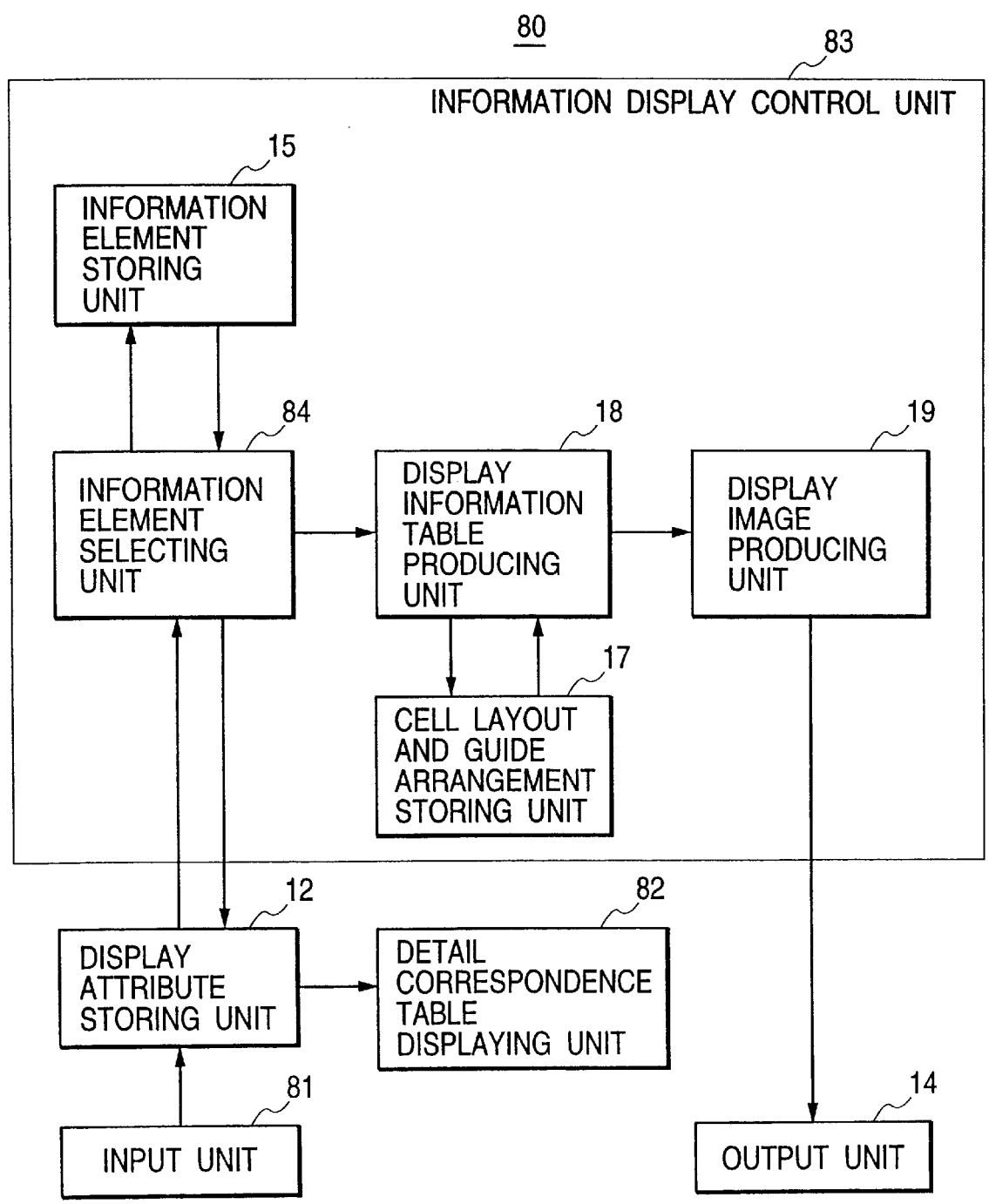
FIG. 23 is a block diagram of an information display apparatus according to an eighth embodiment of the present invention.

FIG. 23 is a block diagram of an information display apparatus according to an eighth embodiment of the present invention.

As shown in FIG. 23, an information display apparatus 80 comprises:

an input unit 81 for receiving an information display request and receiving a particular detail degree selected by a user from a detail correspondence table;

a detail correspondence table displaying unit 82 for displaying the detail correspondence table, in which the correspondence of a group of program guide elements to a detail degree (or an information volume) is listed for each of detail degrees, when the user inputs the information display request;

the input display attribute storing unit 12 for storing the information display request and the particular detail degree received in the input unit 81 as display attributes;

an information display control unit 83 for outputting the detail correspondence table to the detail correspondence table displaying unit 82 through the storing unit 12 in response to the information display request and controlling a display condition of a broadcasting program guide table according to the display attributes stored in the display attribute storing unit 12; and the output unit 14.

The information display control unit 83 comprises: the information element storing unit 15;

an information element selecting unit 84 for holding the detail correspondence table in which the correspondence of a group of program guide elements to a detail degree is listed for each of detail degrees, outputting the detail correspondence table to the detail correspondence table displaying unit 82 in response to the information display request to make a user select a particular detail degree, and selecting a group of particular program guide elements corresponding to the particular detail degree in the detail correspondence table from the program guide elements of one broadcasting program guide stored in the information element storing unit 15 for each broadcasting program guide;

the cell layout and guide arrangement storing unit 17; the display information table producing unit 18; and the display image producing unit 19.

In the above configuration, when the user inputs an information display request to the input unit 81, the information display request is transmitted to the selecting unit 84 through the storing unit 12. In the selecting unit 84, the detail correspondence table shown in FIG. 5 is output to the detail correspondence table displaying unit 82 through the storing unit 12 in response to the information display request. Therefore, the user selects a particular detail degree by referring the detail correspondence table displayed in the detail correspondence table displaying unit 82.

Thereafter, the particular detail degree is transmitted to the selecting unit 84 through the storing unit 12, and a group of particular program guide elements corresponding to the particular detail degree in the detail correspondence table is selected for each broadcasting program guide. Thereafter, groups of particular program guide elements of particular broadcasting program guides are arranged in particular cells and are displayed in the same manner as in the first embodiment.

Accordingly, the user can determine the groups of particular program guide elements displayed as a broadcasting program guide table while referring the detail correspondence table. Therefore, the user can confidently determine his desired detail degree.

(Ninth Embodiment)

In this embodiment, in cases where a user does not satisfy an information volume (or an information type) of each group of particular program guide elements corresponding to a particular detail degree, the user specifies a specific program guide element group, and each group of specific program guide elements indicated by the specific program guide element group is arranged in one particular cell for each particular broadcasting program guide.

Figure 24:
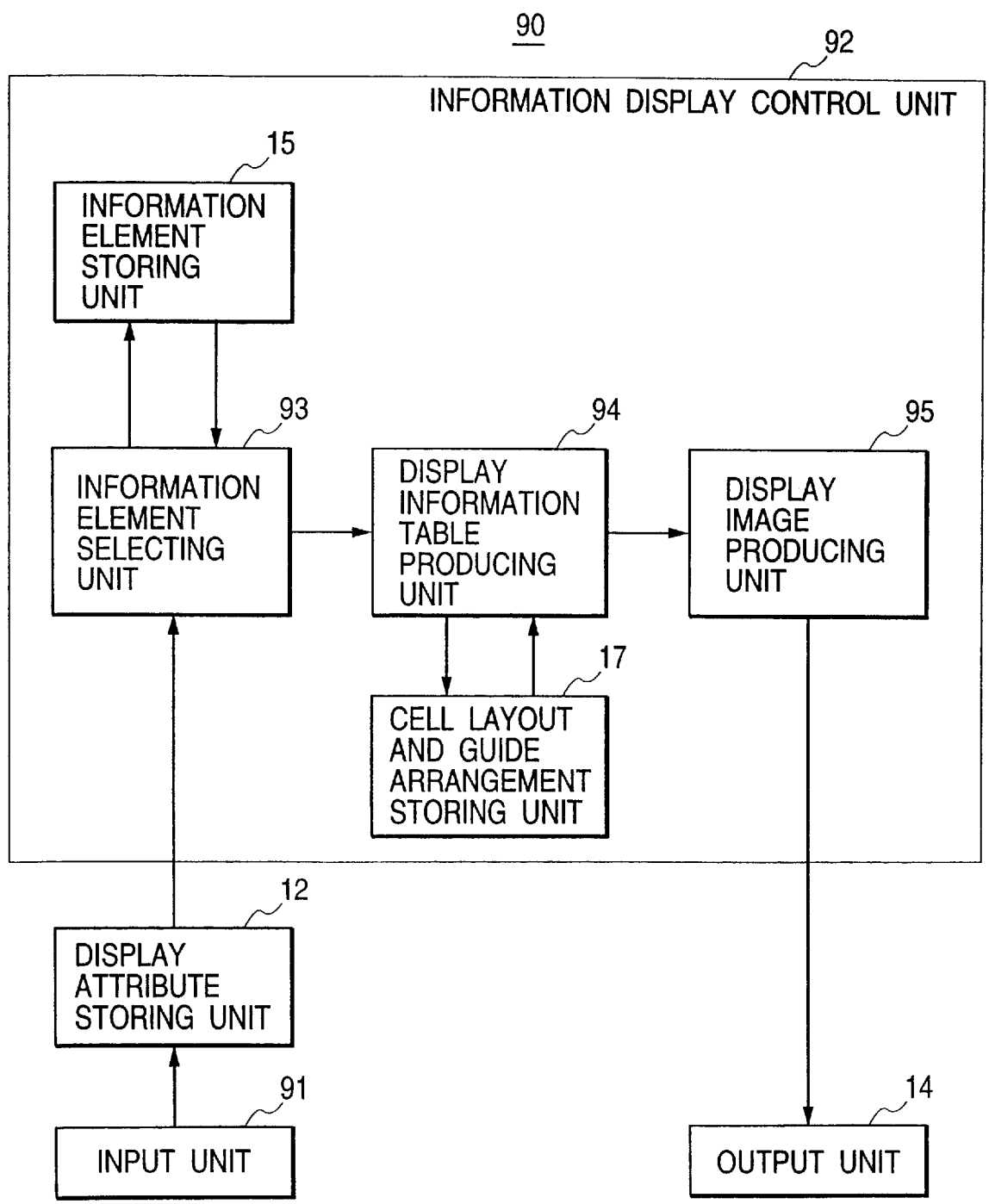
FIG. 24 is a block diagram of an information display apparatus according to a ninth embodiment of the present invention.

FIG. 24 is a block diagram of an information display apparatus according to a ninth embodiment of the present invention.

As shown in FIG. 24, an information display apparatus 90 comprises:

an input unit 91 for receiving an information display request and a particular detail degree in a first selection operation and receiving a specific element type group and specific cell layout information specified by a user in a second selection operation, the specific element type group indicating one or more specific program guide elements, and the specific cell layout information indicating a specific layout of cells;

the input display attribute storing unit 12 for storing the information display request, the particular detail degree, the specific element type group and the specific cell layout information received in the input unit 91 as display attributes;

an information display control unit 92 for controlling a display condition of a broadcasting program guide table according to the display attributes stored in the display attribute storing unit 12 by specifying a specific program guide element group to arrange a group of specific program guide elements indicated by the specific element type group in one particular cell for each particular broadcasting program guide; and the output unit 14.

The information display control unit 92 comprises:

the information element storing unit 15;

an information element selecting unit 93 for holding a detail correspondence table in which the correspondence of a group of program guide elements to a detail degree is listed for each of detail degrees, receiving the information display request and the particular detail degree from the storing unit 12, selecting a group of particular program guide elements corresponding to the particular detail degree in the detail correspondence table from the program guide elements of one broadcasting program guide stored in the information element storing unit 15 for each broadcasting program guide in the first selection operation, renewing the detail correspondence table to a new detail correspondence table by changing the correspondence of one group of particular program guide elements to the particular detail degree to the correspondence of one group of specific program guide elements indicated by the specific element type group to the particular detail degree, and selecting a group of specific program guide elements corresponding to the particular detail degree in the new detail correspondence table from the program guide elements of one broadcasting program guide stored in the information element storing unit 15 for each broadcasting program guide in the second selection operation;

the cell layout and guide arrangement storing unit 17;

a display information table producing unit 94 for holding a layout correspondence table in which the correspondence of one piece of cell layout information indicating one cell layout to the combination of a detail degree and program guide arrangement information is listed for each combination type, receiving the particular detail degree from the selecting unit 93, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells fitting for a particular cell layout indicated by the particular cell layout information from the cell layout and guide arrangement storing unit 17, setting the group of particular cells in the image display area, determining a plurality of particular broadcasting program guides planned to be arranged in the particular cells according to the particular program guide arrangement information, arranging one group of particular program guide elements of one particular broadcasting program guide selected in the information element selecting unit 93 in one particular cell for each particular broadcasting program guide in the first selection operation to produce a first broadcasting program guide table in which the groups of particular program guide elements are arranged in the particular cells, renewing the layout correspondence table to a new layout correspondence table by changing the correspondence of the particular cell layout information to the combination of the particular detail degree and the particular program guide arrangement information to a new correspondence of the specific cell layout information transmitted from the input unit 91 to the combination of the particular detail degree and the particular program guide arrangement information, determining a plurality of specific broadcasting program guides planned to be arranged in a plurality of specific cells arranged in the specific layout, setting the specific cells in the image display area, and arranging one group of specific program guide elements of one specific broadcasting program guide selected in the information element selecting unit 93 in one specific cell for each specific broadcasting program guide in the second selection operation to produce a second broadcasting program guide table in which the groups of specific program guide elements are arranged in the specific cells; and a display image producing unit 95 for producing a display image of the groups of particular program guide elements of the particular broadcasting program guides arranged in the particular cells according to the first broadcasting program guide table produced in the display information table producing unit 94 in the first selection operation and producing a display image of the groups of specific program guide elements of the specific broadcasting program guides arranged in the specific cells according to the second broadcasting program guide table produced in the display information table producing unit 94 in the second selection operation.

In the above configuration, the groups of particular program guide elements arranged in the particular cells are printed out or displayed as a first broadcasting program guide table in the first selection operation in the same manner as in the second embodiment.

In cases where the user does not satisfy an information volume (or an information type) of each group of particular program guide elements corresponding to the particular detail degree, the user specifies a specific program guide element group and specific cell layout information in a second selection operation. The specific program guide element group input to the input unit 91 is transmitted to the information element selecting unit 93 through the storing unit 12. In the selecting unit 93, the detail correspondence table is renewed to a new detail correspondence table by changing the correspondence of one group of particular program guide elements to the particular detail degree to the correspondence of one group of specific program guide elements indicated by the specific element type group to the particular detail degree, and one group of specific program guide elements indicated by the specific program guide element group is selected from the program guide elements of one broadcasting program guide stored in the information element storing unit 15 for each broadcasting program guide.

For example, in cases where the user inputs a specific program guide element group indicating a title and a genre to the input unit 91 in the second selection operation after the user inputs the first detail degree as the particular detail degree in the first selection operation, a new detail correspondence table shown in FIG. 25. is obtained, and information of a title and a genre code are selected as one group of specific program guide elements for each broadcasting program guide.

Thereafter, the layout correspondence table stored in the table producing unit 18 is renewed to a new layout correspondence table by changing the correspondence of the particular cell layout information to the combination of the particular detail degree and the particular program guide arrangement information to a new correspondence of the specific cell layout information transmitted from the input unit 91 to the combination of the particular detail degree and the particular program guide arrangement information, a plurality of specific broadcasting program guides planned to be arranged in a plurality of specific cells, which are arranged in a specific layout indicated by the specific cell layout information, are determined, and one group of specific program guide elements of one specific broadcasting program guide selected in the information element selecting unit 93 is arranged in one specific cell for each specific broadcasting program guide, and an image of the groups of specific program guide elements arranged in the specific cells is displayed or printed out by the output unit 14.

For example, in cases where the user inputs specific cell layout information indicating 8*8 layout of cells after the user inputs the first detail degree, a new layout correspondence table shown in FIG. 26 is produced according to the particular program guide arrangement information indicating (X=genre, Y=time) and held in the table producing unit 94, a plurality of groups of specific program guide elements are arranged in a plurality of specific cells arranged in 8*8 layout, and the groups of specific program guide elements are displayed.

Accordingly, the user can renew the detail correspondence table and the layout correspondence table to adjust an information volume (or an information type) of each group of program guide elements arranged in one cell.

(Tenth Embodiment)

In this embodiment, a plurality of groups of program guide elements of a plurality of broadcasting program guides are arranged in each cell. For example, a plurality of broadcasting program guides corresponding to a plurality of television programs to be broadcasted within a time zone of one hour are arranged in each cell.

Figure 27:
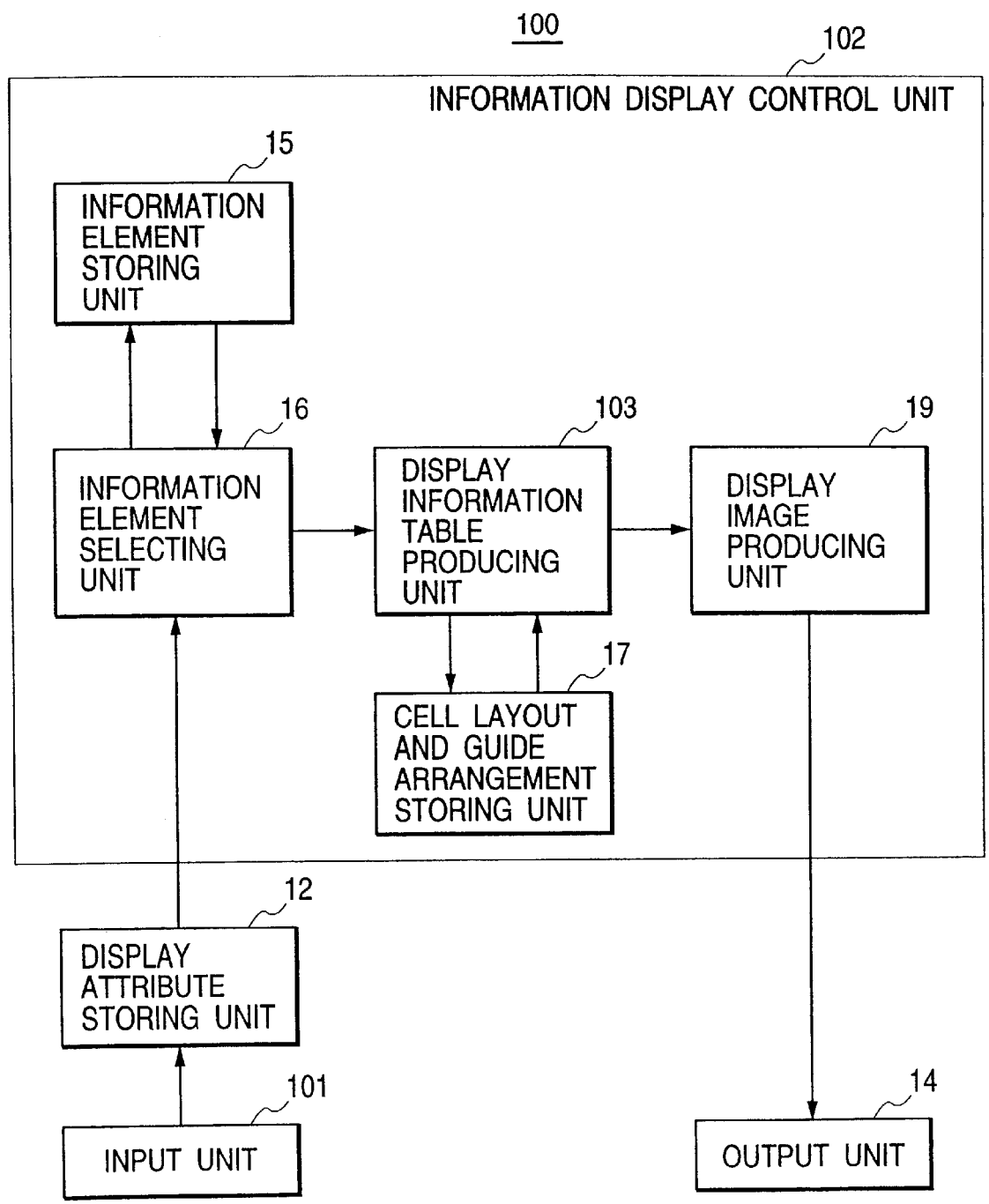
FIG. 27 is a block diagram of an information display apparatus according to a tenth embodiment of the present invention.

FIG. 27 is a block diagram of an information display apparatus according to a tenth embodiment of the present invention.

As shown in FIG. 27, an information display apparatus 100 comprises:

an input unit 101 for receiving an information display request, a particular detail degree and cell attribute information, the cell attribute information indicating an attribute condition for arranging a group of broadcasting program guides in the same cell;

the input display attribute storing unit 12 for storing the information display request, the particular detail degree and the cell attribute information received in the input unit 101 as display attributes;

an information display control unit 102 for controlling a display condition of a broadcasting program guide table according to the display attributes stored in the display attribute storing unit 12 to arrange a plurality of groups of program guide elements of a plurality of broadcasting program guides in each particular cell according to the cell attribute information; and the output unit 14.

The information display control unit 102 comprises:

the information element storing unit 15; the information element selecting unit 16; the cell layout and guide arrangement storing unit 17;

a display information table producing unit 103 for holding a layout correspondence table in which the correspondence of one piece of cell layout information indicating one cell layout to the combination of a detail degree and program guide arrangement information is listed for each combination type, receiving the particular detail degree and the cell attribute information from the selecting unit 16, receiving the particular program guide arrangement information from the cell layout and guide arrangement storing unit 17, specifying particular cell layout information corresponding to the particular detail degree and the particular program guide arrangement information by referring the layout correspondence table, classifying the broadcasting program guides transmitted from the selecting unit 16 into a plurality of groups of broadcasting program guides respectively corresponding to one cell according to the cell attribute information, detecting a group of particular cells of a particular cell layout indicated by the particular cell layout information from the cell layout and guide arrangement storing unit 17, setting the group particular cells in the image display area, determining a plurality of particular groups of broadcasting program guides to be arranged in the particular cells from the groups of broadcasting program guides, and arranging a plurality of groups of particular program guide elements of one particular group of broadcasting program guides selected in the information element selecting unit 16 in one particular cell for each particular group of broadcasting program guides to produce a broadcasting program guide table in which the particular groups of program guide elements are arranged in the particular cells; and the display image producing unit 19.

Figure 28:
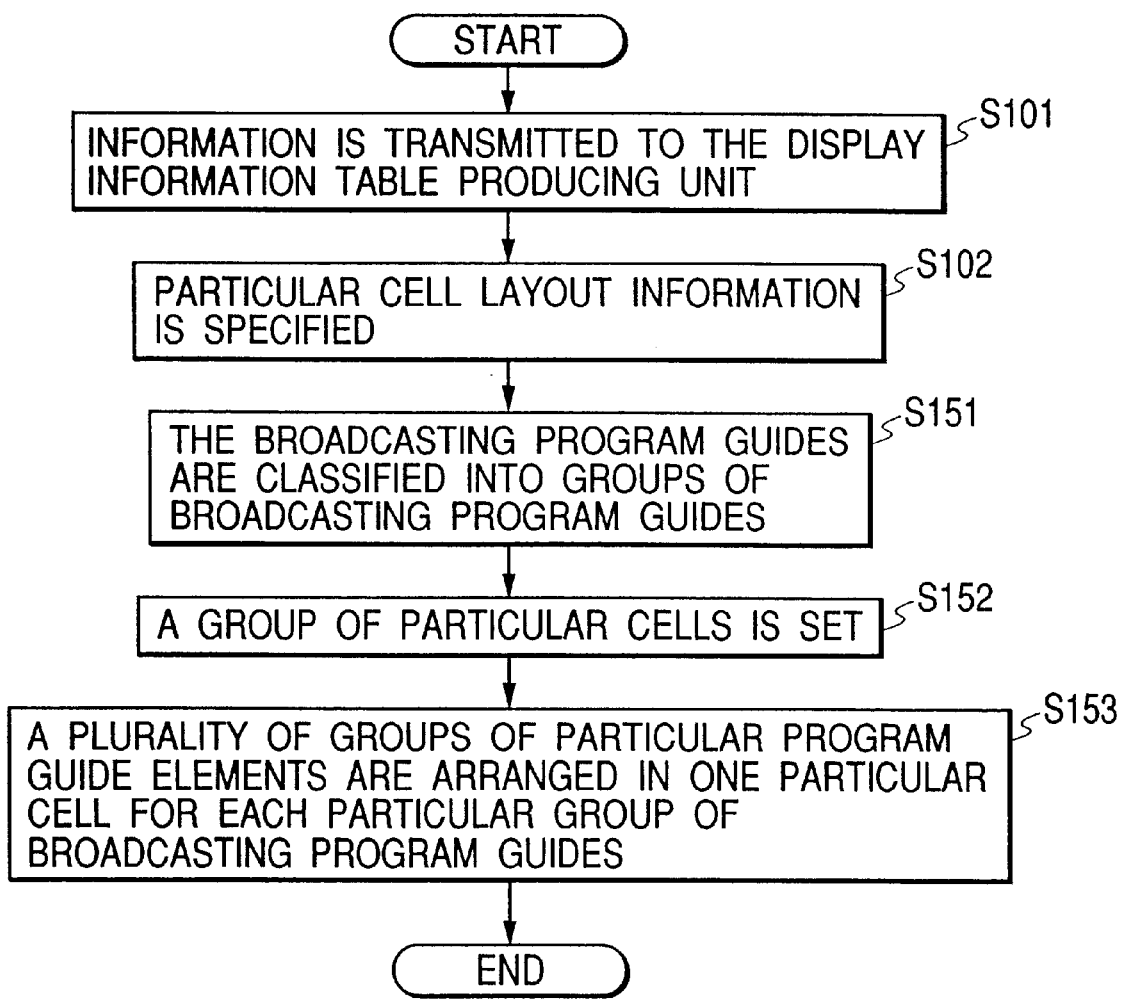
FIG. 28 is a flow chart showing the procedure performed in a display information table producing unit according to the tenth embodiment.

In the above configuration, an operation performed in the display information table producing unit 103 is described with reference to FIG. 28.

When an information display request, a particular detail degree and cell attribute information are received in the input unit 101, the selecting unit 16 is operated. For example, in cases where the particular detail degree is the first detail degree indicating a broadcasting program start time and a broadcasting program title, information of a broadcasting program start time and information of a broadcasting program title are selected as one group of particular program guide elements from the program guide elements stored in the storing unit 15 for each broadcasting program guide. Thereafter, the steps S101 and S102 are performed in the table producing unit 103 in the same manner as in the first embodiment. For example, particular program guide arrangement information indicating the television channel for the X-axis and the program broadcasting start time for the Y-axis (X=channel, Y=time) is specified.

Thereafter, the broadcasting program guides transmitted from the selecting unit 16 are classified into a plurality of groups of broadcasting program guides respectively corresponding to one cell according to the cell attribute information (step S151). For example, in cases where an attribute condition indicated by the cell attribute information is that one group of broadcasting program guides corresponding to the broadcasting program start times ranged within a time zone of one hour in the same television channel is arranged in the same particular cell for each one hour, one or more broadcasting program guides respectively corresponding to a particular broadcasting program start time ranged within a time zone of one hour are classified as one group for each one hour and each television channel.

Thereafter, a group of particular cells of a particular cell layout indicated by the particular cell layout nformation are detected from the cell layout and guide arrangement storing unit 17, and the particular cells are set in an image display area (step S152). Thereafter, a particular group of broadcasting program guides to be arranged in one particular cell is determined from the groups of broadcasting program guides for each particular cell, and a plurality of groups of particular program guide elements of one particular group of broadcasting program guides selected in the information element selecting unit 16 are arranged in one particular cell for each particular group of broadcasting program guides to produce a broadcasting program guide table (step S153). Therefore, for example, as shown in FIG. 29, a plurality of groups of particular program guide elements of one particular group of broadcasting program guides corresponding to each of television channels (CH1, CH3, CH4, CH6, CH8 and CH10) are arranged in one of particular cells arranged in a particular layout of 8 columns * 6 rows for each time zone of one hour.

In cases where the particular detail degree input by the user indicates a broadcasting program start time, a broadcasting program title and a broadcasting program subtitle, as shown in FIG. 30, a plurality of groups of particular program guide elements of one particular group of broadcasting program guides corresponding to each of television channels (CH1, CH3, CH4 and CH6) are arranged in one of particular cells arranged in a particular layout of 4 columns * 4 rows for each time zone of one hour. Also, in cases where the particular detail degree input by the user indicates a broadcasting program start time, a broadcasting program title, a broadcasting program sub-title, the cast of the broadcasting program and a program commentary, as shown in FIG. 31, a plurality of groups of particular program guide elements of one particular group of broadcasting program guides corresponding to each of television channels (CH1, CH3 and CH4) are arranged in one of particular cells arranged in a particular layout of 3 columns * 3 rows for each time zone of one hour.

Accordingly, because a group of broadcasting program guides is arranged in each cell, many broadcasting program guides can be easily compared with each other at a look. In particular, in cases where program broadcasting start times of a plurality of broadcasting program guides arranged in the same cell correspond to the same time zone, the user can easily realize the guides along the broadcasting time.

(Eleventh Embodiment)

In this embodiment, each program guide element of each broadcasting program guide is indicated by an icon, and a plurality of icons are displayed in a broadcasting program guide table. To simplify the description of technical features of the invention in the eleventh embodiment, only an icon indicating one program guide element corresponding to genre information is selected according to a lowest detail degree specified by a user for each broadcasting program guide, one or more icons of one or more broadcasting program guides corresponding to the same time zone of one hour in one television channel are displayed in each cell for each hour according to the technical features of the invention in the tenth embodiment.

Figure 32:
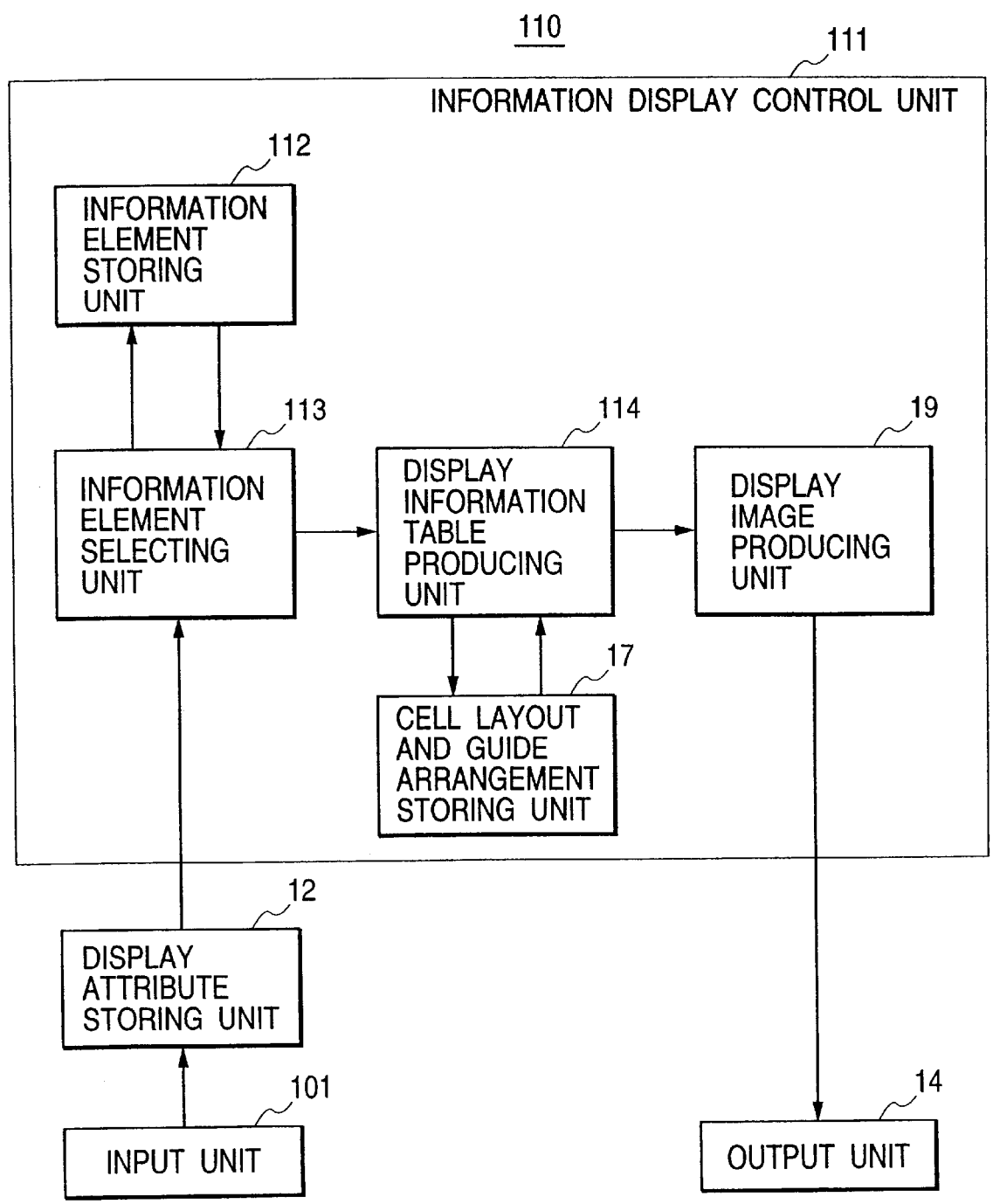
FIG. 32 is a block diagram of an information display apparatus according to an eleventh embodiment of the present invention.

FIG. 32 is a block diagram of an information display apparatus according to an eleventh embodiment of the present invention.

As shown in FIG. 32, an information display apparatus 110 comprises:

the input unit 101 for receiving an information display request, a particular detail degree indicating a lowest detail degree and cell attribute information;

the input display attribute storing unit 12 for storing the information display request, the particular detail degree and the cell attribute information received in the input unit 101 as display attributes;

an information display control unit 111 for controlling a display condition of a broadcasting program guide table according to the display attributes stored in the display attribute storing unit 12 to arrange one or more icons of a group of broadcasting program guides corresponding to the same time zone of one hour in one television channel in each particular cell according to the cell attribute information; and the output unit 14.

The information display control unit 111 comprises:

an information element storing unit 112 for storing a plurality of icons indicating a plurality of program guide elements for each broadcasting program guide;

an information element selecting unit 113 for holding a detail correspondence table in which the correspondence of a group of program guide elements to a detail degree is listed for each of detail degrees, receiving the display attributes from the storing unit 12 and selecting a particular icon indicating a particular program guide element (or a genre code) according to the particular detail degree in the detail correspondence table for each broadcasting program guide from the icons of the broadcasting program guides stored in the information element storing unit 112;

the cell layout and guide arrangement storing unit 17;

a display information table producing unit 114 for holding a layout correspondence table in which the correspondence of one piece of cell layout information indicating one cell layout to the combination of a detail degree and program guide arrangement information is listed for each combination type, receiving the particular detail degree and the cell attribute information from the selecting unit 113, receiving the particular icons of the broadcasting program guides from the selecting unit 113, receiving the particular program guide arrangement information from the cell layout and guide arrangement storing unit 17, specifying particular cell layout information corresponding to the particular detail degree and the particular program guide arrangement information by referring the layout correspondence table, detecting a group of particular cells fitting for a particular cell layout indicated by the particular cell layout information from the cell layout and guide arrangement storing unit 17, setting the group of particular cells in the image display area, determining a particular group of broadcasting program guides planned to be arranged in each particular cell according to the particular program guide arrangement information and the cell attribute information, and arranging one or more particular icons of one particular group of broadcasting program guides selected in the information element selecting unit 113 in one particular cell for each particular group of broadcasting program guides to produce a broadcasting program guide table in which the icons are arranged in the particular cells; and the display image producing unit 19.

In the above configuration, when a user inputs an information display request, a particular detail degree indicating a lowest detail degree and cell attribute information to the input unit 101, an icon corresponding to a genre code is selected in the information element selecting unit 113 according to the lowest detail degree in the detail correspondence table from the icons indicating the program guide elements of one broadcasting program guide stored in the information element storing unit 112 for each broadcasting program guide.

Figure 33:
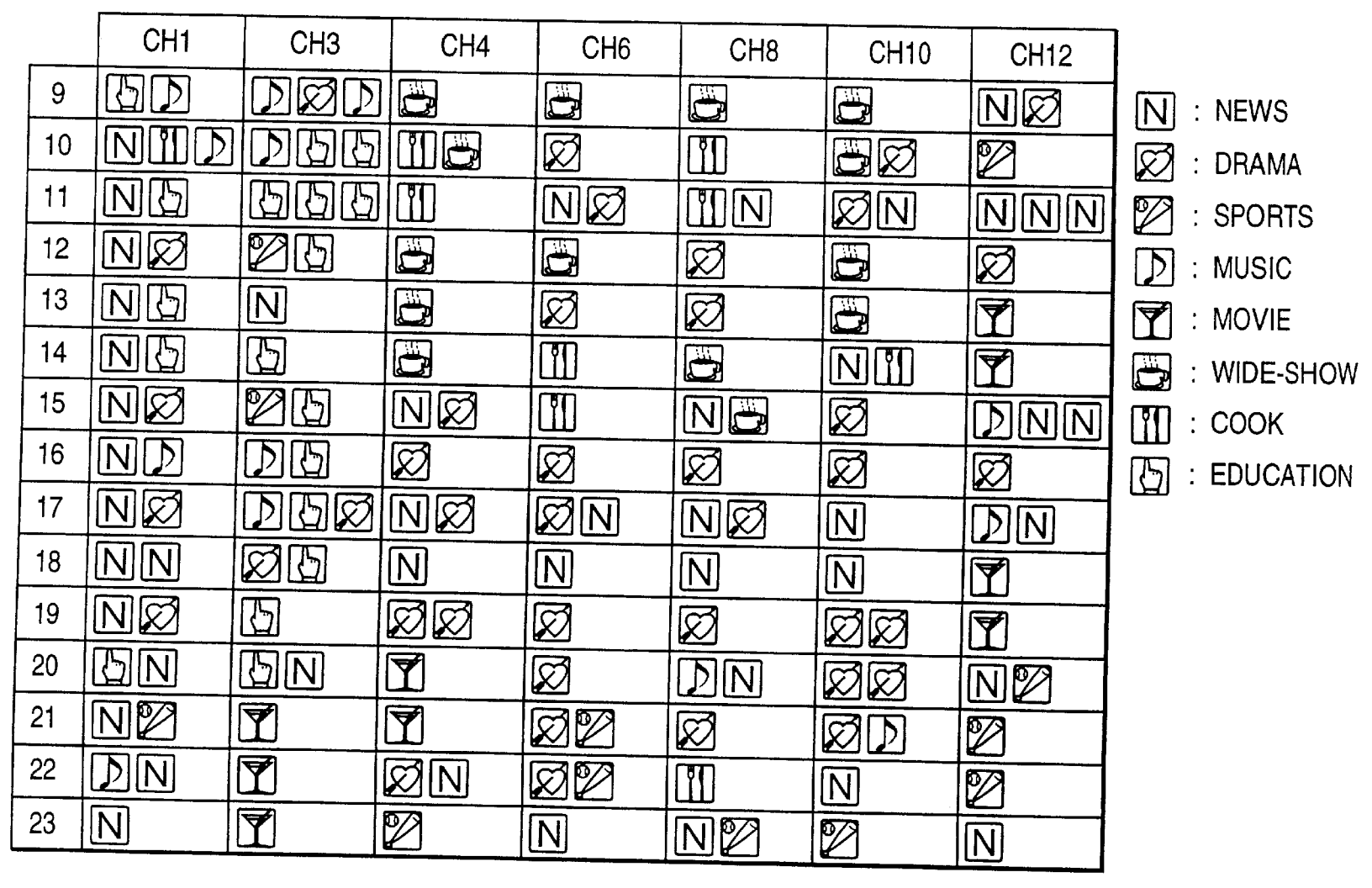

Thereafter, particular program guide arrangement information stored in the storing unit 17 is transmitted to the display information table producing unit 114. The particular program guide arrangement information indicates the television channel along the X-axis and the program broadcasting start time along the Y-axis. Thereafter, particular cell layout information corresponding to the particular detail degree and the particular program guide arrangement information is specified by referring the layout correspondence table, a group of particular cells fitting for a particular cell layout indicated by the particular cell layout information is detected from the cell layout and guide arrangement storing unit 17, and the group of particular cells are set in the image display area Thereafter, a particular group of broadcasting program guides planned to be arranged in each particular cell is determined according to the particular program guide arrangement information and the cell attribute information in the same manner as in the tenth embodiment, and one or more particular icons of one particular group of broadcasting program guides selected in the information element selecting unit 113 are arranged in one particular cell for each particular group of broadcasting program guides to produce a broadcasting program guide table in which the icons are arranged in the particular cells. Thereafter, as shown in FIG. 33, the particular icons are displayed as a broadcasting program guide table.

It is preferred that the icon corresponding to each type of genre be colored with a particular background color depending on the type of genre.

Accordingly, because an icon corresponding to each program guide element such as a genre code is arranged in a broadcasting program guide table, the user can visually recognize a plurality of broadcasting program guides at a look, and the user can immediately select a favorite broadcasting program.

Also, in cases where the icon corresponding to each type of genre is colored with a particular background color depending on the type of genre, the user can more immediately select a favorite broadcasting program.

In this embodiment, the icon corresponding to one type of genre is arranged in each particular cell. However, it is applicable that a representative photograph of a broadcasting program, a representative picture of a broadcasting program, a representative character string of a broadcasting program or a representative drawing of a broadcasting program be arranged in each particular cell. Also, it is applicable that a specific program guide element selected from among a group of program guide elements of one broadcasting program guide arranged in each particular cell be flickeringly displayed. In this case, the user can visually recognize a plurality of broadcasting program guides at a look, and the user can immediately select a favorite broadcasting program.

(Twelfth Embodiment)

In this embodiment, a plurality of cell layout restrictive conditions respectively denoting a restrictive condition for a group of cells arranged in a cell layout are prepared, one or more particular cell layout restrictive conditions are selected from among the cell layout restrictive conditions according to a particular detail degree and particular program guide arrangement information, an optimum cell size and optimum layout of particular cells are determined on condition that the particular cell layout restrictive conditions are satisfied, and one group of program guide elements of one broadcasting program guide is arranged in each of the particular cells having the optimum cell size.

Figure 34:
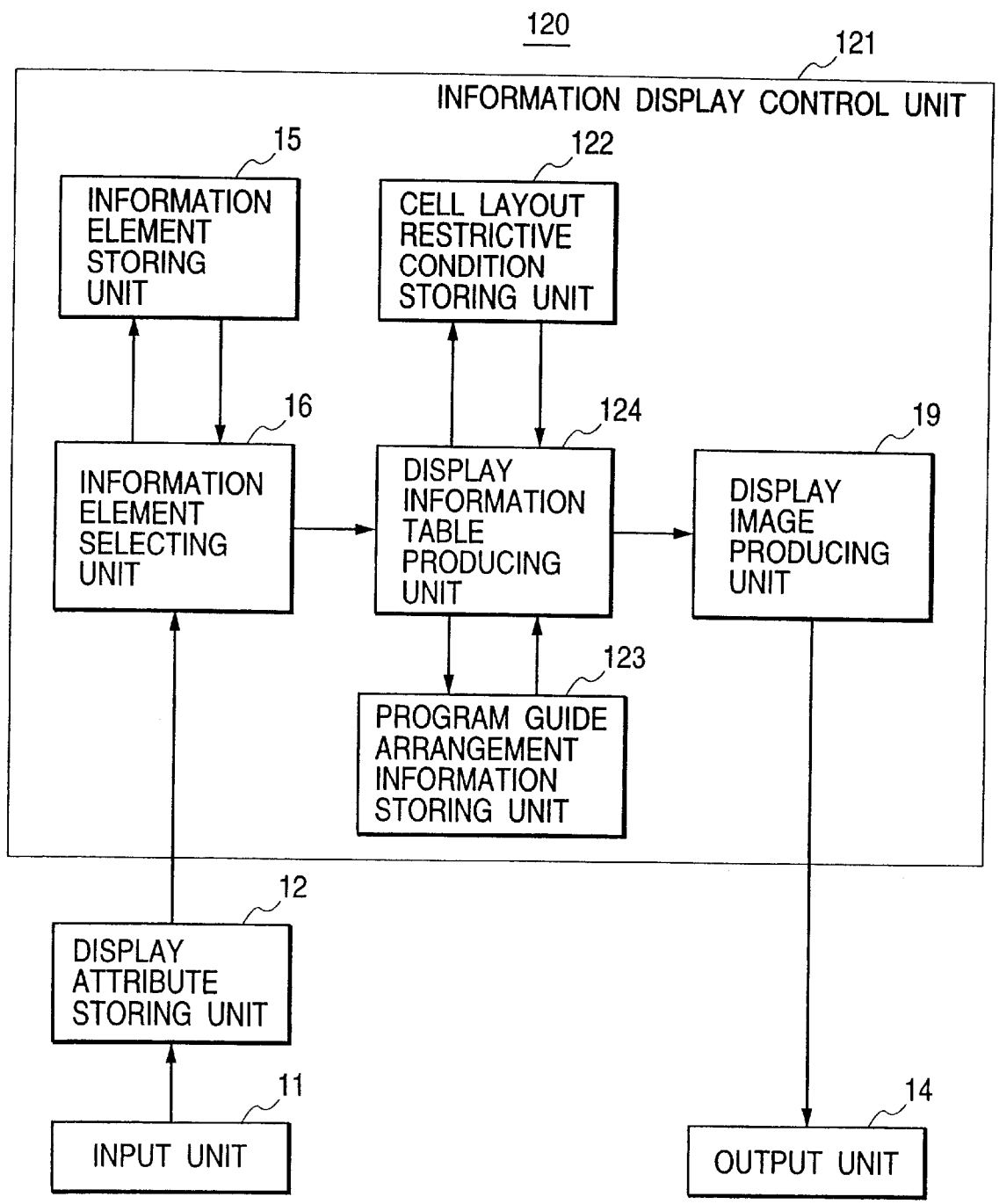
FIG. 34 is a block diagram of an information display apparatus according to a twelfth embodiment of the present invention.

FIG. 34 is a block diagram of an information display apparatus according to a twelfth embodiment of the present invention.

As shown in FIG. 34, an information display apparatus 120 comprises:

the input unit 11 for receiving an information display request and a particular detail degree;

the input display attribute storing unit 12 for storing the information display request and the particular detail degree received in the input unit 11 as display attributes;

an information display control unit 121 for controlling a display condition of a broadcasting program guide table according to the display attributes stored in the display attribute storing unit 12 by selecting one or more particular cell layout restrictive conditions according to the particular detail degree and particular program guide arrangement information, determining an optimum cell size and optimum layout of particular cells on condition that the particular cell layout restrictive conditions are satisfied and arranging one group of program guide elements of one broadcasting program guide specified according to the particular detail degree in each of the particular cells having the optimum cell size; and the output unit 14.

The information display control unit 121 comprises:

the information element storing unit 15; the information element selecting unit 16;

a cell layout restrictive condition storing unit 122 for storing a plurality of cell layout restrictive conditions respectively denoting a restrictive condition for a group of cells arranged in a cell layout, each cell layout restrictive condition indicating a ratio of a longitudinal side length to a lateral side length, a restrictive condition such that the number of characters capable to be arranged in each cell is equal to or slightly higher than the number of characters of one group of program guide elements actually arranged in each cell according to the particular detail degree, a restrictive condition such that the number of cells arranged in a broadcasting program guide table is set as large as possible or the like;

a program guide arrangement information storing unit 123 for storing a piece of particular program guide arrangement information, an image display area being partitioned into the cells by partition lines parallel to each display axis (for example, an X-axis and a Y-axis in a two-dimensional layout of the cells), and the particular program guide arrangement information indicating an attribute for a plurality of broadcasting program guides arranged along each display axis;

a display information table producing unit 124 for receiving the groups of program guide elements selected in the selecting unit 16, receiving the particular program guide arrangement-information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in a plurality of particular cells arranged in the optimum layout, and arranging the groups of particular program guide elements of the particular broadcasting program guides in the particular cells; and the display image producing unit 19.

In the above configuration, an operation performed in the display information table producing unit 124 is described with reference to FIG. 35.

Figure 35:
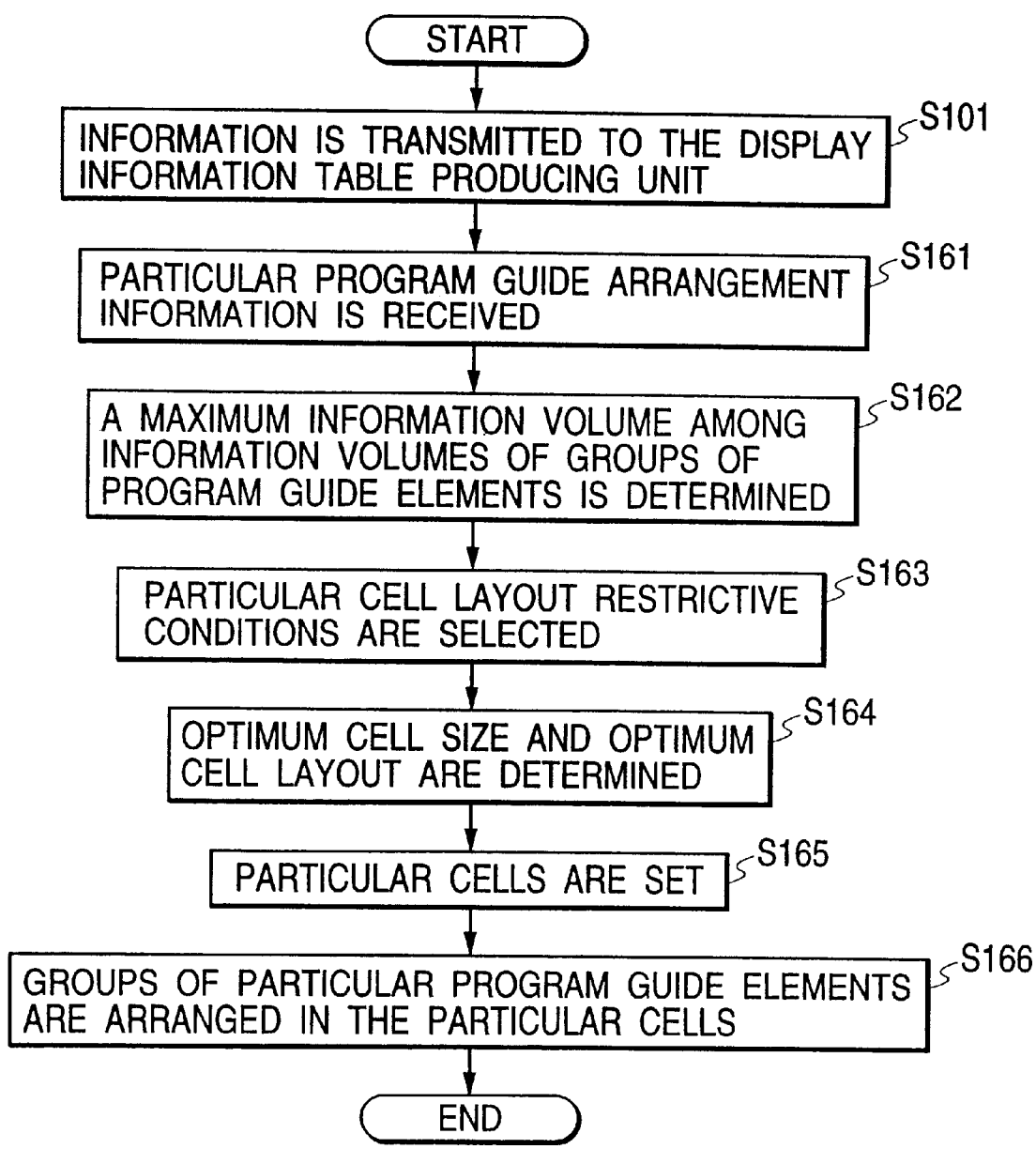
FIG. 35 is a flow chart showing the procedure performed in a display information table producing unit according to the twelfth embodiment.

FIG. 35 is a flow chart showing an operation performed in the display information table producing unit 124.

After the step S101 is performed in the same manner as in the first embodiment, particular program guide arrangement information stored in the storing unit 123 is transmitted to the display information table producing unit 124 (step S161). Thereafter, an information volume of each group of program guide elements planned to be arranged in one cell is calculated, and a maximum information volume among the information volumes is determined (step S162). For example, in cases where the particular detail degree input by the user is the first detail degree, as shown in FIG. 5, a program broadcasting start time, a title of a broadcasting program and a sub-title of the broadcasting program are selected as one group of particular program guide elements planned to be arranged in each cell, and a maximum information volume for the group of the program broadcasting start time, the title and the sub-title is calculated.

Thereafter, one or more particular cell layout restrictive conditions are selected from the cell layout restrictive conditions stored in the cell layout restrictive condition storing unit 122 according to the particular detail degree and the particular program guide arrangement information (step S163). Because each cell layout restrictive condition denotes a restrictive condition for a group of cells arranged in an image display area, an optimum cell size and optimum cell layout of the cells depend on the groups of particular program guide elements of the pieces of broadcasting program guides arranged along each display axis on the basis of the particular attribute. Therefore, the particular cell layout restrictive conditions are selected according to the particular detail degree and the particular program guide arrangement information. In particular, because a ratio of a longitudinal side length to a lateral side length in one cell can be arbitrarily set, there are many cell shapes on condition that one group of particular program guide elements having the maximum information volume can be arranged in the cell. Therefore, it is required to select one or more particular cell layout restrictive conditions for the purpose of setting an optimum cell size and optimum cell layout. In this embodiment, a restrictive condition such that a ratio of a longitudinal side length to a lateral side length in each cell is almost 1, a restrictive condition such that the number of characters capable to be arranged in each cell is equal to or slightly higher than the number of characters of one group of program guide elements actually arranged in each cell according to the particular detail degree and a restrictive condition such that the number of cells arranged in a broadcasting program guide table is set as large as possible are selected as the particular cell layout restrictive conditions.

Thereafter, an optimum cell size (a longitudinal side length and a lateral side length) and an optimum cell layout of particular cells are determined on condition that the particular cell layout restrictive conditions are satisfied and an information volume of each particular cell is equal to or slightly larger than the maximum information volume (step S164). For example, an optimum cell size and optimum layout of particular cells are determined according to a linear planning technique.

Thereafter, the particular cells are set in a broadcasting program guide table at the optimum cell layout (step S165). Thereafter, a plurality of particular broadcasting program guides planned to be arranged in the particular cells set in the optimum layout are determined, and the groups of particular program guide elements of the particular broadcasting program guides are arranged in the particular cells (step S166).

Therefore, a display image of the groups of particular program guide elements of the particular broadcasting program guides is obtained as shown in FIG. 8. Also, in cases where the user changes the particular detail degree to the second detail degree, an optimum cell size and optimum layout of particular cells are renewed in the display information table producing unit 124, and a display image of the groups of particular program guide elements of the particular broadcasting program guides is obtained as shown in FIG. 9.

Accordingly, because one or more particular cell layout restrictive conditions are selected according to the particular detail degree and the particular program guide arrangement information to determine an optimum cell size and optimum layout of particular cells on condition that the particular cell layout restrictive conditions are satisfied, the number of cells arranged in a broadcasting program guide table is set as large as possible, and the user can compare many broadcasting program guides at a look.

(Thirteenth Embodiment)

In this embodiment, a user selects particular program guide arrangement information from pieces of program guide arrangement information displayed (the technical features of the second embodiment), and an optimum cell size and optimum layout of particular cells are determined on condition that one or more particular cell layout restrictive conditions are satisfied (the technical features of the twelfth embodiment).

Figure 36:
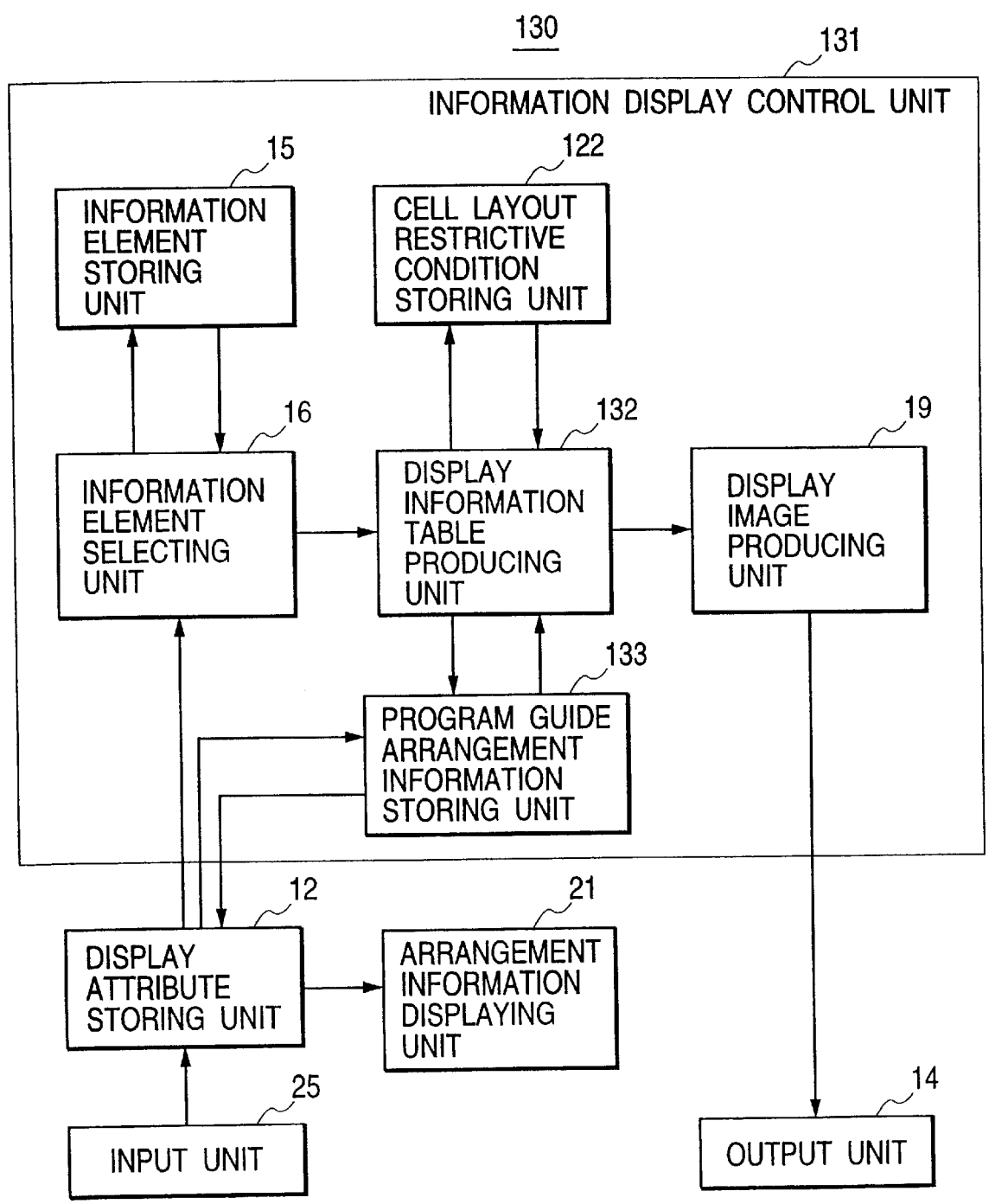
FIG. 36 is a block diagram of an information display apparatus according to a thirteenth embodiment of the present invention.

FIG. 36 is a block diagram of an information display apparatus according to a thirteenth embodiment of the present invention.

As shown in FIG. 36, an information display apparatus 130 comprises:

the input unit 25 for receiving an information display request and a particular detail degree and receiving a piece of particular program guide arrangement information;

the arrangement information displaying unit 21; and the input display attribute storing unit 12;

an information display control unit 131 for controlling a display condition of a broadcasting program guide table according to the display attributes stored in the display attribute storing unit 12 by making the user select the particular program guide arrangement information, selecting one or more particular cell layout restrictive conditions according to the particular detail degree and the particular program guide arrangement information, determining an optimum cell size and optimum layout of particular cells on condition that the particular cell layout restrictive conditions are satisfied and arranging one group of program guide elements of one broadcasting program guide specified according to the particular detail degree in each of the particular cells having the optimum cell size; and the output unit 14.

The information display control unit 131 comprises:

the information element storing unit 15; the information element selecting unit 16; the cell layout restrictive condition storing unit 122;

a program guide arrangement information storing unit 133 for storing pieces of program guide arrangement information and outputting the pieces of program guide arrangement information to the arrangement information displaying unit 21 when the information display request is received in the input unit 25, an image display area being partitioned into the cells by partition lines parallel to each display axis (for example, partition lines parallel to an X-axis and partition lines parallel to a Y-axis in a two-dimensional layout of the cells), and the pieces of program guide arrangement information respectively indicating an attribute for a plurality of broadcasting program guides arranged along each display axis;

a display information table producing unit 132 for receiving the groups of particular program guide elements from the information element selecting unit 16, receiving the particular detail degree and the particular program guide arrangement information from the information element selecting unit 16, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in a plurality of particular cells arranged in the optimum layout, and arranging the groups of particular program guide elements of the particular broadcasting program guides in the particular cells; and the display image producing unit 19.

In the above configuration, the particular detail degree input by a user and the particular program guide arrangement information selected by the user are transmitted to the display information table producing unit 132 in the same manner as in the second embodiment. Thereafter, an optimum cell size (a longitudinal side length and a lateral side length) and an optimum layout of particular cells are determined in the table producing unit 132 in the same manner as in the twelfth embodiment.

Accordingly, because the particular program guide arrangement information is selected by the user and because one or more particular cell layout restrictive conditions are selected according to the particular detail degree and the particular program guide arrangement information to determine an optimum cell size and optimum layout of particular cells on condition that the particular cell layout restrictive conditions are satisfied, the number of cells arranged in a broadcasting program guide table is set as large as possible, and the user can specify the arrangement of a plurality of broadcasting program guides of the particular cells along each axis according to his intention. Therefore, the user can easily check a plurality of broadcasting program guides.

(Fourteenth Embodiment)

In this embodiment, the user specify a piece of specific program guide arrangement information indicating a specific attribute for a plurality of broadcasting program guides arranged along each display axis (technical features of the third embodiment), and an optimum cell size and optimum layout of particular cells are determined on condition that one or more particular cell layout restrictive conditions are satisfied (the technical features of the twelfth embodiment).

Figure 37:
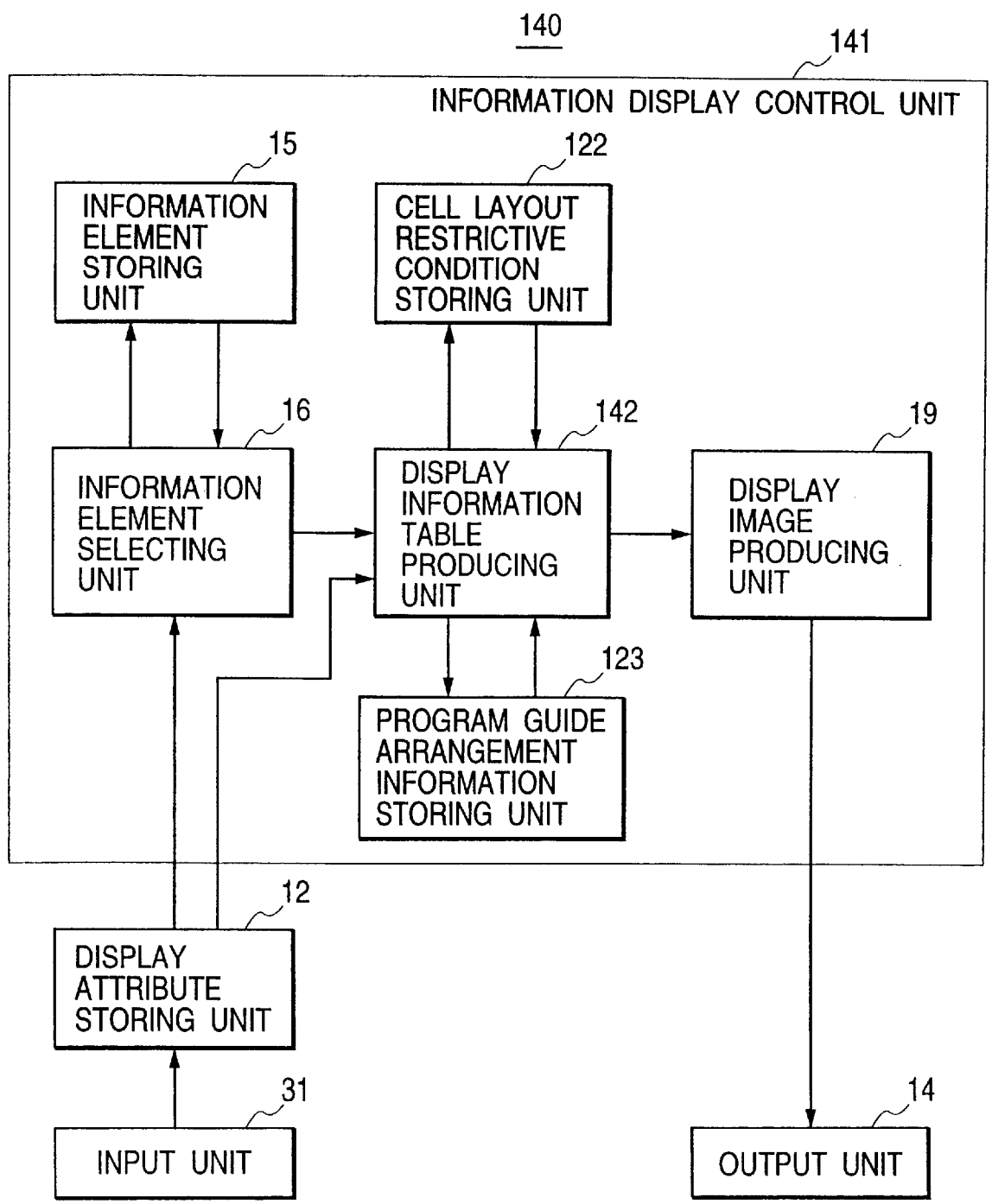
FIG. 37 is a block diagram of an information display apparatus according to a fourteenth embodiment of the present invention.

FIG. 37 is a block diagram of an information display apparatus according to a fourteenth embodiment of the present invention.

As shown in FIG. 37, an information display apparatus 140 comprises:

the input unit 31 for receiving an information display request, a particular detail degree and specific program guide arrangement information, the specific program guide arrangement information indicating one or more specific attributes for a plurality of broadcasting program guides arranged along one or more display axes such as (X=channel, Y=time), (X=genre, Y=time) or the like;

the input display attribute storing unit 12;

an information display control unit 141 for controlling a display condition of a broadcasting program guide table according to the display attributes stored in the display attribute storing unit 12 by directly specifying the specific program guide arrangement information, selecting one or more particular cell layout restrictive conditions according to the particular detail degree and the specific program guide arrangement information, determining an optimum cell size and optimum layout of particular cells on condition that the particular cell layout restrictive conditions are satisfied and arranging one group of program guide elements of one broadcasting program guide specified according to the particular detail degree in each of the particular cells having the optimum cell size; and the output unit 14.

The information display control unit 141 comprises:

the information element storing unit 15; the information element selecting unit 16; the program guide arrangement information storing unit 123; the cell layout restrictive condition storing unit 122;

a display information table producing unit 142 for receiving the groups of particular program guide elements from the information element selecting unit 16, receiving the particular detail degree from the information element selecting unit 16, receiving the specific program guide arrangement information from the display attribute storing unit 12, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the specific program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in a plurality of particular cells arranged in the optimum layout, and arranging the groups of particular program guide elements of the particular broadcasting program guides in the particular cells; and the display image producing unit 19.

In the above configuration, the particular detail degree and the specific program guide arrangement information input by a user are transmitted to the display information table producing unit 142 in the same manner as in the third embodiment. Thereafter, an optimum cell size (a longitudinal side length and a lateral side length) and an optimum layout of particular cells are determined in the table producing unit 132 in the same manner as in the twelfth embodiment.

Accordingly, because the specific program guide arrangement information is directly specified by the user and because one or more particular cell layout restrictive conditions are selected according to the particular detail degree and the specific program guide arrangement information to determine an optimum cell size and optimum layout of particular cells on condition that the particular cell layout restrictive conditions are satisfied, the number of cells arranged in a broadcasting program guide table is set as large as possible, and the user can reliably specify the arrangement of a plurality of broadcasting program guides of the particular cells along each axis according to his intention. Therefore, the user can easily check a plurality of broadcasting program guides.

(Fifteenth Embodiment)

In this embodiment, the particular guide arrangement information stored in a program guide arrangement information storing unit indicates not only a particular attribute of each display axis to arrange a plurality of broadcasting program guides along each display axis on the basis of the particular attribute but also a display unit of one specific program guide element adopted as one attribute of one display axis, and one or more broadcasting program guides corresponding to one display unit of the attribute are arranged in one or more cells for each display unit along the display axis. For example, in cases where the display unit of time information such as information of the program broadcasting start time is set to one hour along the Y-axis, one or more broadcasting program guides corresponding to one time zone of one hour are arranged in one or more cells for each time zone along the Y-axis in an image display area.

Figure 38:
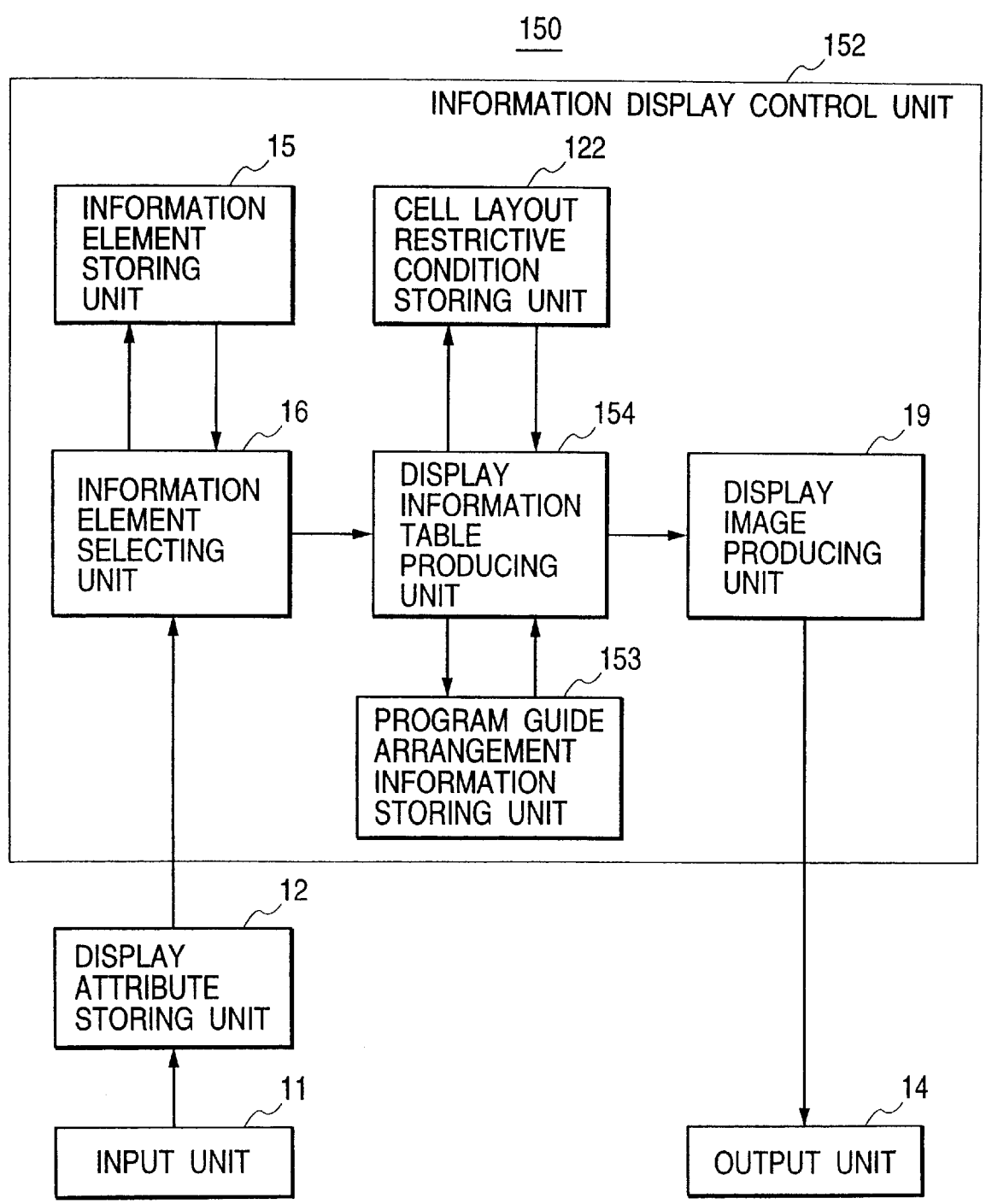
FIG. 38 is a block diagram of an information display apparatus according to a fifteenth embodiment of the present invention.

FIG. 38 is a block diagram of an information display apparatus according to a fifteenth embodiment of the present invention.

As shown in FIG. 38, an information display apparatus 150 comprises:

the input unit 11 for receiving an information display request and a particular detail degree;

the input display attribute storing unit 12;

an information display control unit 152 for controlling a display condition of a broadcasting program guide table according to the display attributes stored in the display attribute storing unit 12 by specifying a display unit of one program guide element adopted as an attribute along each display axis, selecting one or more particular cell layout restrictive conditions according to the particular detail degree and the particular program guide arrangement information, determining an optimum cell size and optimum layout of particular cells on condition that the particular cell layout restrictive conditions are satisfied and arranging one group of program guide elements of one broadcasting program guide specified according to the particular detail degree with the display unit in each of the particular cells having the optimum cell size; and the output unit 14.

The information display control unit 152 comprises:

the information element storing unit 15; the information element selecting unit 16; the cell layout restrictive condition storing unit 122;

a program guide arrangement information storing unit 153 for storing a piece of particular program guide arrangement information, an image display area being partitioned into the cells by partition lines parallel to each display axis (for example, an X-axis and a Y-axis in a two-dimensional layout of the cells), the particular program guide arrangement information indicating an attribute for a plurality of broadcasting program guides arranged along each display axis, and the particular program guide arrangement information indicating a display unit of the particular attribute of one particular display axis;

a display information table producing unit 154 for receiving the groups of program guide elements selected in the selecting unit 16, receiving the particular program guide arrangement information from the program guide arrangement information storing unit 153, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining one or more particular broadcasting program guides corresponding to one display unit of the particular attribute indicated by the particular program guide arrangement information for each display unit, and arranging one or more groups of particular program guide elements of the particular broadcasting program guides in one or more particular cells for each display unit along the particular display axis; and the display image producing unit 19.

In the above configuration, an operation performed in the display information table producing unit 154 is described with reference to FIGS. 39 and 40.

FIG. 39 shows display units of a plurality of program guide elements indicated by pieces of program guide arrangement information as an example.

As shown in FIG. 39, in cases where date information is adopted as an attribute of one display axis, a plurality of broadcasting program guides are arranged with a display unit of one day. For example, one or more broadcasting program guides corresponding to the same day are arranged in one or more cells of an image display area for each day. In cases where day-of-week information is adopted as an attribute of one display axis, a plurality of broadcasting program guides are arranged with a display unit of one week. For example, one or more broadcasting program guides corresponding to the same day (Sunday, Monday, --, or Saturday) of the week are arranged in one or more cells of an image display area for each day of the week. In cases where information of the program broadcasting start time is adopted as an attribute of one display axis, a plurality of broadcasting program guides are arranged with a display unit of one hour. For example, one or more broadcasting program guides corresponding to the same time zone of one hour are arranged in one or more cells of an image display area for each time zone. In cases where channel information is adopted as an attribute of one display axis, a plurality of broadcasting program guides are arranged with a display unit of one television channel. For example, one or more broadcasting program guides corresponding to the same television channel are arranged in one or more cells of an image display area for each television channel. In cases where genre information is adopted as an attribute of one display axis, a plurality of broadcasting program guides are arranged with a display unit of one type of genre. For example, one or more broadcasting program guides corresponding to the same type of genre are arranged in one or more cells of an image display area for each type of genre.

FIG. 40 is a flow chart showing an operation performed in the display information table producing unit 154 according to the fifteenth embodiment.

After the step S101 is performed in the same manner as in the first embodiment, particular program guide arrangement information stored in the storing unit 153 is transmitted to the display information table producing unit 154 (step S171). For example, the particular program guide arrangement information indicates the television channel for the X-axis and the program broadcasting start time for the Y-axis (X=channel, Y=time), and the particular program guide arrangement information indicates a display unit set to one hour to arrange one or more broadcasting program guides corresponding to the same time zone of one hour along the Y-axis for each time zone.

Thereafter, an information volume of one group of program guide elements of one broadcasting program guide planned to be arranged in one cell is calculated for each broadcasting program guide, and a maximum information volume among the information volumes is determined (step S172). For example, in cases where the particular detail degree input by the user corresponds to the program broadcasting start time information and the title information, the program broadcasting start time and title of one broadcasting program guide are selected as one group of particular program guide elements planned to be arranged in one cell for each broadcasting program guide, and a maximum information volume for the broadcasting program guides is calculated.

Thereafter, one or more particular cell layout restrictive conditions are selected from the cell layout restrictive conditions stored in the cell layout restrictive condition storing unit 122 according to the particular detail degree and the particular program guide arrangement information (step S173). For example, a restrictive condition such that a ratio of a longitudinal side length to a lateral side length in each cell is almost 1 is selected as one particular cell layout restrictive condition to arrange a plurality of particular cells in an image display area in a superior visible condition. Also, because a display unit along the Y-axis is set to one hour, it is required to set the number of blank cells, in which any broadcasting program guide is not arranged, as small as possible, so that a restrictive condition such that the number of blank cells is set as small as possible is selected as one particular cell layout restrictive condition. Also, a restrictive condition such that the number of characters capable to be arranged in each cell is equal to or slightly higher than the number of characters of one group of program guide elements actually arranged in each cell according to the particular detail degree and a restrictive condition such that the number of cells arranged in a broadcasting program guide table is set as large as possible are selected as particular cell layout restrictive conditions.

Thereafter, an optimum cell size (a longitudinal side length and a lateral side length) and an optimum cell layout of particular cells are determined according to a linear planning technique on condition that the particular cell layout restrictive conditions are satisfied and an information volume of each particular cell is equal to or slightly larger than the maximum information volume (step S174). For example, an optimum layout of 7 columns * 4 rows cells is obtained.

Thereafter, the particular cells are set in a broadcasting program guide table (step S175). Thereafter, a particular group of broadcasting program guides corresponding to one display unit is determined for each display unit, and a plurality of groups of particular program guide elements of one particular group of broadcasting program guides are arranged in one group of particular cells corresponding to one display unit for each display unit (step S176). Therefore, a broadcasting program guide table shown in FIG. 41 is displayed.

Also, the user changes the particular detail degree to a specific detail degree corresponding to the time information, the title information, the sub-title information and the cast information, an optimum layout of 4 columns * 4 rows cells is determined, and a broadcasting program guide table shown in FIG. 42 is displayed. Also, the user changes the particular detail degree to a specific detail degree corresponding to the time information, the title information, the sub-title information, the cast information and the commentary information, an optimum layout of 4 columns * 2 rows cells is determined, and a broadcasting program guide table shown in FIG. 43 is displayed.

Accordingly, because a display unit of one specific program guide element adopted as the attribute of each display axis is set, a plurality of broadcasting program guides can be regularly arranged in a superior visible condition.

(Sixteenth Embodiment)

In this embodiment, a volume of information capable to be arranged in each cell is set to 80% a maximum information volume of one group of program guide elements planned to be arranged in each cell to set a blank space of each cell as small as possible. Therefore, there is a case that a part of information of one group of program guide elements is arranged in one cell.

Figure 44:
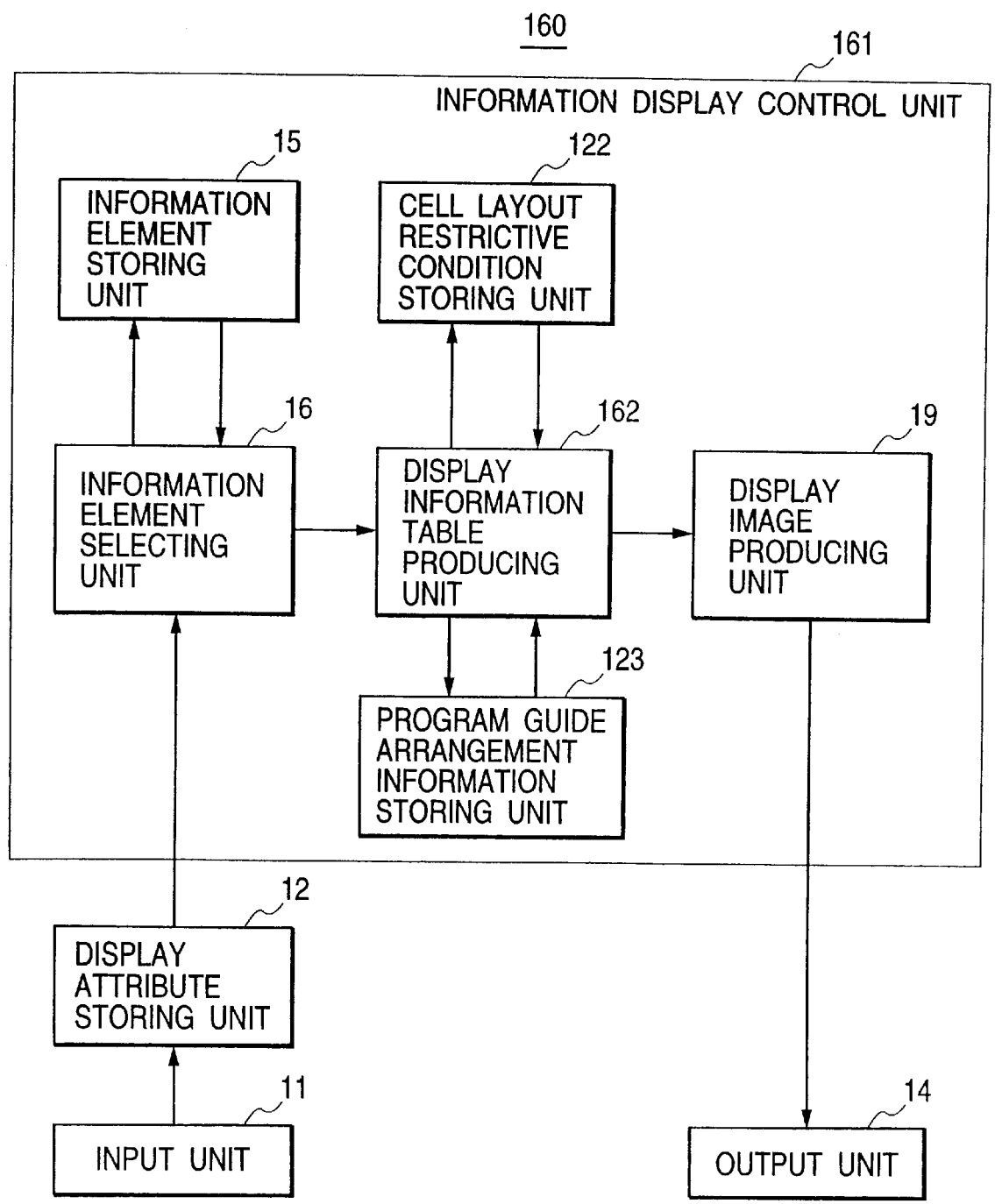
FIG. 44 is a block diagram of an information display apparatus according to a sixteenth embodiment of the present invention.

FIG. 44 is a block diagram of an information display apparatus according to a sixteenth embodiment of the present invention.

As shown in FIG. 44, an information display apparatus 160 comprises:

the input unit 11 for receiving an information display request and a particular detail degree;

the input display attribute storing unit 12;

an information display control unit 161 for controlling a display condition of a broadcasting program guide table according to the display attributes stored in the display attribute storing unit 12 by setting a volume of information capable to be arranged in each cell to 80% a maximum information volume of one group of program guide elements planned to be arranged in each cell, selecting one or more particular cell layout restrictive conditions according to the particular detail degree and the particular program guide arrangement information, determining an optimum cell size and optimum layout of particular cells on condition that the particular cell layout restrictive conditions are satisfied and arranging one group of program guide elements of one broadcasting program guide specified according to the particular detail degree in each of the particular cells having the optimum cell size; and the output unit 14.

The information display control unit 161 comprises:

the information element storing unit 15; the information element selecting unit 16; the cell layout restrictive condition storing unit 122; the program guide arrangement information storing unit 123;

a display information table producing unit 162 for receiving the groups of program guide elements selected in the selecting unit 16, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is almost 80% the maximum information volume, setting the particular cells in a broadcasting program guide table, determining a plurality of particular broadcasting program guides planned to be arranged in a plurality of particular cells arranged in the optimum layout, and arranging the groups of particular program guide elements of the particular broadcasting program guides in the particular cells; and the display image producing unit 19.

In the above configuration, an operation performed in the display information table producing unit 162 is described with reference to FIG. 45.

Figure 45:
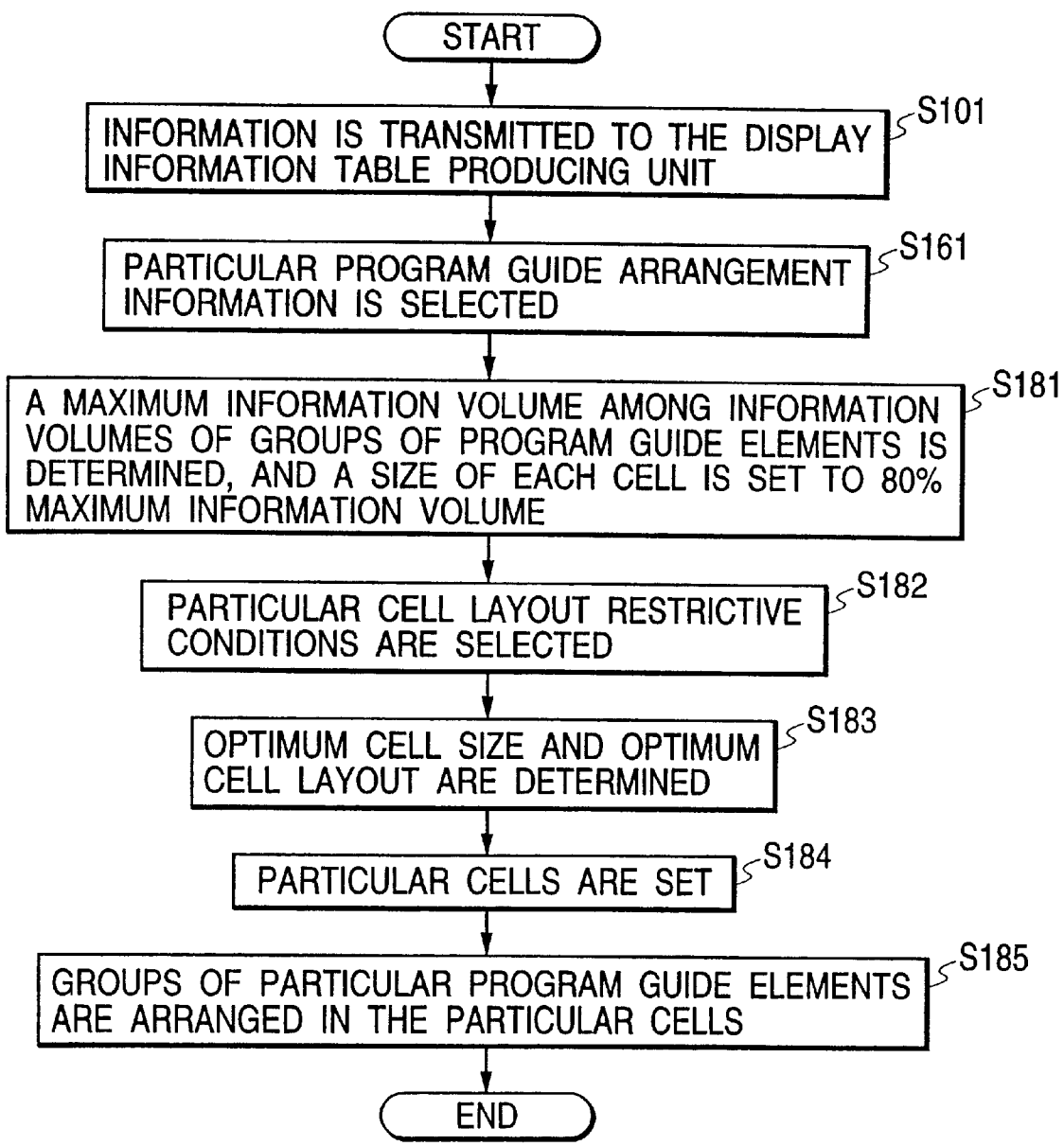
FIG. 45 is a flow chart showing the procedure performed in a display information table producing unit according to the sixteenth embodiment.

FIG. 45 is a flow chart showing an operation performed in the display information table producing unit 162.

After the steps S101 and S161 are performed in the same manner as in the twelfth embodiment, an information volume of each group of program guide elements planned to be arranged in one cell is calculated, a maximum information volume among the information volumes is determined, and a size of each cell is determined to set an information volume of each cell to almost 80% the maximum information volume (step S181). Assuming that an information volume of each cell is set to almost the maximum information volume, the sum of blank spaces occurring in a plurality of cells becomes large, so that an image display area cannot be efficiently used to display information of a plurality of broadcasting program guides as large as possible. Therefore, in this embodiment, an information volume of each cell is set to almost 80% the maximum information volume.

Thereafter, one or more particular cell layout restrictive conditions are selected from the cell layout restrictive conditions stored in the cell layout restrictive condition storing unit 122 according to the particular detail degree and the particular program guide arrangement information (step S182). For example, a restrictive condition such that a ratio of a longitudinal side length to a lateral side length in each cell is almost 1, a restrictive condition such that the number of characters capable to be arranged in each cell is equal to or slightly higher than the number of characters of one group of program guide elements actually arranged in each cell according to the particular detail degree and a restrictive condition such that the number of cells arranged in a broadcasting program guide table is set as large as possible are selected as the particular cell layout restrictive conditions.

Thereafter, an optimum cell size (a longitudinal side length and a lateral side length) and an optimum cell layout of particular cells are determined according to a linear planning technique on condition that the particular cell layout restrictive conditions are satisfied and an information volume of each particular cell is almost 80% the maximum information volume (step S183).

Thereafter, the particular cells are set in a broadcasting program guide table (step S184). Thereafter, a plurality of particular broadcasting program guides planned to be arranged in the particular cells set in the optimum layout are determined, and the groups of particular program guide elements of the particular broadcasting program guides are arranged in the particular cells (step S185).

Therefore, a display image of the groups of particular program guide elements of the particular broadcasting program guides is obtained as shown in FIG. 46. Also, in cases where the user changes the particular detail degree to the second detail degree, an optimum cell size and optimum layout of particular cells are renewed in the display information table producing unit 162.

Accordingly, because an information volume of each particular cell is set to almost 80% the maximum information volume, an area of each particular cell can be effectively used to arrange one broadcasting program guide, and the number of particular cells in the broadcasting program guide table can be increased because the size of each particular cell is reduced.

(Seventeenth Embodiment)

In this embodiment, in cases where a particular cell, in which a group of program guide elements of one broadcasting program guide is arranged, has a blank space, another program guide element of the broadcasting program guide is added to the group of particular program guide elements to fill the blank space with the program guide element (technical features of the fourth embodiment). Also, an optimum cell size and optimum layout of particular cells are determined on condition that one or more particular cell layout restrictive conditions are satisfied (the technical features of the twelfth embodiment).

Figure 47:
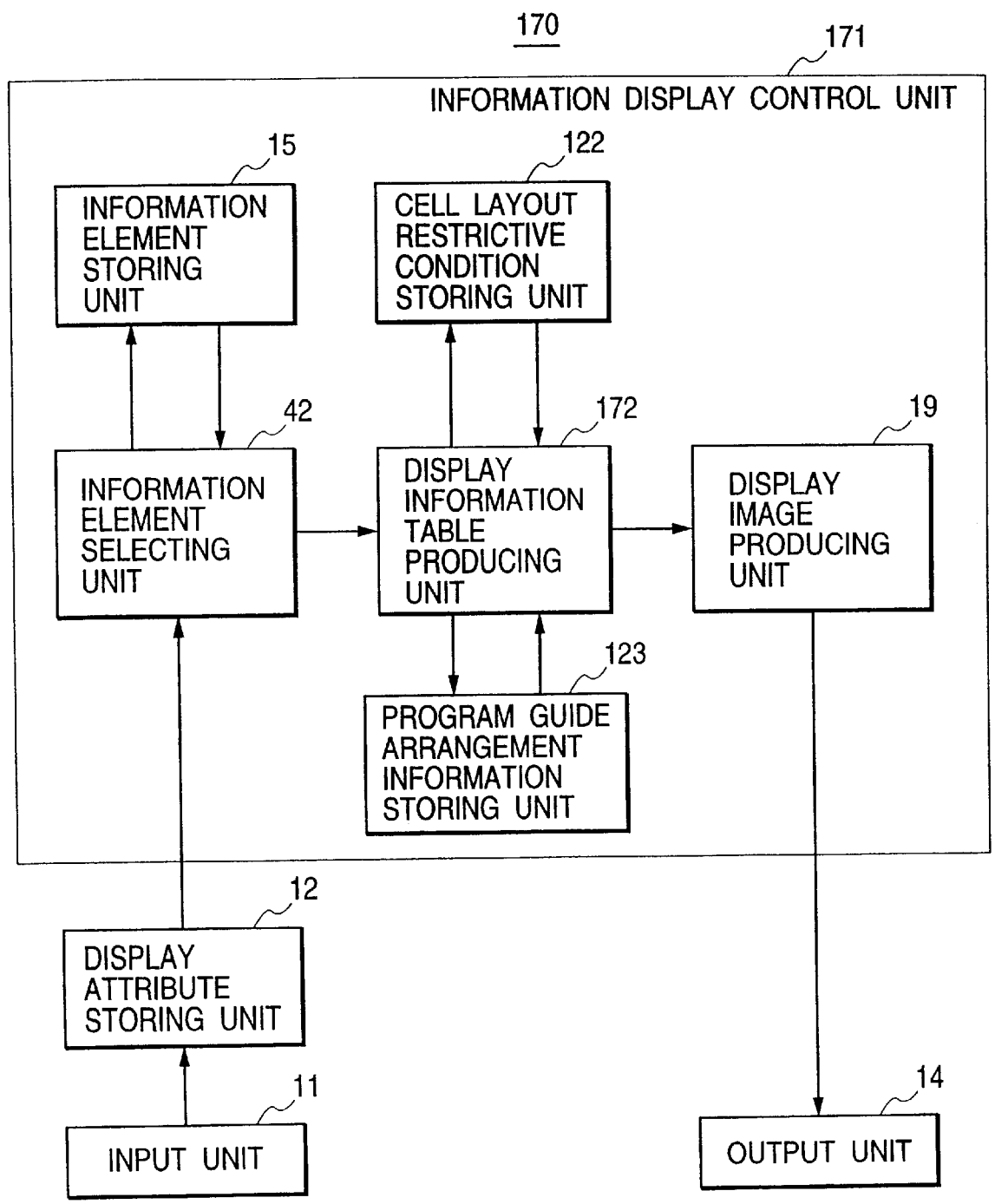
FIG. 47 is a block diagram of an information display apparatus according to a seventeenth embodiment of the present invention.

FIG. 47 is a block diagram of an information display apparatus according to a seventeenth embodiment of the present invention.

As shown in FIG. 47, an information display apparatus 170 comprises:

the input unit 11 for receiving an information display request and a particular detail degree;

the input display attribute storing unit 12;

an information display control unit 171 for controlling a display condition of a broadcasting program guide table according to the display attributes stored in the display attribute storing unit 12 by filling a blank space with information, selecting one or more particular cell layout restrictive conditions according to the particular detail degree and the particular program guide arrangement information, determining an optimum cell size and optimum layout of particular cells on condition that the particular cell layout restrictive conditions are satisfied and arranging one group of particular program guide elements of one broadcasting program guide specified according to the particular detail degree in each of the particular cells having the optimum cell size; and the output unit 14.

The information display control unit 171 comprises:

the information element storing unit 15; the information element selecting unit 42; the cell layout restrictive condition storing unit 122; the program guide arrangement information storing unit 123;

a display information table producing unit 172 for receiving the groups of program guide elements selected in the selecting unit 16, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, determining a plurality of particular broadcasting program guides planned to be arranged in a plurality of particular cells arranged in the optimum layout, setting the particular cells in a broadcasting program guide table, arranging the groups of particular program guide elements of the particular broadcasting program guides in the particular cells, detecting a blank space existing in one particular cell identified by a cell identification number, in which one group of particular program guide elements of one particular broadcasting program guide identified by a field name is arranged, transmitting the blank information composed of a size of the blank space, the cell identification number and the field name to the information element selecting unit 42 to fill the blank space with another program guide element of the particular broadcasting program guide and producing a broadcasting program guide table in which the groups of particular program guide elements including the program guide element added to fill the blank space are arranged in the particular cells; and the display image producing unit 19.

In the above configuration, an operation performed in the display information table producing unit 172 is described with reference to FIG. 48.

Figure 48:
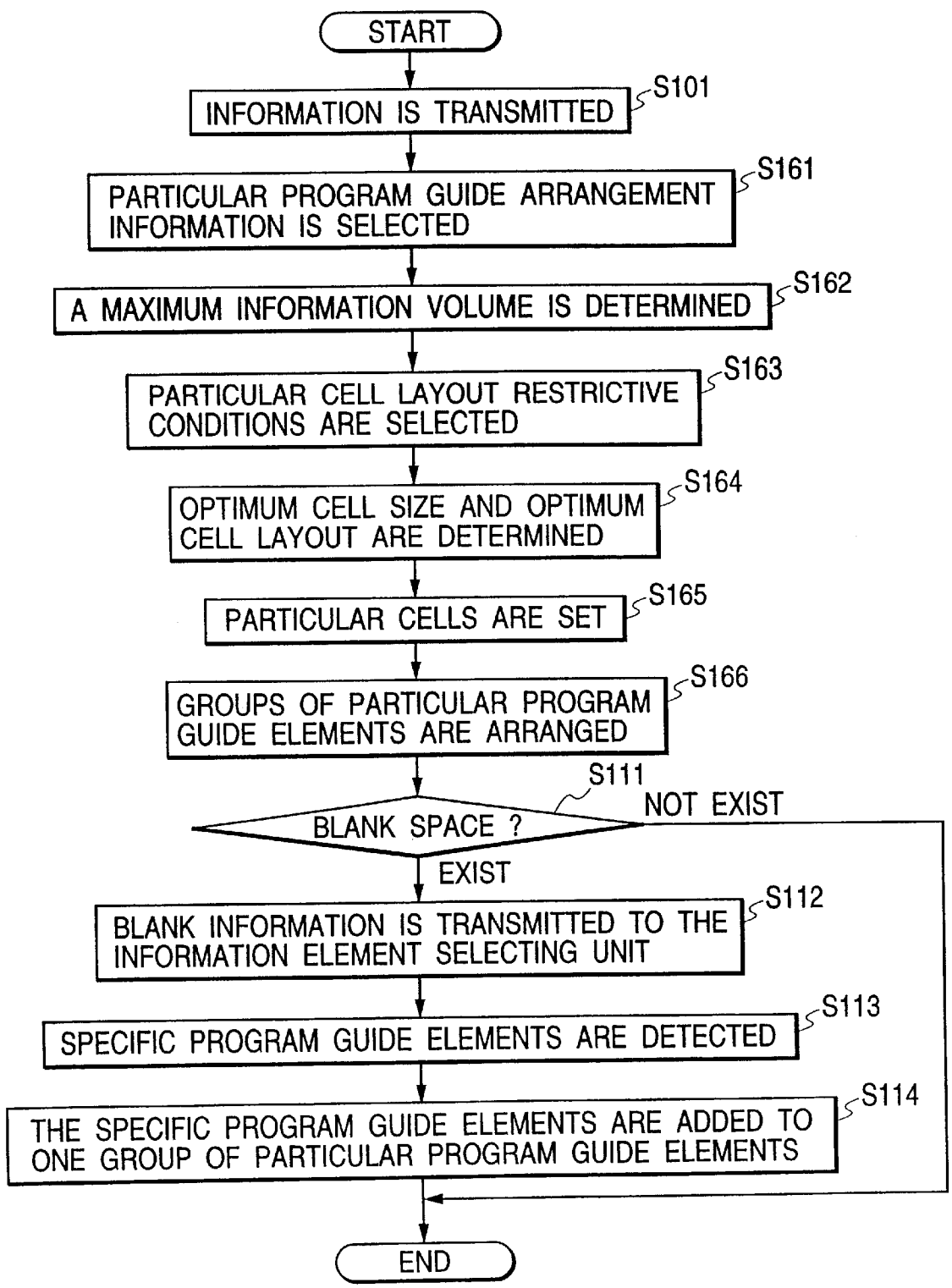
FIG. 48 is a flow chart showing the procedure performed in a display information table producing unit according to the seventeenth embodiment.

FIG. 48 is a flow chart showing an operation performed in the display information table producing unit 172.

After the steps S101 and S161 to S166 are performed in the same manner as in the twelfth embodiment, the steps S111 to S114 are performed in the same manner as in the fourteenth embodiment.

Accordingly, an optimum cell size and optimum layout of particular cells can be determined, and all spaces of the particular cells can be filled with information of the broadcasting program guides.

(Eighteenth Embodiment)

In this embodiment, one type of specific program guide element is replaced with a simplified image information element such as an icon or a background color to reduce a space required to display the type of specific program guide element (technical features of the fifth embodiment), and an optimum cell size and optimum layout of particular cells are determined on condition that one or more particular cell layout restrictive conditions are satisfied (the technical features of the twelfth embodiment).

Figure 49:
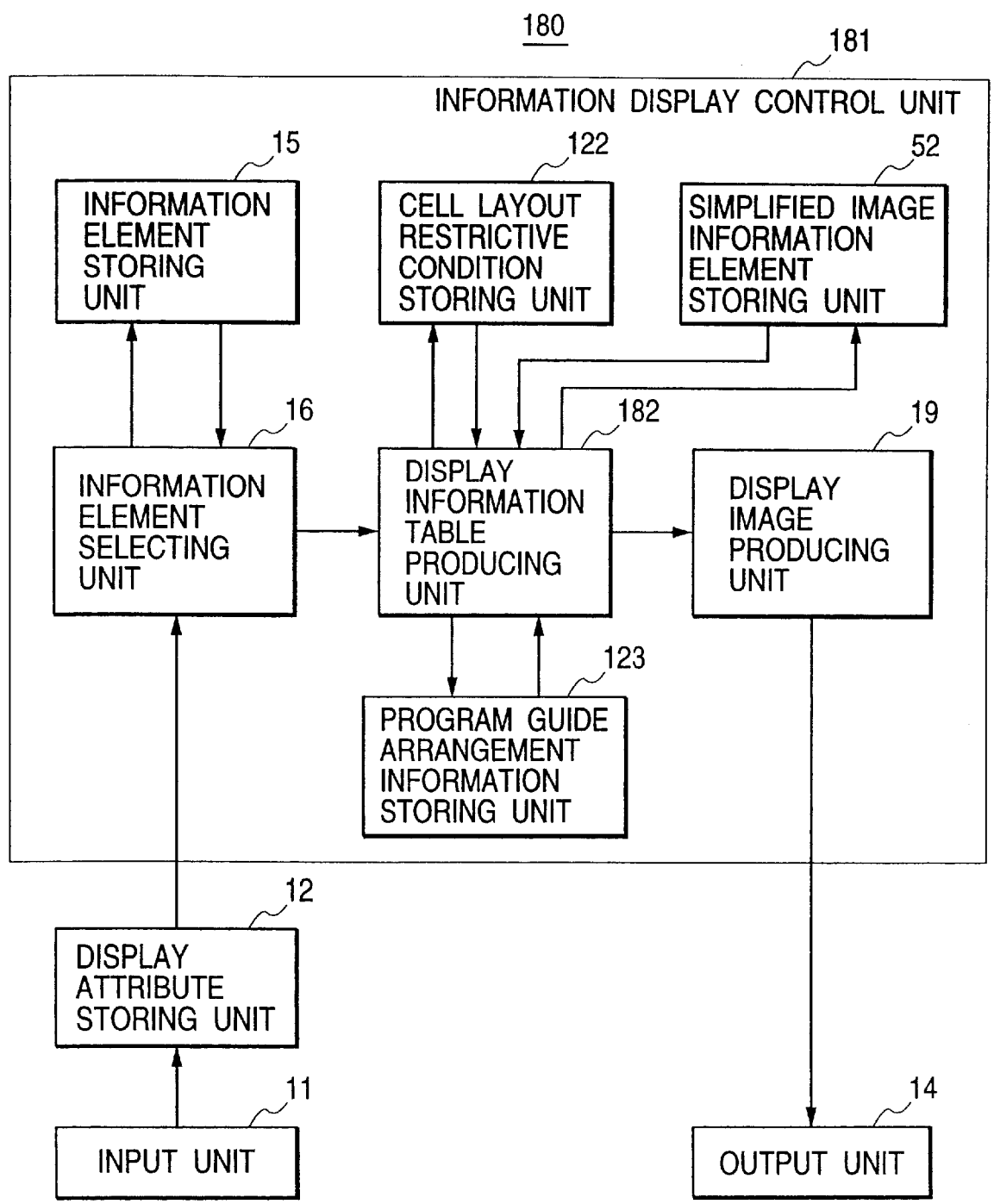
FIG. 49 is a block diagram of an information display apparatus according to an eighteenth embodiment of the present invention.
Figure 50:
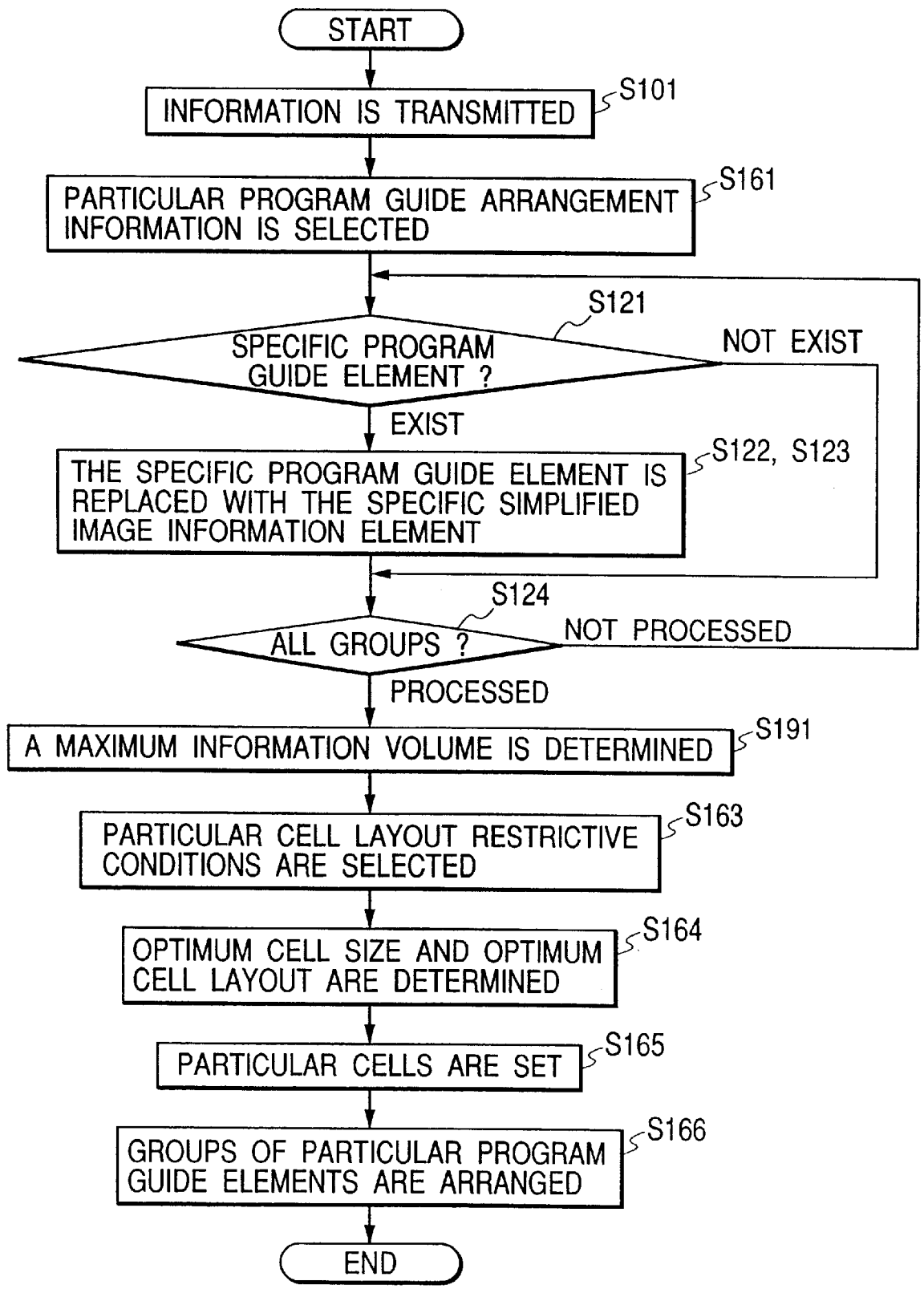
FIG. 50 is a flow chart showing the procedure performed in a display information table producing unit according to the eighteenth embodiment.

FIG. 49 is a block diagram of an information display apparatus according to an eighteenth embodiment of the present invention.

As shown in FIG. 49, an information display apparatus 180 comprises:

the input unit 11; the input display attribute storing unit 12;

an information display control unit 181 for controlling a display condition of a broadcasting program guide table according to the display attributes stored in the display attribute storing unit 12 to display an icon or a background color in place of character information indicating a program guide element and to arrange one group of particular program guide elements of one broadcasting program guide in each of particular cells of an optimum cell size and optimum layout on condition that particular cell layout restrictive conditions selected according to the particular detail degree and the particular program guide arrangement information are satisfied; and the output unit 14.

The information display control unit 181 comprises:

the information element storing unit 15; the information element selecting unit 16; the cell layout restrictive condition storing unit 122; the program guide arrangement information storing unit 123; the simplified image information element storing unit 52;

a display information table producing unit 182 for receiving the groups of program guide elements selected in the selecting unit 16, receiving the particular program guide arrangement information from the program guide arrangement information storing unit 123, checking whether or not one type of specific program guide element exists in one group of particular program guide elements, reading out a specific simplified image information element corresponding to one type of specific program guide element from the simplified image information element storing unit 52 in cases where the type of specific program guide element exists in the group of particular program guide elements, replacing the type of specific program guide element with the specific simplified image information element, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in a plurality of particular cells arranged in the optimum layout, and arranging the groups of particular program guide elements of the particular broadcasting program guides in the particular cells; and the display image producing unit 19.

In the above configuration, an operation performed in the display information table producing unit 182 is described with reference to FIG. 49.

FIG. 49 is a flow chart showing an operation performed in the display information table producing unit 182.

After the steps S101 and S161 are performed in the same manner as in the twelfth embodiment, the steps S121 to S124 are performed in the same manner as in the fifth embodiment. Thereafter, an information volume of each group of program guide elements, in which one type of specific program guide element is replaced with a specific simplified image information element corresponding to the type of specific program guide element, is calculated, and a maximum information volume among the information volumes is determined (step S191). Thereafter, the steps S163 to S166 are performed in the same manner as in the twelfth embodiment.

Accordingly, an optimum cell size and optimum layout of particular cells can be determined, and a display space of one group of particular program guide elements occupying one particular cell is reduced because one type of specific program guide element is replaced with a specific simplified image information element such as an icon or a background color.

(Nineteenth Embodiment)

In this embodiment, an optimum cell size and optimum layout of particular cells are determined on condition that one or more particular cell layout restrictive conditions are satisfied, and one group of particular program guide elements of one particular broadcasting program guide is arranged in each particular cell (the technical features of the twelfth embodiment). In cases where an information volume of one particular broadcasting program guide is too large to arrange the particular broadcasting program guide in one particular cell, one or more important words, which indicate the gist of the particular broadcasting program guide, are extracted from the particular broadcasting program guide, and the important words are preferentially arranged in the particular cell in place of the particular broadcasting program guide. (Technical features of the sixth embodiment).

Figure 51:
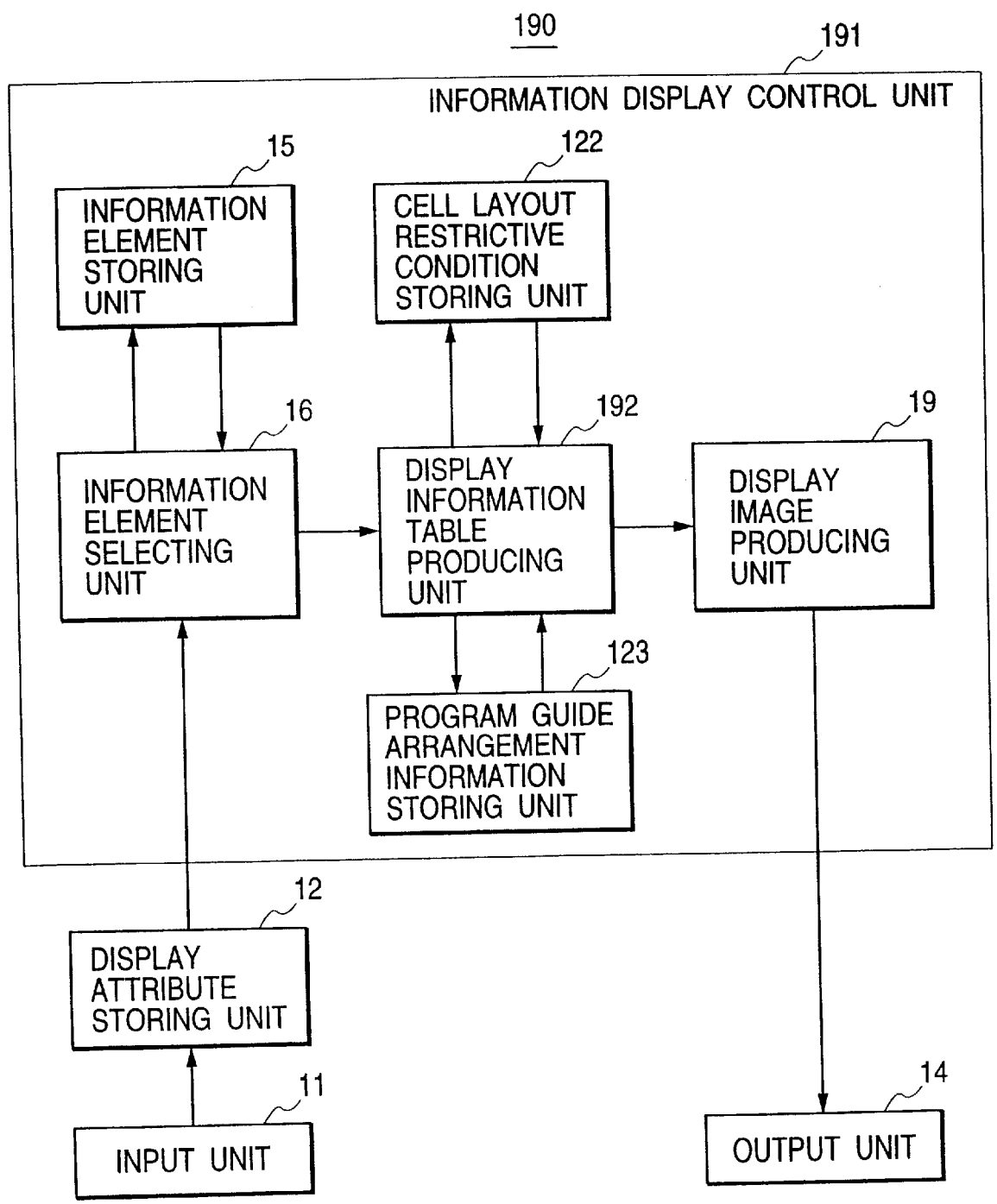
FIG. 51 is a block diagram of an information display apparatus according to a nineteenth embodiment of the present invention.

FIG. 51 is a block diagram of an information display apparatus according to a nineteenth embodiment of the present invention.

As shown in FIG. 51, an information display apparatus 190 comprises:

the input unit 11; the input display attribute storing unit 12;

an information display control unit 191 for controlling a display condition of a broadcasting program guide table according to the display attributes stored in the display attribute storing unit 12 to arrange one group of particular program guide elements of one broadcasting program guide in each of particular cells of an optimum cell size and optimum layout on condition that particular cell layout restrictive conditions selected according to the particular detail degree and the particular program guide arrangement information are satisfied and to preferentially arrange one or more important words extracted from one broadcasting program guide in a cell in place of the broadcasting program guide in cases where an information volume of the broadcasting program guide is too large to be arranged in the cell; and the output unit 14.

The information display control unit 191 comprises:

the information element storing unit 15; the information element selecting unit 16; the cell layout restrictive condition storing unit 122; the program guide arrangement information storing unit 123;

a display information table producing unit 192 for receiving the groups of program guide elements selected in the selecting unit 16, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in the particular cells arranged in the optimum layout, arranging one group of particular program guide elements of one particular broadcasting program guide in one particular cell for each particular broadcasting program guide, detecting a specific broadcasting program guide, of which an information volume is too large to arrange the specific broadcasting program guide in one particular cell, from the particular broadcasting program guides, extracting one or more important words indicating the gist of the specific broadcasting program guide from the specific broadcasting program guide, and preferentially arranging the important words in the particular cell in place of the specific broadcasting program guide; and the display image producing unit 19.

In the above configuration, an operation performed in the display information table producing unit 192 is described with reference to FIG. 52.

Figure 52:
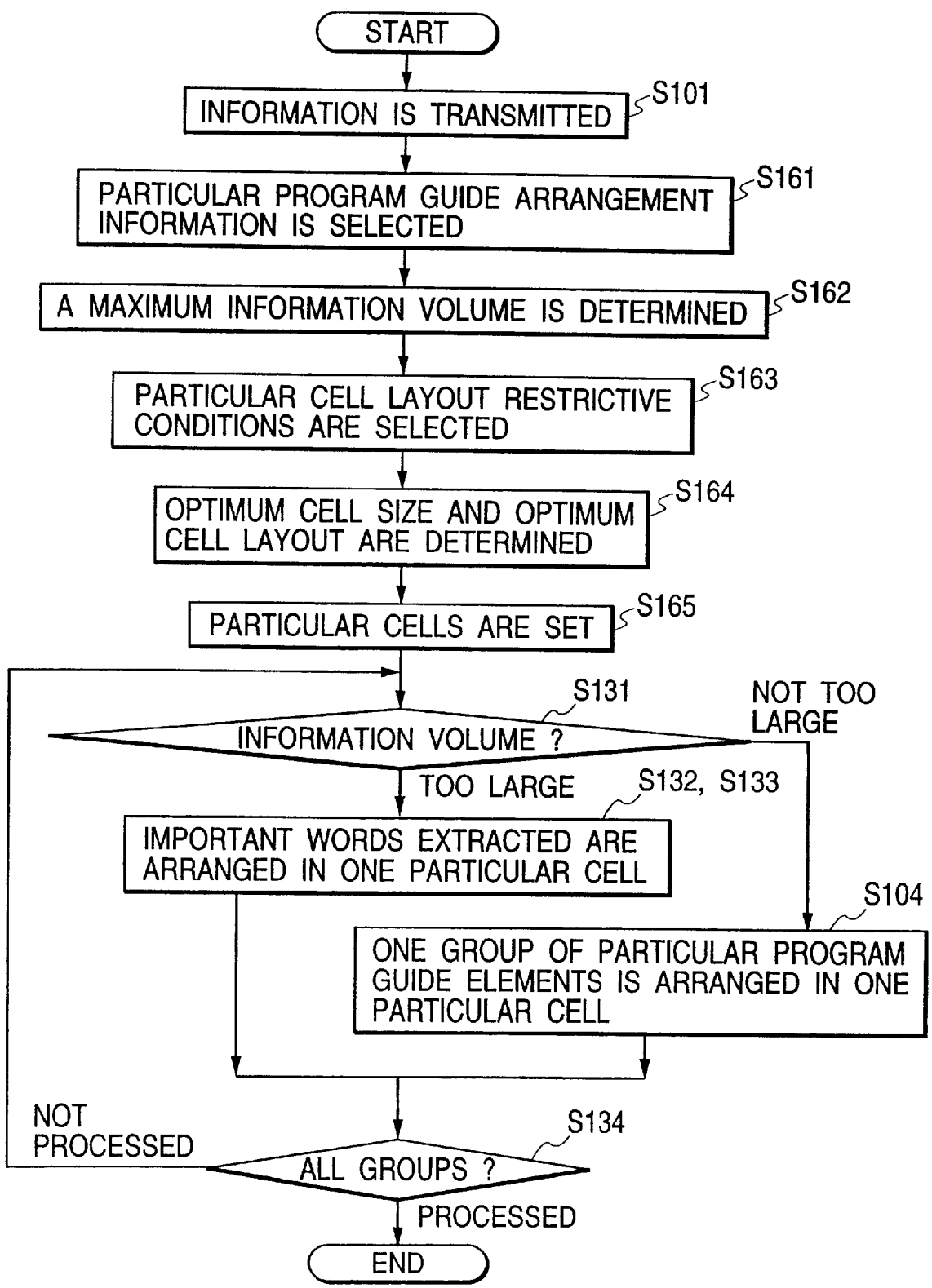
FIG. 52 is a flow chart showing the procedure performed in a display information table producing unit according to the nineteenth embodiment.

FIG. 52 is a flow chart showing an operation performed in the display information table producing unit 192.

After the steps S101 and S161 to S165 are performed in the same manner as in the twelfth embodiment, the steps S131, S132, S133, S104 and S134 are performed in the same manner as in the sixth embodiment.

Accordingly, an optimum cell size and optimum layout of particular cells can be determined, and one or more important words indicating the gist of a specific broadcasting program guide can be arranged in one particular cell even though an information volume of the specific broadcasting program guide is too large to arrange the specific broadcasting program guide in the particular cell. Therefore, the user can reliably recognize contents of the specific broadcasting program guide.

(Twentieth Embodiment)

In this embodiment, an optimum cell size and optimum layout of particular cells are determined on condition that one or more particular cell layout restrictive conditions are satisfied, and one group of particular program guide elements of one particular broadcasting program guide is arranged in each particular cell (the technical features of the twelfth embodiment). In cases where an information volume of one group of particular program guide elements of one particular broadcasting program guide is too large to arrange the group of particular program guide elements in one particular cell, a character size for the group of particular program guide elements is made small on condition that a user can recognize characters expressing the group of particular program guide elements, and the group of particular program guide elements is arranged in the particular cell (the technical features of the seventh embodiment).

Figure 53:
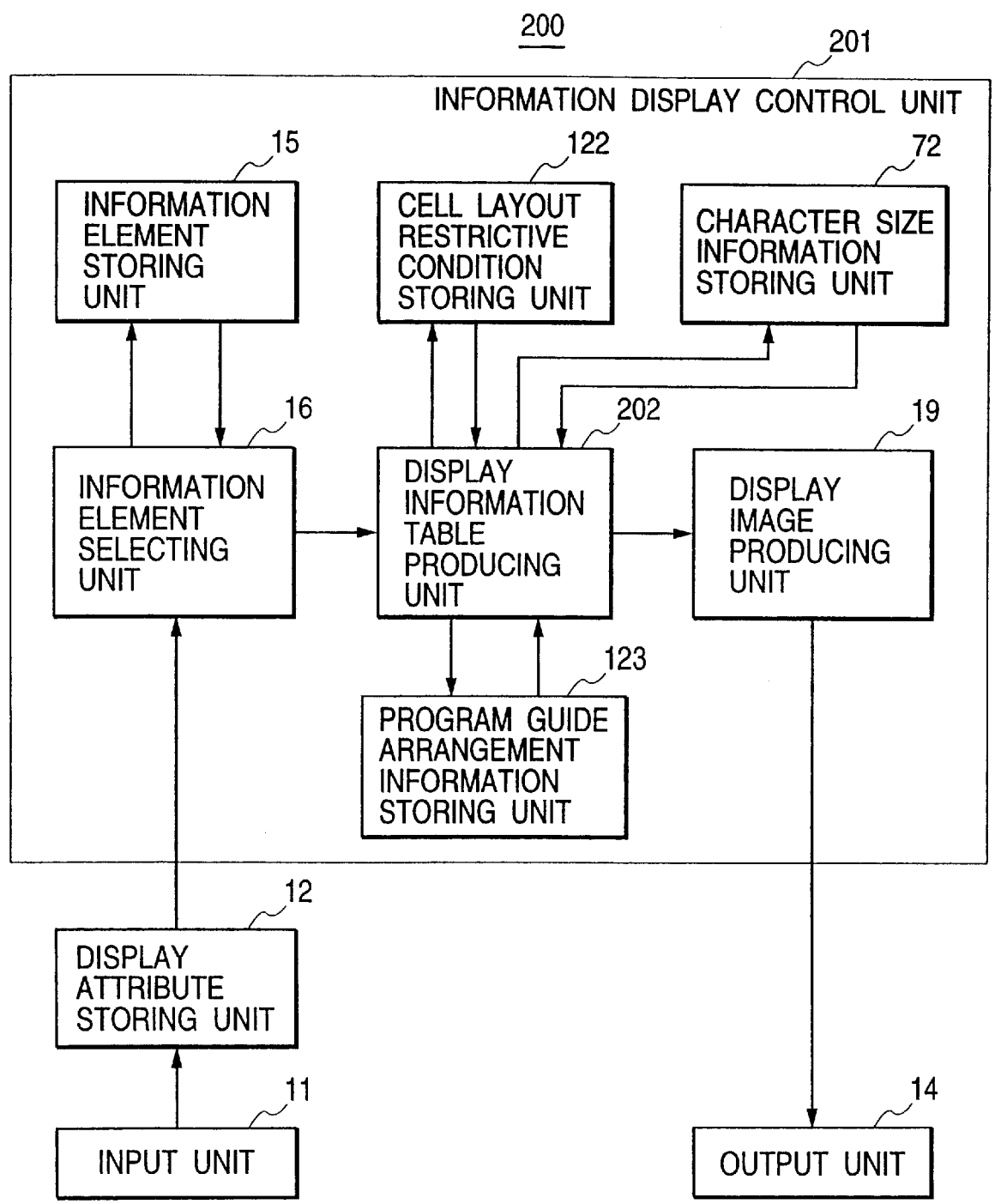
FIG. 53 is a block diagram of an information display apparatus according to a twentieth embodiment of the present invention.

FIG. 53 is a block diagram of an information display apparatus according to a twentieth embodiment of the present invention.

As shown in FIG. 53, an information display apparatus 200 comprises:

the input unit 11; the input display attribute storing unit 12;

an information display control unit 201 for controlling a display condition of a broadcasting program guide table according to the display attributes stored in the display attribute storing unit 12 to arrange one group of particular program guide elements of one broadcasting program guide in each of particular cells of an optimum cell size and optimum layout on condition that particular cell layout restrictive conditions selected according to the particular detail degree and the particular program guide arrangement information are satisfied and to display one group of particular program guide elements of one particular broadcasting program guide in one particular cell in small type in cases where an information volume of the group of particular program guide elements is too large to arrange the group of particular program guide elements in one particular cell; and the output unit 14.

The information display control unit 201 comprises:

the information element storing unit 15; the information element selecting unit 16; the character size information storing unit 72; the cell layout restrictive condition storing unit 122; the program guide arrangement information storing unit 123;

a display information table producing unit 202 for receiving the groups of program guide elements selected in the selecting unit 16, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in the particular cells arranged in the optimum layout, checking whether or not one type of specific program guide element exists in one group of particular program guide elements of each particular broadcasting program guide, detecting a specific group of particular program guide elements, of which an information volume is too large to arrange the specific group of particular program guide elements in one particular cell, from groups of particular program guide elements selected in the information element selecting unit 42, selecting a piece of particular character size information from the pieces of character size information stored in the storing unit 72 on condition that an area of the particular cell is sufficient to arrange the specific group of particular program guide elements expressed by small-sized characters according to the particular character size information, expressing the specific group of particular program guide elements by small-sized characters according to the particular character size information, and arranging the groups of particular program guide elements including the specific group of particular program guide elements in the particular cells; and the display image producing unit 19.

Figure 54:
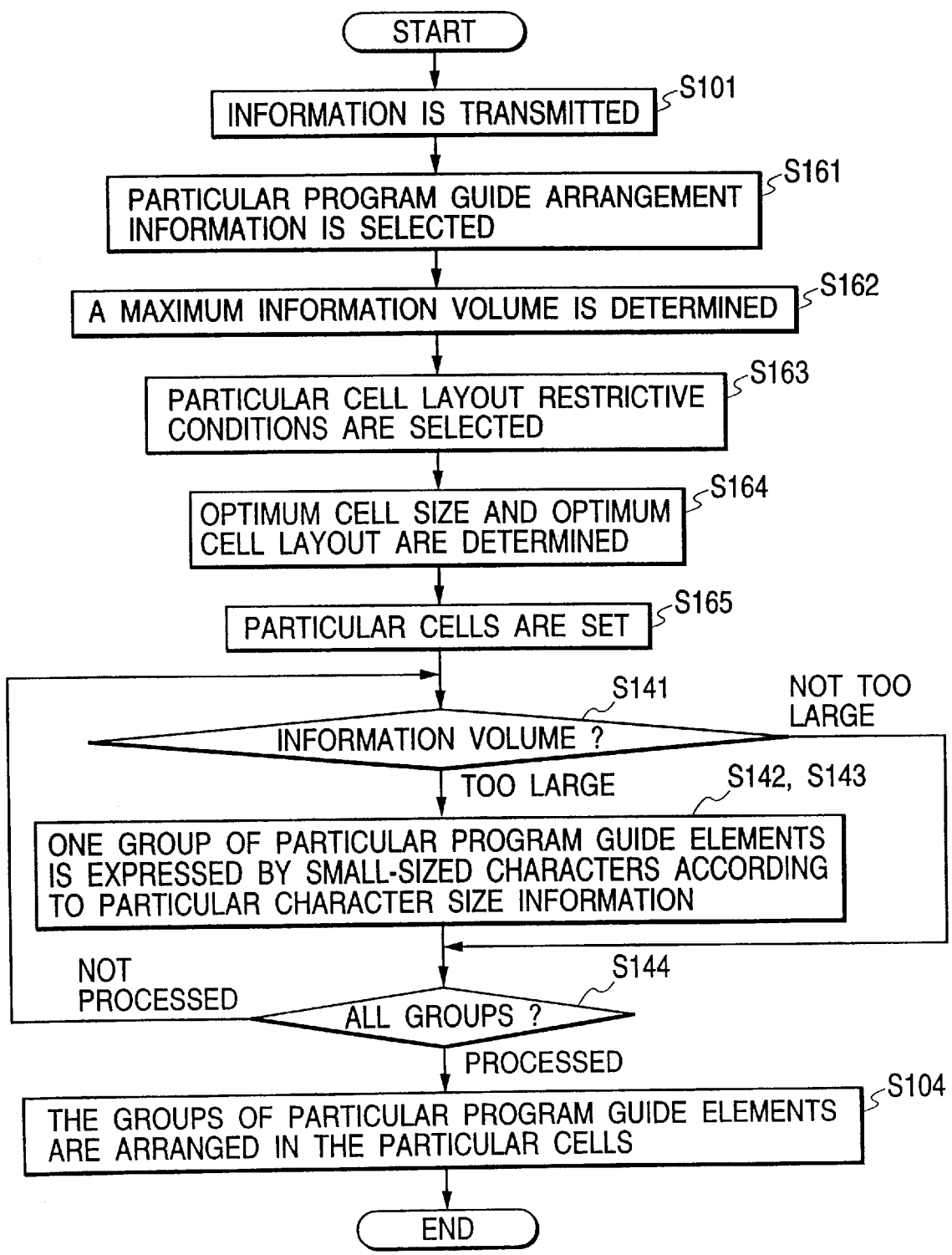
FIG. 54 is a flow chart showing the procedure performed in a display information table producing unit according to the twentieth embodiment.

In the above configuration, an operation performed in the display information table producing unit 202 is described with reference to FIG. 54.

After the steps S101 and S161 to S165 are performed in the same manner as in the twelfth embodiment, the steps S141, S142, S143, S144 and S104 are performed in the same manner as in the seventh embodiment.

Accordingly, an optimum cell size and optimum layout of particular cells can be determined, and a character size for a specific group of particular program guide elements can be made small in cases where an information volume of the specific group of particular program guide elements is too large to arrange the specific group of particular program guide elements in one particular cell. Therefore, the specific group of particular program guide elements can be reliably arranged in the particular cell, and an information volume of groups of particular program guide elements can be displayed as a list as large as possible.

(Twenty-first Embodiment)

In this embodiment, in cases where a user has interest in a specific type of attribute such as a specific genre, a specific broadcasting program guide relating to the specific type of attribute is specified, a group of specific program guide elements of the specific broadcasting program guide is extracted in more detail as compared with a group of particular program guide elements extracted according to a particular detail degree input by a user, and a size of a specific cell, in which the group of specific program guide elements of the specific broadcasting program guide is planned to be arranged, is enlarged to arrange the group of specific program guide elements in the specific cell.

Figure 55:
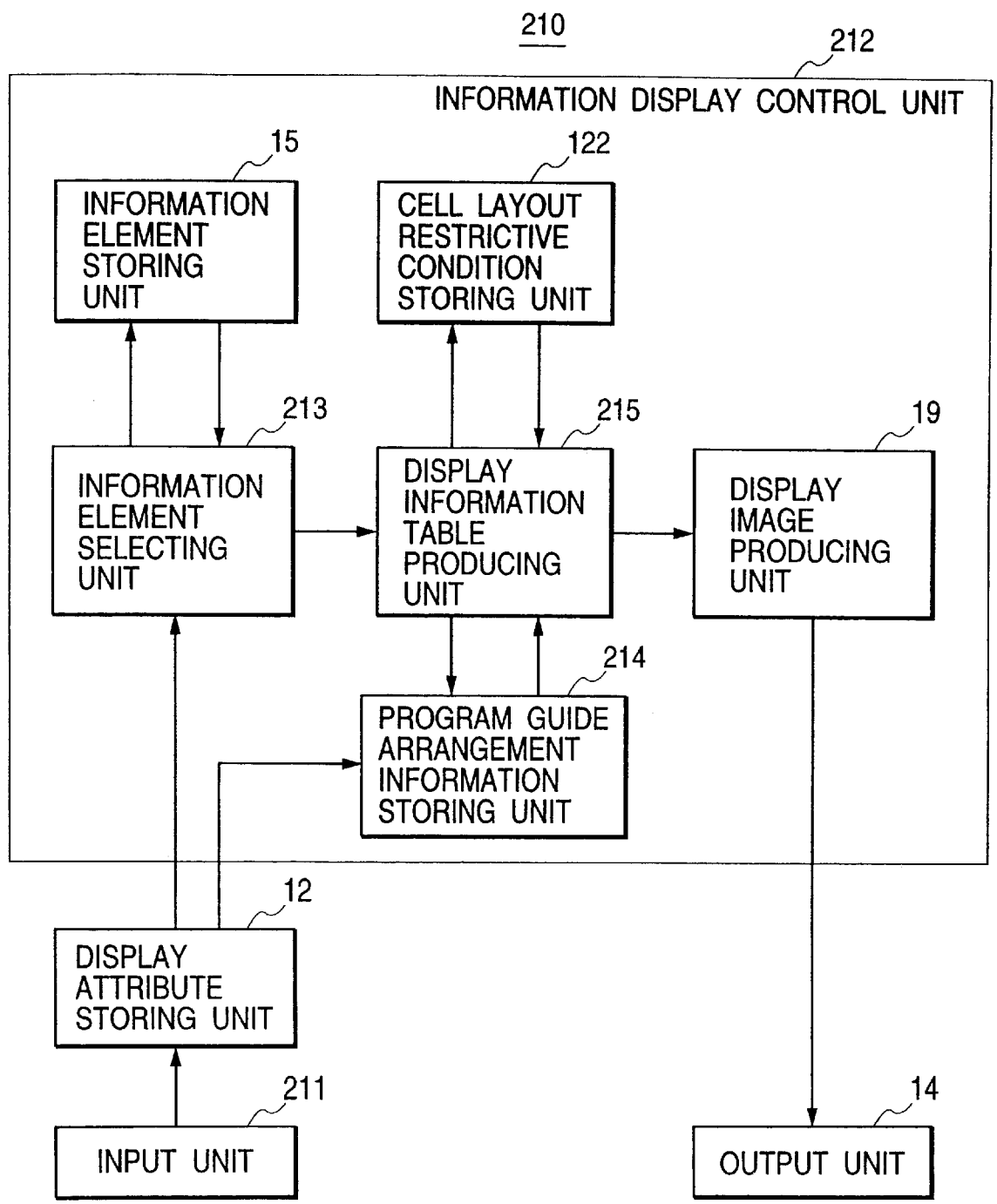
FIG. 55 is a block diagram of an information display apparatus according to a twenty-first embodiment of the present invention.

FIG. 55 is a block diagram of an information display apparatus according to a twenty-first embodiment of the present invention.

As shown in FIG. 55, an information display apparatus 210 comprises:

an input unit 211 for receiving an information display request, a particular detail degree and interest information, the interest information indicating a specific type of attribute such as a specific genre;

the input display attribute storing unit 12;

an information display control unit 212 for controlling a display condition of a broadcasting program guide table according to the display attributes stored in the display attribute storing unit 12 to display a specific broadcasting program guide relating to the specific type of attribute in more detail according to the interest information; and the output unit 14.

The information display control unit 212 comprises:

the information element storing unit 15;

an information element selecting unit 213 for holding a detail correspondence table in which the correspondence of a group of particular program guide elements to a detail degree is listed for each of detail degrees, receiving the information display request, the particular detail degree and the interest information from the storing unit 12, specifying one or more specific broadcasting program guides relating to the specific type of attribute indicated by the interest information, selecting a group of specific program guide elements, of which an information volume is larger than that of a group of particular program guide elements corresponding to the particular detail degree in the detail correspondence table, from the program guide elements of one specific broadcasting program guide stored in the information element storing unit 15 for each specific broadcasting program guide, selecting a group of particular program guide elements corresponding to the particular detail degree in the detail correspondence table from the program guide elements of one broadcasting program guide stored in the information element storing unit 15 for each of the broadcasting program guides other than the specific broadcasting program guides;

the cell layout restrictive condition storing unit 122;

a program guide arrangement information storing unit 214 for storing a piece of particular program guide arrangement information and storing the interest information transmitted from the storing unit 12, an image display area being partitioned into the cells by partition lines parallel to each display axis (for example, partition lines parallel to an X-axis and partition lines parallel to a Y-axis in a two-dimensional layout of the cells), and the piece of particular program guide arrangement information indicating a particular attribute for a plurality of broadcasting program guides arranged along each display axis;

a display information table producing unit 215 for receiving the groups of specific program guide elements and the groups of particular program guide elements selected in the selecting unit 213, receiving the particular program guide arrangement information from the program guide arrangement information storing unit 214, receiving the interest information from the storing unit 214, calculating a specific size of a cell on condition that an information volume of the cell is equal to or slightly larger than a volume of one group of specific program guide elements of one specific broadcasting program guide, for each specific broadcasting program guide, calculating an information volume of each group of program guide elements planned to be arranged in one cell, determining a maximum information volume among the information volumes of the groups of particular program guide elements, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides, in which one or more specific broadcasting program guides relating to the interest information are included, planned to be arranged in the particular cells of the optimum layout, changing the optimum cell size of one particular cell, in which one group of specific program guide elements of one specific broadcasting program guide is planned to be arranged, to the specific size calculated for the specific broadcasting program guide for each specific broadcasting program guide, adjusting a position and size of each particular cell, in which one group of particular program guide elements of one particular broadcasting program guide is planned to be arranged, not to make the particular cells overlap with each other, arranging the groups of particular program guide elements in the particular cells of the adjusted cell size, and arranging the groups of specific program guide elements in the particular cells of the specific sizes; and the display image producing unit 19.

In the above configuration, an operation performed in the information display apparatus 210 is described.

When a user inputs an information display request, a particular detail degree and interest information to the input unit 211, the information display request, the particular detail degree and the interest information are transmitted to the information element selecting unit 213 through the storing unit 12, and the interest information is transmitted to the program guide arrangement information storing unit 214 through the storing unit 12.

In the information element selecting unit 213, one or more specific broadcasting program guides relating to a specific type of attribute indicated by the interest information are specified by referring a plurality of broadcasting program guides stored in the storing unit 15. Thereafter, a group of particular program guide elements of one broadcasting program guide corresponding to the particular detail degree in the detail correspondence table is selected from the program guide elements of one broadcasting program guide stored in the information element storing unit 15 for each of the broadcasting program guides other than the specific broadcasting program guides. Also, a group of specific program guide elements is selected from the program guide elements of one specific broadcasting program guide stored in the information element storing unit 15 for each specific broadcasting program guide. For example, in cases where the particular detail degree input by the user is the first detail degree, though each group of particular program guide elements is composed of program broadcasting start time, a title and a sub-title, each group of specific program guide elements is composed of program broadcasting start time, a title, a sub-title and the cast corresponding to the second detail degree. Therefore, an information volume of one group of specific program guide elements is larger than that of one group of particular program guide elements.

Thereafter, an operation of the display information table producing unit 215 is performed.

Figure 56:
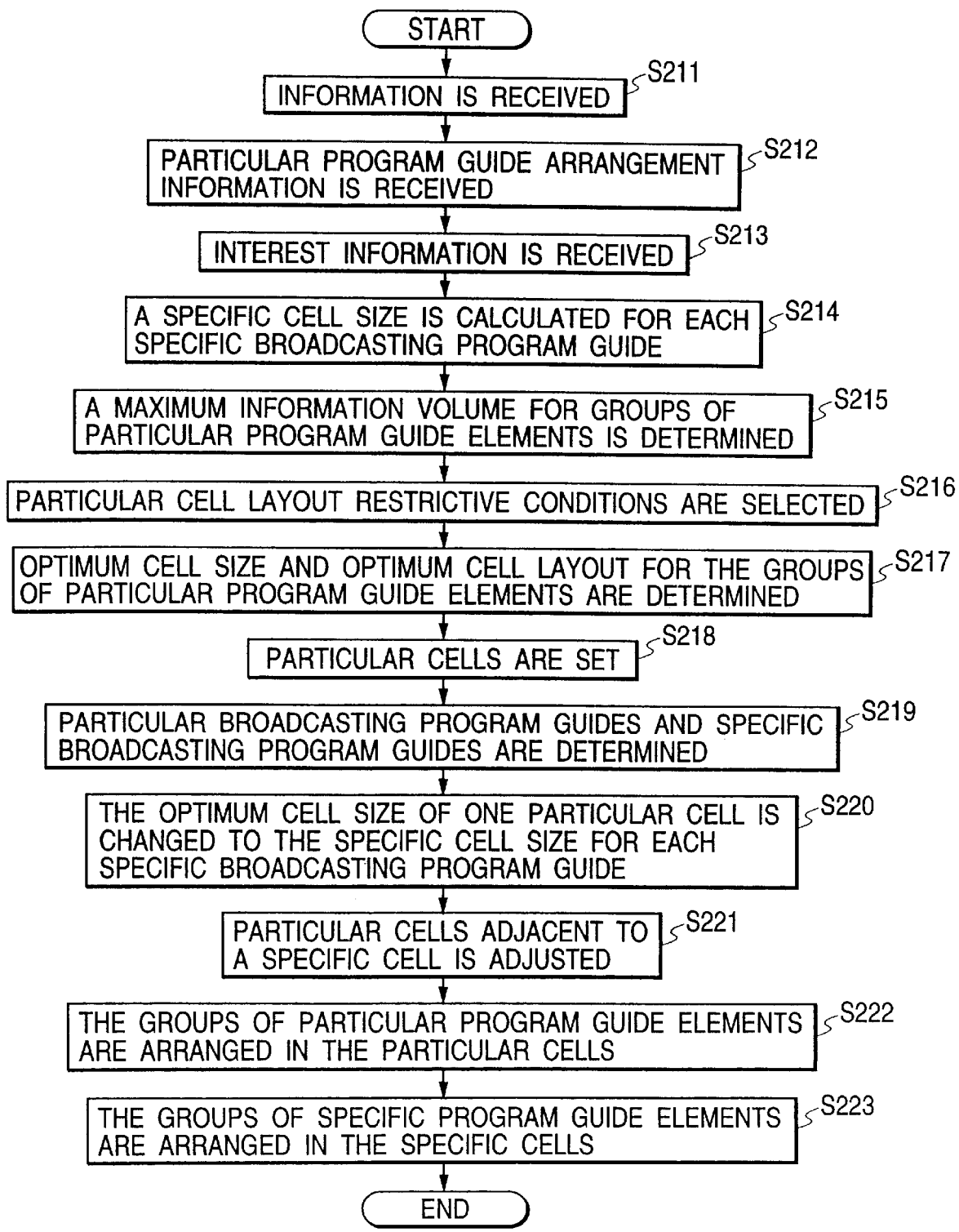
FIG. 56 is a flow chart showing the procedure performed in a display information table producing unit according to the twenty-first embodiment.

FIG. 56 is a flow chart showing an operation performed in the display information table producing unit 215.

As shown in FIG. 56, the groups of specific program guide elements and the groups of particular program guide elements selected in the selecting unit 213 are received (step S211), particular program guide arrangement information stored in the storing unit 214 is transmitted to the display information table producing unit 215 (step S212), and the interest information is received from the storing unit 214 (step S213).

Thereafter, a specific size of a cell corresponding to one specific broadcasting program guide is calculated on condition that an information volume of the cell is equal to or slightly larger than an information volume of the group of specific program guide elements of the specific broadcasting program guide, for each specific broadcasting program guide (step S214). Also, an information volume of each group of particular program guide elements planned to be arranged in one cell is calculated, and a maximum information volume among the information volumes of the groups of particular program guide elements is determined (step S215).

Thereafter, one or more particular cell layout restrictive conditions are selected from the cell layout restrictive conditions stored in the cell layout restrictive condition storing unit 122 according to the particular detail degree and the particular program guide arrangement information (step S216), an optimum cell size and optimum layout of particular cells corresponding to the groups of particular program guide elements are determined on condition that the particular cell layout restrictive conditions are satisfied and an information volume of each particular cell is equal to or slightly larger than the maximum information volume (step S217), the particular cells are set in a broadcasting program guide table (step S218), and a plurality of particular broadcasting program guides and one or more specific broadcasting program guides, in which one or more specific broadcasting program guides relating to the interest information are included, planned to be arranged in the particular cells of the optimum layout are determined (step S219).

Because an information volume of each specific broadcasting program guide is larger than a volume of information capable to be arranged in one particular cell of the optimum cell size, the optimum cell size of one particular cell, in which one group of specific program guide elements of one specific broadcasting program guide is planned to be arranged, is changed to the specific size calculated for the specific broadcasting program guide for each specific broadcasting program guide (step S220). Each particular cell of the specific size is called a specific cell.

In this case, because a plurality of particular cells adjacent to the specific cell overlap with the specific cell, a position and size of each particular cell, in which one group of particular program guide elements of one particular broadcasting program guide is planned to be arranged, are adjusted not to make the particular cells overlap with any specific cell (step S221), the groups of particular program guide elements are arranged in the particular cells (step S222), and the groups of specific program guide elements are arranged in the specific cells of the specific sizes (step S223).

Accordingly, in cases where the user has interest in a specific type of attribute such as a specific genre, because a guide of a specific broadcasting program relating to the specific type of attribute is arranged in a specific cell in more detail, the user can check a broadcasting program guide table adapted for the user.

(Twenty-Second Embodiment)

In this embodiment, the correspondence of a group of program guide elements to a detail degree (or an information volume) is displayed for each of detail degrees, and a user specifies one detail degree to select a group of program guide elements from a plurality of program guide elements of one broadcasting program guide for each broadcasting program guide (technical features of the eighth embodiment). Also, an optimum cell size and optimum layout of particular cells are determined on condition that one or more particular cell layout restrictive conditions are satisfied, and one group of particular program guide elements of one particular broadcasting program guide is arranged in each particular cell (the technical features of the twelfth embodiment).

Figure 57:
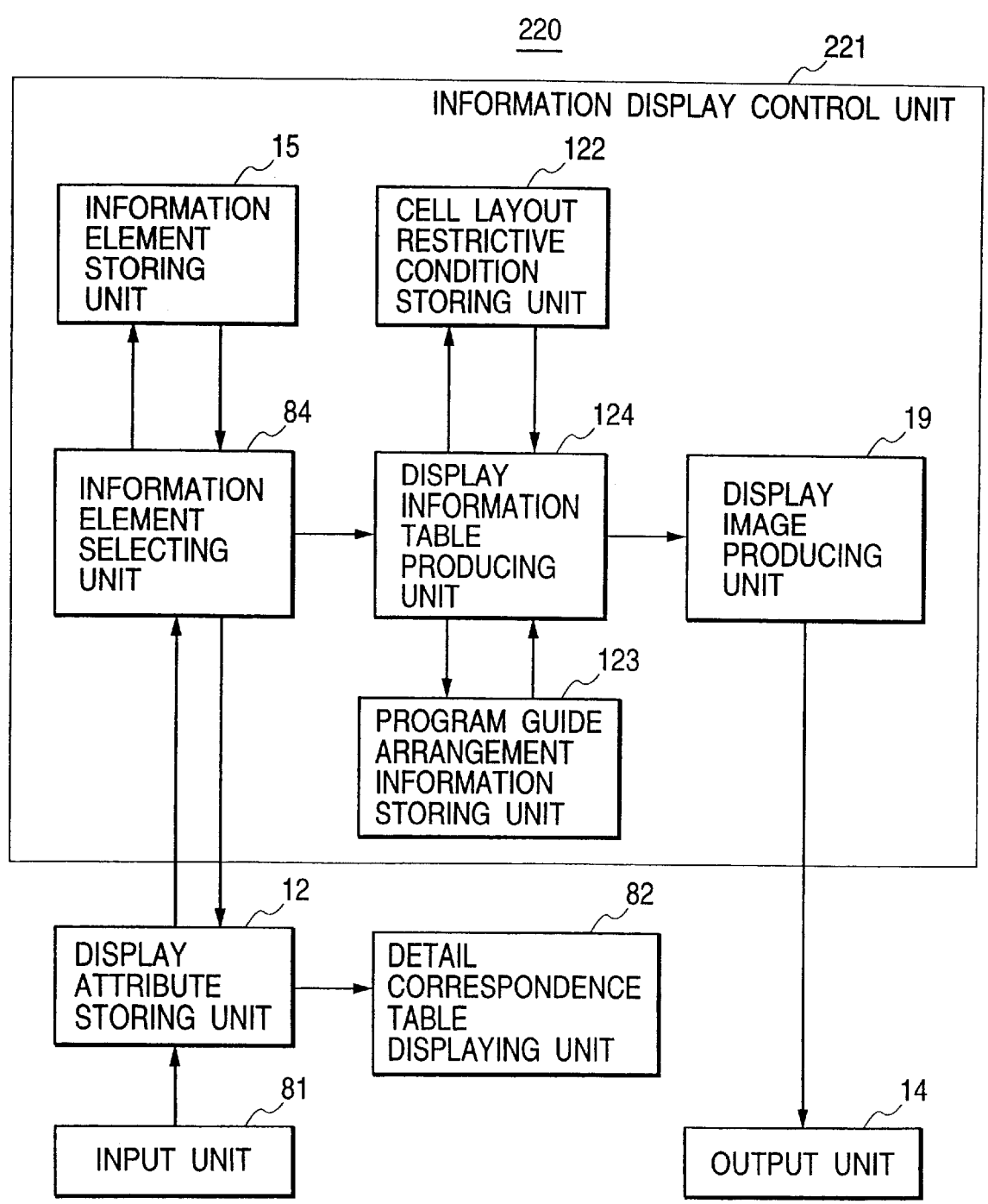
FIG. 57 is a block diagram of an information display apparatus according to a twenty-second embodiment of the present invention.

FIG. 57 is a block diagram of an information display apparatus according to a twenty-second embodiment of the present invention.

As shown in FIG. 57, an information display apparatus 220 comprises:

the input unit 81; the detail correspondence table displaying unit 82; the input display attribute storing unit 12;

an information display control unit 221 for outputting the detail correspondence table to the detail correspondence table displaying unit 82 through the storing unit 12 in response to the information display request, and controlling a display condition of a broadcasting program guide table according to the display attributes stored in the display attribute storing unit 12 by selecting one or more particular cell layout restrictive conditions according to the particular detail degree and the particular program guide arrangement information, determining an optimum cell size and optimum layout of particular cells on condition that the particular cell layout restrictive conditions are satisfied and arranging one group of program guide elements of one broadcasting program guide specified according to the particular detail degree in each of the particular cells having the optimum cell size; and the output unit 14.

The information display control unit 221 comprises:

the information element storing unit 15; the information element selecting unit 84; the cell layout restrictive condition storing unit 122; the program guide arrangement information storing unit 123; the display information table producing unit 124; and the display image producing unit 19.

In the above configuration, the units 12, 15, 81, 82 and 84 are operated in the same manner as in the eighth embodiment. Thereafter, the units 124, 29 and 24 are operated in the same manner as in the twelfth embodiment.

Accordingly, the user can determine the groups of particular program guide elements displayed as a broadcasting program guide table while referring the detail correspondence table, and an optimum cell size and optimum layout of particular cells can be determined.

(Twenty-Third Embodiment)

In this embodiment, a user specifies a specific program guide element group, and each group of specific program guide elements indicated by the specific program guide element group is arranged in one particular cell for each particular broadcasting program guide (technical features of the ninth embodiment). Also, an optimum cell size and optimum layout of particular cells are determined on condition that one or more particular cell layout restrictive conditions are satisfied, and one group of particular program guide elements of one particular broadcasting program guide is arranged in each particular cell (the technical features of the twelfth embodiment).

Figure 58:
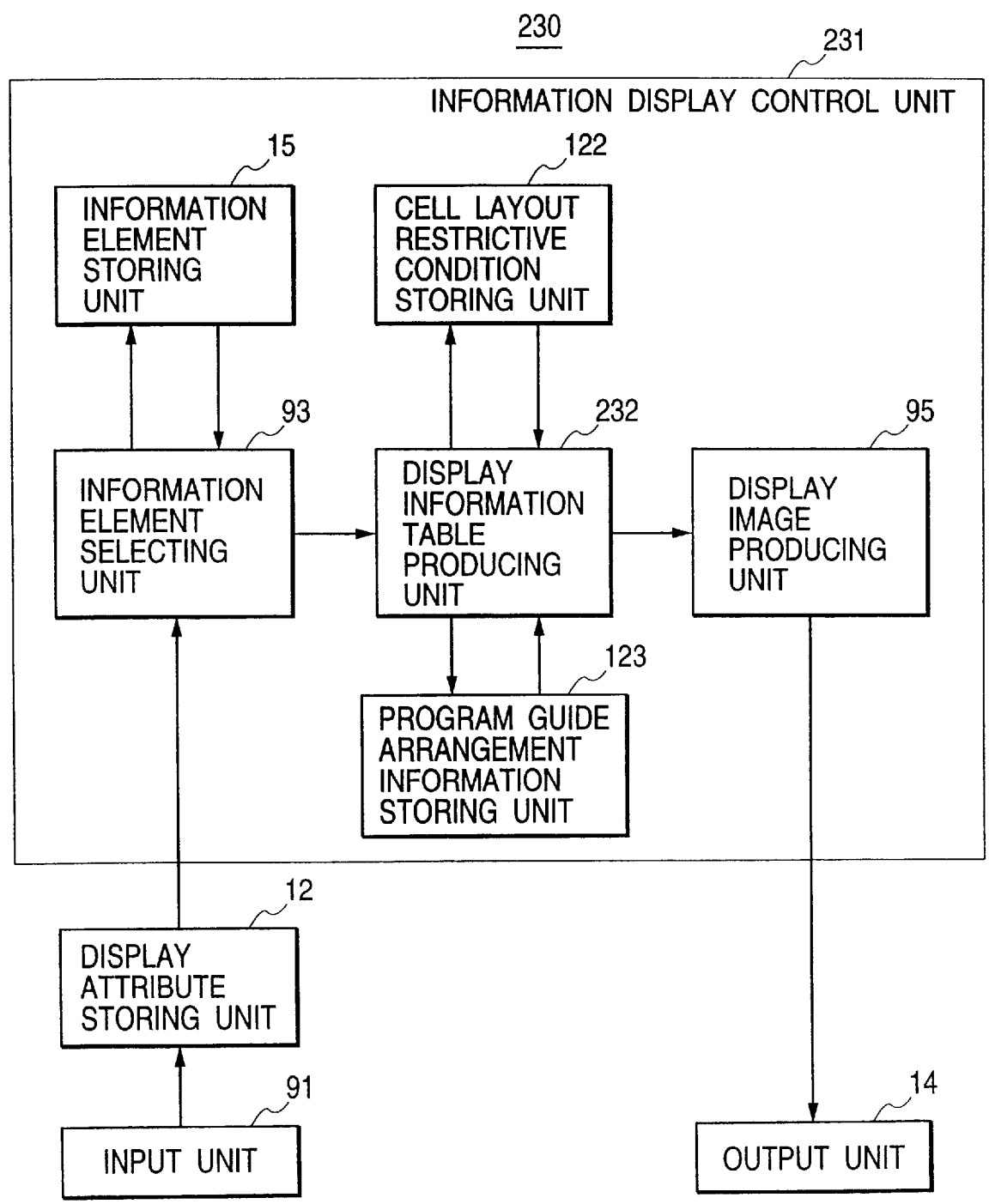
FIG. 58 is a block diagram of an information display apparatus according to a twenty-third embodiment of the present invention.

FIG. 58 is a block diagram of an information display apparatus according to a twenty-third embodiment of the present invention.

As shown in FIG. 58, an information display apparatus 230 comprises:

the input unit 91; the input display attribute storing unit 12;

an information display control unit 231 for controlling a display condition of a broadcasting program guide table according to the display attributes stored in the display attribute storing unit 12 by specifying a specific program guide element group and arranging one group of particular program guide elements of one broadcasting program guide in each of particular cells of an optimum cell size and optimum layout on condition that particular cell layout restrictive conditions selected according to the particular detail degree and the particular program guide arrangement information are satisfied; and the output unit 14.

The information display control unit 231 comprises:

the information element storing unit 15; the information element selecting unit 93; the cell layout restrictive condition storing unit 122; the program guide arrangement information storing unit 123;

a display information table producing unit 232 for receiving the particular detail degree from the selecting unit 93, receiving the groups of program guide elements selected in the selecting unit 93, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of particular broadcasting program guides planned to be arranged in a plurality of particular cells arranged in the optimum layout, arranging the groups of particular program guide elements of the particular broadcasting program guides in the particular cells in the first selection operation to produce a first broadcasting program guide table in which this groups of particular program guide elements are arranged in the particular cells, determining a plurality of specific broadcasting program guides planned to be arranged in a plurality of specific cells arranged in the specific layout, determining an optimum cell size and optimum layout of specific cells, and arranging one group of specific program guide elements of one specific broadcasting program guide selected in the information element selecting unit 93 in each specific cell for each specific broadcasting program guide in the second selection operation to produce a second broadcasting program guide table in which the groups of specific program guide elements are arranged in the specific cells; and the display image producing unit 95.

In the above configuration, the units 91, 12 and 93 are operated in the first selection operation in the same manner as in the ninth embodiment. Thereafter, the unit 222 is operated in the first selection operation in the same manner as in the twelfth embodiment. In cases where a user does not satisfy an information volume (or an information type) of each group of particular program guide elements corresponding to the particular detail degree, the user specifies a specific program guide element group, and one group of specific program guide elements of one specific broadcasting program guide is selected in the information element selecting unit 93 for each specific broadcasting program guide in the second selection operation. Thereafter, the groups of specific program guide elements of the specific broadcasting program guides are arranged in the specific cells of an optimum layout determined according to the twelfth embodiment in the table producing unit 232.

Accordingly, the user can renew the detail correspondence table to adjust an information volume (or an information type) of each group of program guide elements arranged in one cell, and an optimum cell size and optimum layout of particular cells can be determined.

(Twenty-Fourth Embodiment)

In cases where a plurality of particular broadcasting program guides are arranged with one display unit in the fifteenth embodiment, a cell-attribute relationship changes in dependent on the detail degree. For example, as shown in FIG. 41, FIG. 42 and FIG. 43, in cases where a plurality of particular broadcasting program guides are arranged with a time unit of one hour on condition that the television channel is selected as an attribute along the X-axis and the program broadcasting start time is selected as an attribute along the Y-axis, a plurality of particular cells arranged in two rows are set for each time unit when the second detail degree or the third detail degree is selected, and a plurality of particular cells arranged in one row are set for each time unit when the first detail degree is selected. Therefore, because the cell-attribute relationship changes in dependent on the detail degree, the user cannot promptly compare the particular broadcasting program guides with each other.

In the twenty-fourth embodiment, to prevent the changing of the cell-attribute relationship in dependent on the detail degree, an optimum cell-attribute relationship common to all detail degrees is determined, and a plurality of particular broadcasting program guides are arranged with one display unit according to the optimum cell-attribute relationship.

Figure 59:
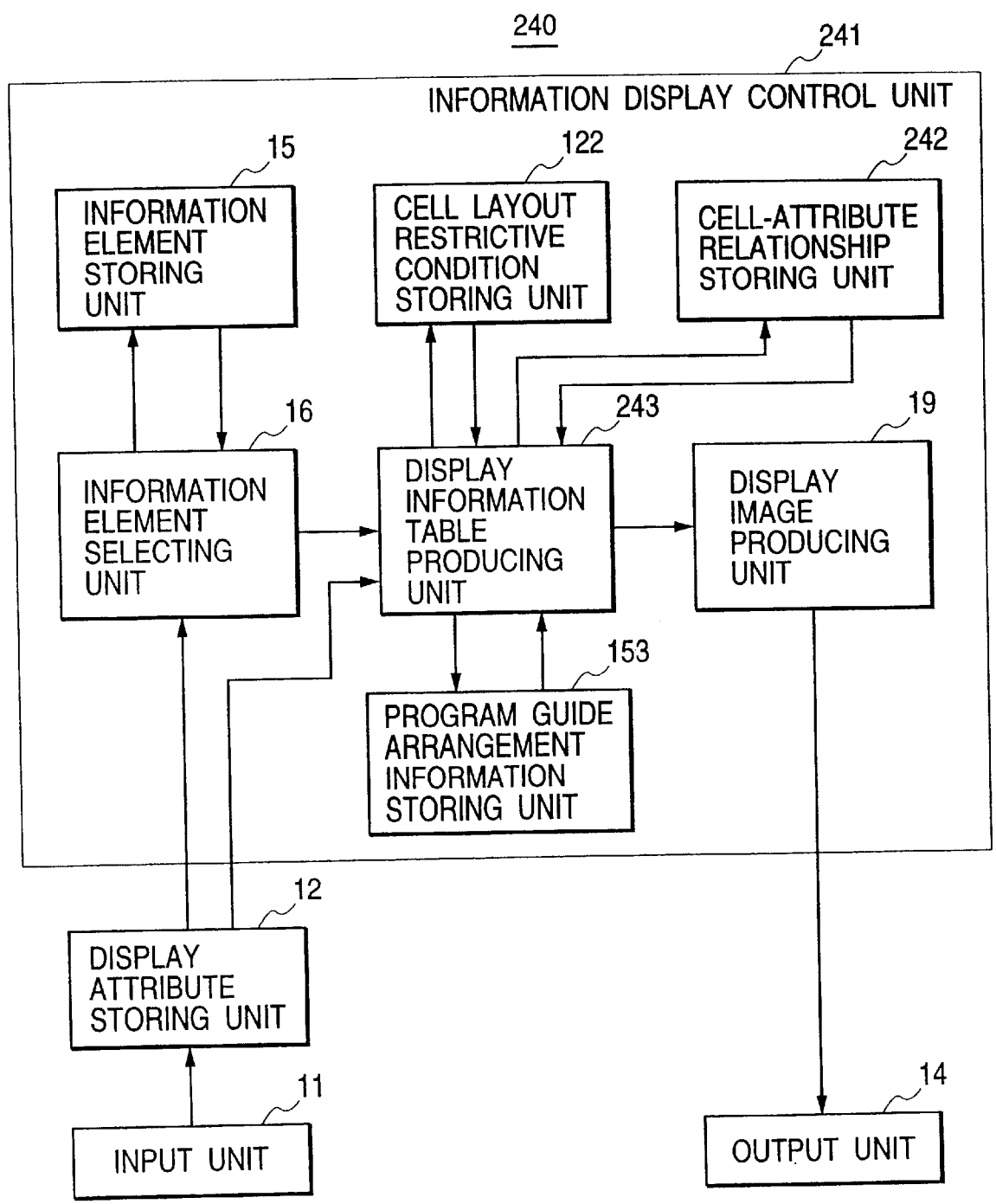
FIG. 59 is a block diagram of an information display apparatus according to a twenty-fourth embodiment of the present invention.

FIG. 59 is a block diagram of an information display apparatus according to a twenty-fourth embodiment of the present invention.

As shown in FIG. 59, an information display apparatus 210 comprises:

the input unit 11; the input display attribute storing unit 12;

an information display control unit 211 for controlling a display condition of a broadcasting program guide table according to the display attributes stored in the display attribute storing unit 12 by specifying a display unit of one program guide element adopted as an attribute along each display axis, selecting one or more particular cell layout restrictive conditions including a cell-attribute relationship maintaining restriction according to the particular detail degree and the particular program guide arrangement information, determining an optimum cell-attribute relationship common to all detail degrees, determining an optimum cell size and optimum layout of particular cells while maintaining the optimum cell-attribute relationship on condition that the particular cell layout restrictive conditions are satisfied and arranging one or more groups of program guide elements of one or more broadcasting program guides corresponding to one display unit of a particular attribute in one or more particular cells having the optimum cell size for each display unit; and the output unit 14.

The information display control unit 241 comprises:

the information element storing unit 15; the information element selecting unit 16; the cell layout restrictive condition storing unit 122; the program guide arrangement information storing unit 153;

a cell-attribute relationship storing unit 242 for storing a cell-attribute relationship between a cell layout of one display unit and program guide arrangement information for each detail degree;

a display information table producing unit 243 for receiving the groups of program guide elements selected in the selecting unit 16, receiving the particular program guide arrangement information from the program guide arrangement information storing unit 123, calculating an information volume of each group of program guide elements planned to be arranged in one cell, determining a maximum information volume of one group of particular program guide elements from the information volumes, selecting one or more particular cell layout restrictive conditions including a cell-attribute relationship maintaining restriction from the cell layout restrictive conditions stored in the cell layout restrictive condition storing unit 122 according to the particular detail degree and the particular program guide arrangement information, selecting one or more particular cell-attribute relationships corresponding to the particular program guide arrangement information for each of all detail degrees from the cell-attribute relationships stored in the storing unit 242, specifying an optimum cell-attribute relationship common to all detail degrees from the particular cell-attribute relationships, determining an optimum layout of particular cells according to the optimum cell-attribute relationship, determining an optimum cell size of particular cells according to the optimum layout of particular cells on condition that the particular cell layout restrictive conditions are satisfied and an information volume of each particular cell is equal to or slightly larger than the maximum information volume, setting the particular cells in a broadcasting program guide table, determining a particular broadcasting program guide planned to be arranged in each of a plurality of particular cells arranged in the optimum layout with the display unit indicated by the particular program guide arrangement information, and arranging the groups of particular program guide elements of the particular broadcasting program guides in the particular cells; and the display image producing unit 19.

In the above configuration, an operation of the display information table producing unit 243 is described with reference to FIG. 60.

Figure 60:
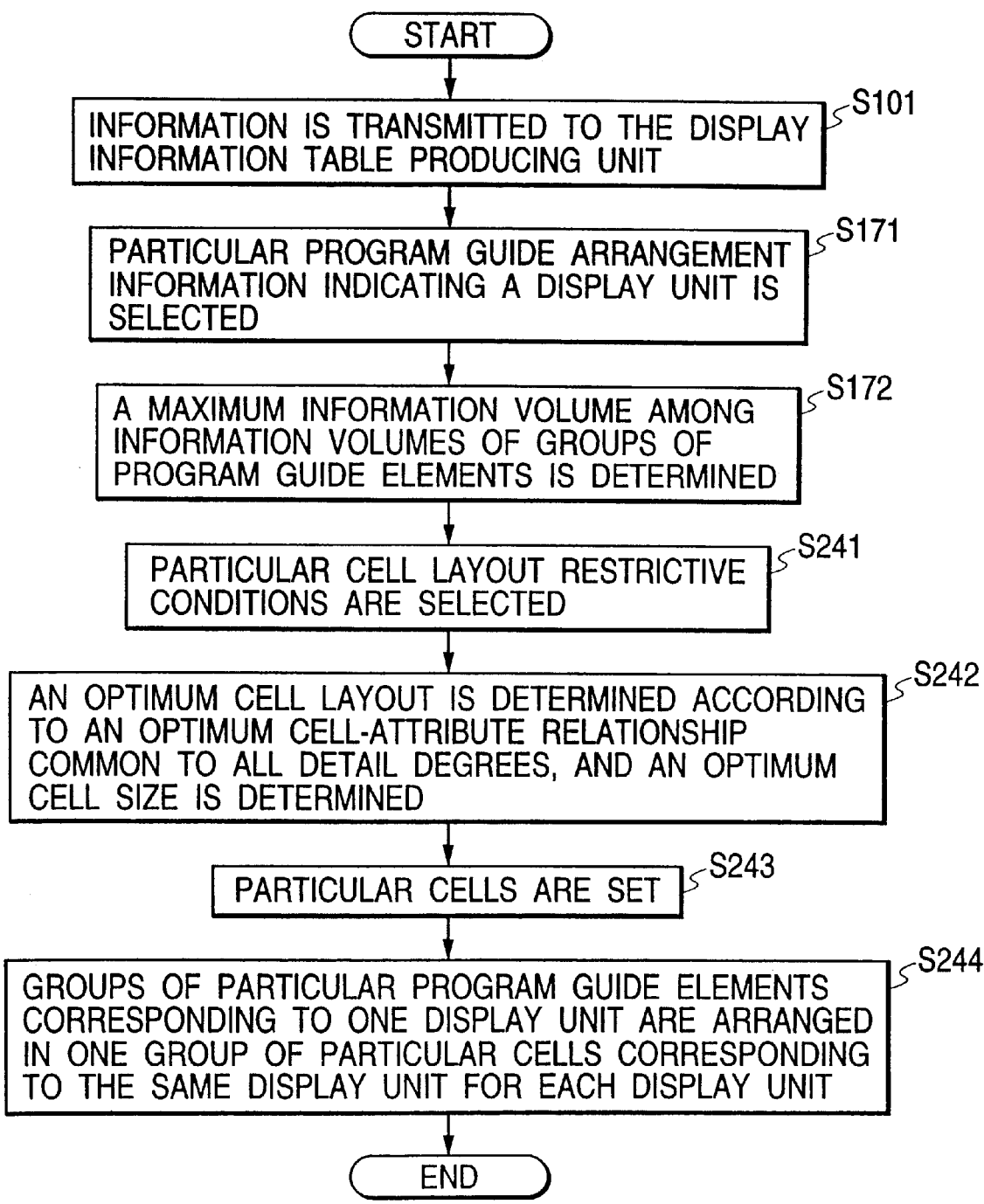
FIG. 60 is a flow chart showing the procedure performed in a display information table producing unit according to the twenty-fourth embodiment.

As shown in FIG. 60, after the steps S101, S171 and S172 are performed in the same manner as in the fifteenth embodiment, one or more particular cell layout restrictive conditions are selected from the cell layout restrictive conditions stored in the cell layout restrictive condition storing unit 122 according to the particular detail degree and the particular program guide arrangement information (step S241). In this case, a cell-attribute relationship maintaining restriction is necessarily selected as one particular cell layout restrictive condition. Also, a restrictive condition such that the number of display units along one display axis is set as large as possible is selected as one particular cell layout restrictive condition to increase the importance of the cell-attribute relationship maintaining restriction. Also, for example, a restrictive condition such that a ratio of a longitudinal side length to a lateral side length in each cell is almost 1 is selected as one particular cell layout restrictive condition to arrange a plurality of particular cells in an image display area in a superior visible condition. Also, because a display unit along the Y-axis is set to one hour, it is required to set the number of blank cells, in which any broadcasting program guide is not arranged, as small as possible, so that a restrictive condition such that the number of blank cells is set as small as possible is selected as one particular cell layout restrictive condition. Also, a restrictive condition such that the number of characters capable to be arranged in each cell is equal to or slightly higher than the number of characters of one group of program guide elements actually arranged in each cell according to the particular detail degree and a restrictive condition such that the number of cells arranged in a broadcasting program guide table is set as large as possible are selected as particular cell layout restrictive conditions.

Thereafter, one or more particular cell-attribute relationships corresponding to the particular program guide arrangement information are selected for each of all detail degrees from the cell-attribute relationships stored in the storing unit 242, an optimum cell-attribute relationship common to all detail degrees is specified from the particular cell-attribute relationships according to a linear planning technique on condition that the particular cell layout restrictive conditions are satisfied, an optimum cell layout of particular cells is determined according to the optimum cell-attribute relationship, and an optimum cell size (a longitudinal side length and a lateral side length) is determined on condition that an information volume of each particular cell is equal to or slightly larger than the maximum information volume (step S242). For example, in cases where the particular program guide arrangement information indicating the program broadcasting start time adopted as an attribute along the Y-axis and the television channel adopted as an attribute along the X-axis is selected, an optimum cell-attribute relationship indicating a cell layout, in which a plurality of cells of two columns are allocated for each display unit, is selected from the particular cell-attribute relationships regardless of any detail degree.

Figures 63, 64:
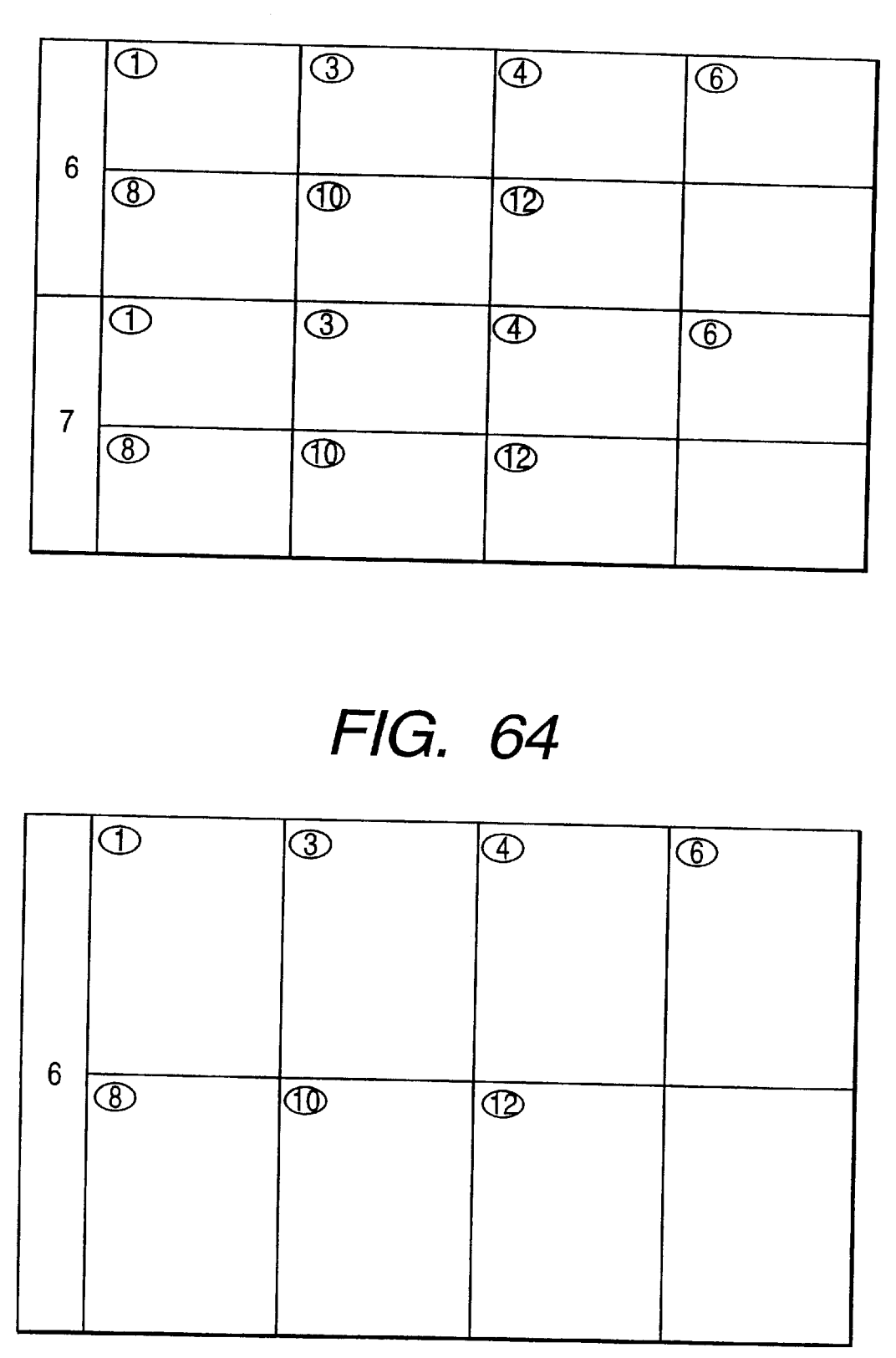

Thereafter, the particular cells are set in a broadcasting program guide table (step S243). For example, in cases where the user input the first detail degree, as shown in FIG. 61, eight particular cells of two columns are allocated for each display unit along the Y-axis according to the optimum cell-attribute relationship, a plurality of particular cells are set along the Y-axis to arrange a plurality of broadcasting program guides corresponding to four display units along the Y-axis. In this case, because the optimum cell-attribute relationship is adopted regardless of any detail degree, a layout of cells shown in FIG. 62, in which seven cells of one column are allocated for each display unit along the Y-axis, is not adopted. Also, in cases where the user input the second detail degree, as shown in FIG. 63, eight particular cells of two columns are allocated for each display unit along the Y-axis according to the optimum cell-attribute relationship, a plurality of particular cells are set along the Y-axis to arrange a plurality of broadcasting program guides corresponding to two display units along the Y-axis. Also, in cases where the user input the second detail degree, as shown in FIG. 64, eight particular cells of two columns are allocated for each display unit along the Y-axis according to the optimum cell-attribute relationship, a plurality of particular cells are set along the Y-axis to arrange a plurality of broadcasting program guides corresponding to one display unit along the Y-axis. Thereafter, a particular group of broadcasting program guides corresponding to one display unit is determined for each display unit, and a plurality of groups of particular program guide elements of one particular group of broadcasting program guides are arranged in one group of particular cells corresponding to one display unit for each display unit (step S244).

Accordingly, because an optimum cell-attribute relationship indicating an optimum cell layout of one display unit is adopted according to the cell-attribute relationship maintaining restriction stored in the storing unit 122, an optimum cell layout of particular cells can be determined while maintaining the optimum cell layout of one display unit regardless of any detail degree, and a plurality of broadcasting program guides are arranged in the particular cells of the optimum layout. Therefore, the user can quickly compare a plurality of broadcasting program guides with each other each time the particular detail degree is changed.

(Twenty-Fifth Embodiment)

In this embodiment, a plurality of groups of program guide elements of a plurality of broadcasting program guides are arranged in each cell (the technical features of the tenth embodiment), and an optimum cell size and optimum layout of particular cells are determined on condition that one or more particular cell layout restrictive conditions are satisfied (the technical features of the twelfth embodiment).

Figure 65:
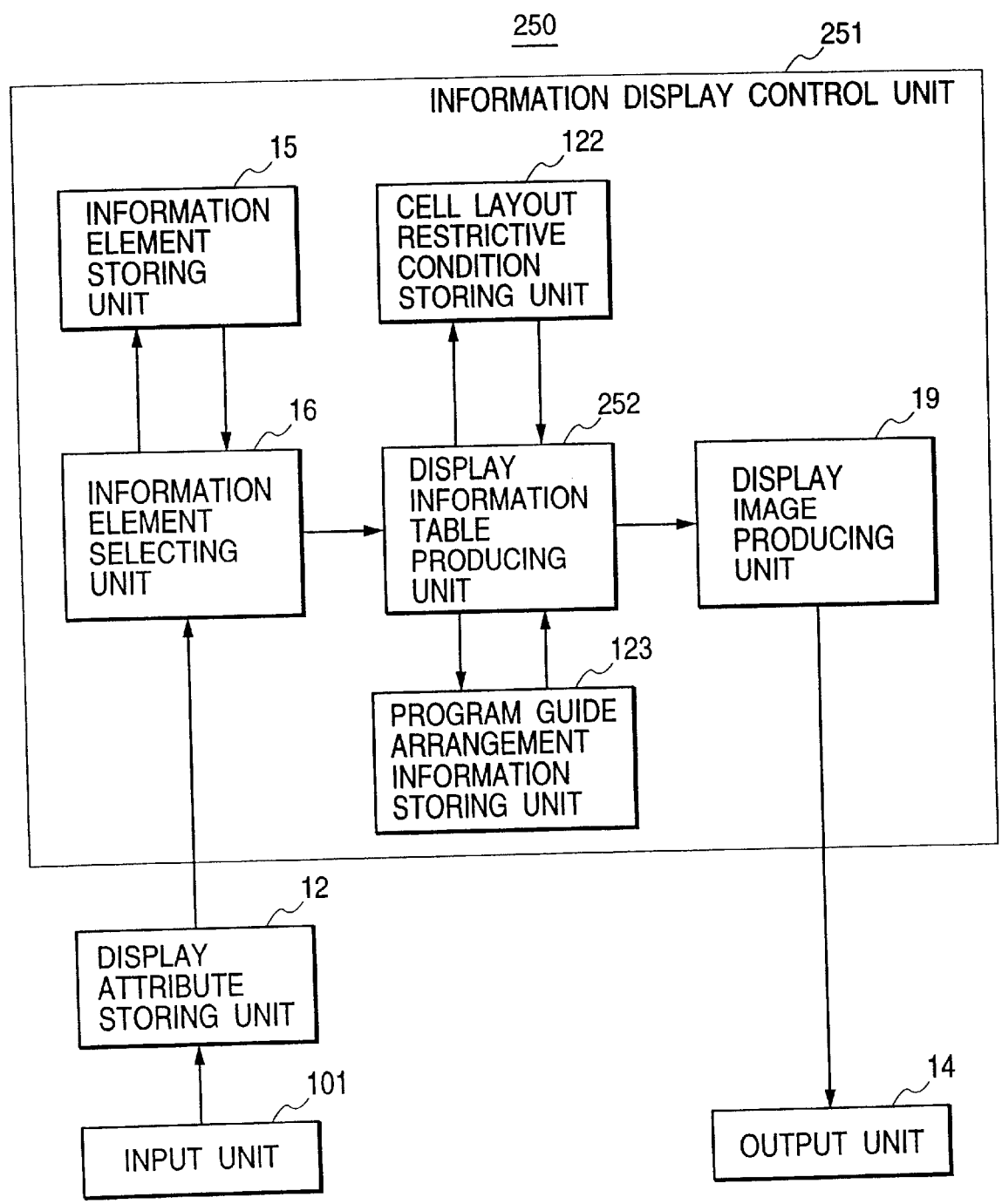
FIG. 65 is a block diagram of an information display apparatus according to a twenty-fifth embodiment of the present invention.

FIG. 65 is a block diagram of an information display apparatus according to a twenty-fifth embodiment of the present invention.

As shown in FIG. 65, an information display apparatus 250 comprises:

the input unit 101 for receiving an information display request, a particular detail degree and cell attribute information, the cell attribute information indicating an attribute condition for arranging a group of broadcasting program guides in the same cell;

the input display attribute storing unit 12;

an information display control unit 251 for controlling a display condition of a broadcasting program guide table according to the display attributes stored in the display attribute storing unit 12 by determining a group of broadcasting program guides to be arranged in each cell according to the cell attribute information, selecting one or more particular cell layout restrictive conditions according to the particular detail degree and the particular program guide arrangement information, determining an optimum cell size and optimum layout of particular cells on condition that the particular cell layout restrictive conditions are satisfied and arranging a plurality of program guide elements of one group of broadcasting program guides specified according to the particular detail degree in each of the particular cells having the optimum cell size; and the output unit 14.

The information display control unit 251 comprises:

the information element storing unit 15; the information element selecting unit 16; the cell layout restrictive condition storing unit 122; the program guide arrangement information storing unit 123;

a display information table producing unit 252 for receiving the groups of particular program guide elements of the broadcasting program guides selected in the selecting unit 16, receiving the particular program guide arrangement information from the program guide arrangement information storing unit 123, classifying the broadcasting program guides into a plurality of groups of broadcasting program guides respectively corresponding to one cell according to the cell attribute information, calculating an information volume of each group of broadcasting program guides planned to be arranged in one cell, determining a maximum information volume of one group of broadcasting program guides among the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of groups of particular broadcasting program guides planned to be arranged in the particular cells, and arranging the groups of particular program guide elements of one group of particular broadcasting program guides in one particular cell for each group of particular broadcasting program guides; and the display image producing unit 19.

In the above configuration, an operation performed in the display information table producing unit 252 is described with reference to FIG. 66.

Figure 66:
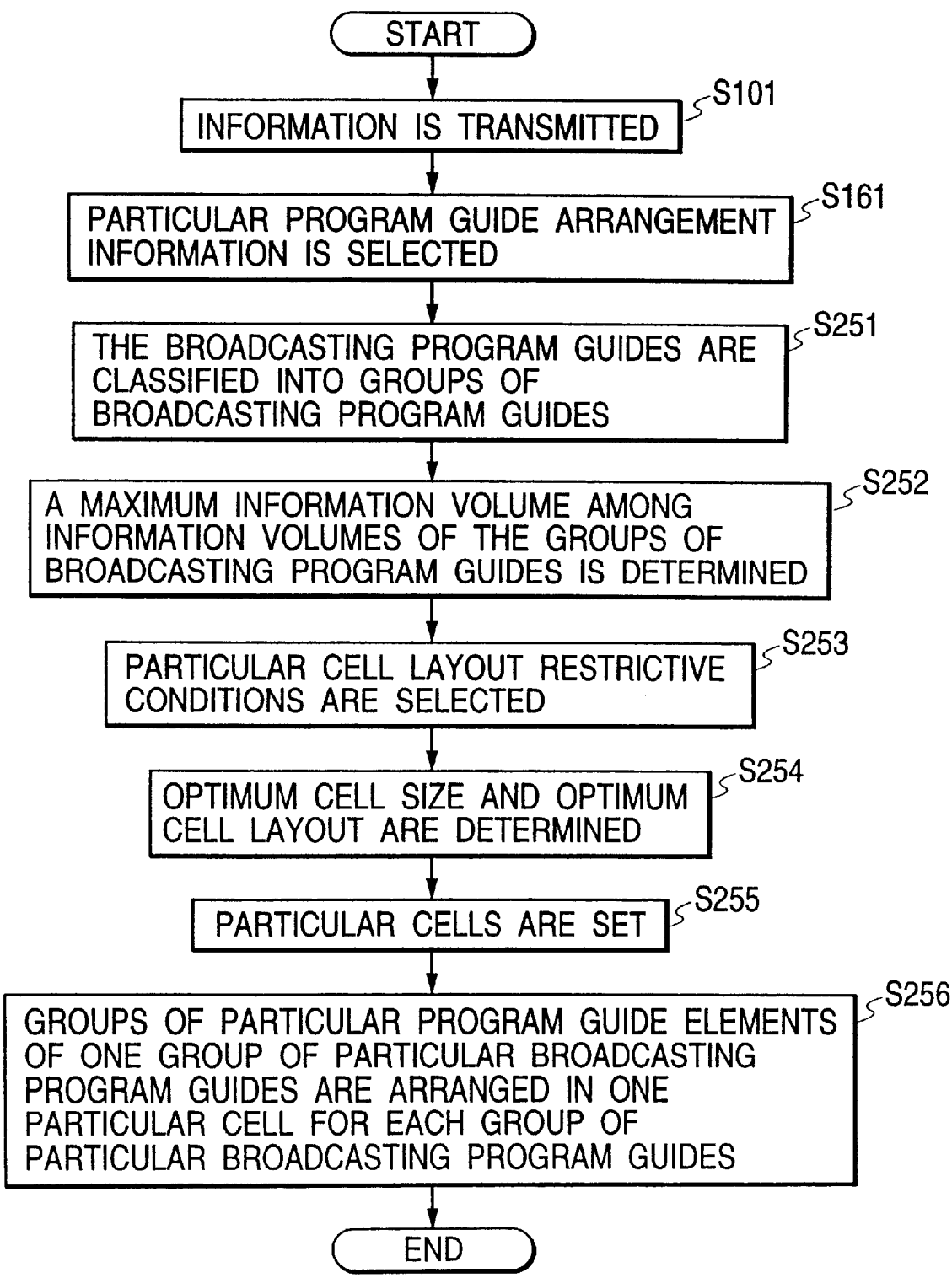
FIG. 66 is a flow chart showing the procedure performed in a display information table producing unit according to the twenty-fifth embodiment.

FIG. 66 is a flow chart showing an operation performed in the display information table producing unit 252.

As shown in FIG. 66, after the steps S101 and S161 are performed in the same manner as in the twelfth embodiment, the broadcasting program guides transmitted from the selecting unit 16 are classified into a plurality of groups of broadcasting program guides according to the cell attribute information (step S251). Each group of broadcasting program guides corresponds to one cell. Thereafter, an information volume of each group of broadcasting program guides planned to be arranged in one cell, and a maximum information volume of one group of broadcasting program guides among the information volumes is determined (step S252). Thereafter, one or more particular cell layout restrictive conditions are selected from the cell layout restrictive conditions stored in the cell layout restrictive condition storing unit 122 according to the particular detail degree and the particular program guide arrangement information (step S253). Thereafter, an optimum cell size and optimum cell layout of particular cells are determined on condition that the particular cell layout restrictive conditions are satisfied and an information volume of each particular cell is equal to or slightly larger than the maximum information volume (step S254), and the particular cells are set in a broadcasting program guide table (step S255). Thereafter, a plurality of groups of particular broadcasting program guides planned to be arranged in the particular cells are determined from the groups of broadcasting program guides, and the groups of particular program guide elements of one group of particular broadcasting program guides are arranged in one particular cell for each group of particular broadcasting program guides (step S256).

Accordingly, because a group of broadcasting program guides is arranged in each cell, many broadcasting program guides can be easily compared with each other at a look. Also, an optimum cell size and optimum layout of particular cells can be determined.

(Twenty-Sixth Embodiment)

In this embodiment, each program guide element of each broadcasting program guide is indicated by an icon to arrange a plurality of icons as a broadcasting program guide table (the technical features of the eleventh embodiment), and an optimum cell size and optimum layout of particular cells are determined on condition that one or more particular cell layout restrictive conditions are satisfied (the technical features of the twelfth embodiment).

Figure 67:
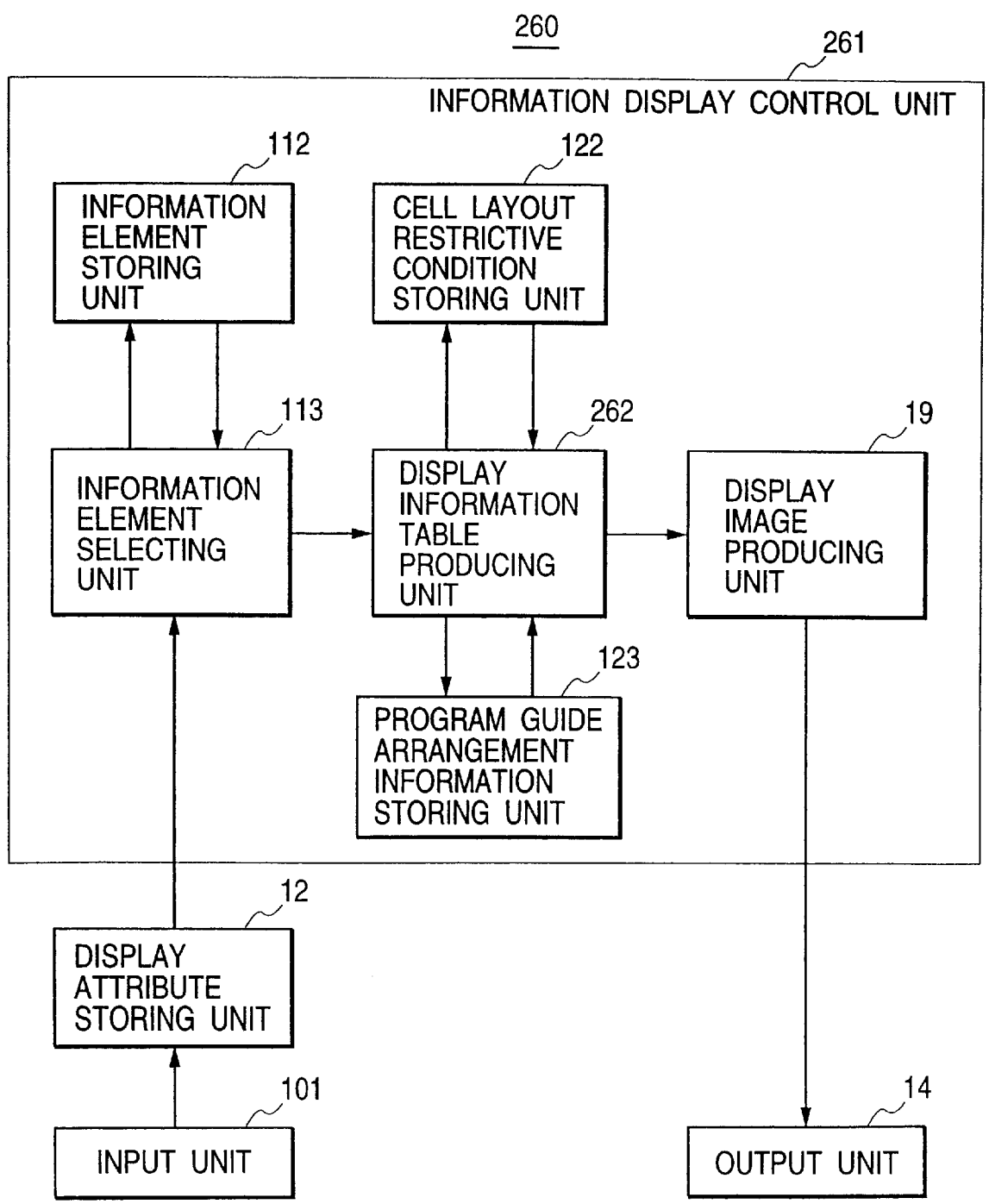
FIG. 67 is a block diagram of an information display apparatus according to a twenty-sixth embodiment of the present invention.

FIG. 67 is a block diagram of an information display apparatus according to a twenty-sixth embodiment of the present invention.

As shown in FIG. 67, an information display apparatus 260 comprises:

the input unit 101 for receiving an information display request, a particular detail degree indicating a lowest detail degree and cell attribute information;

the input display attribute storing unit 12;

an information display control unit 261 for controlling a display condition of a broadcasting program guide table according to the display attributes stored in the display attribute storing unit 12 to arrange one or more icons of a group of broadcasting program guides corresponding to the same time zone of one hour in one television channel in each of particular cells of an optimum cell size and optimum layout on condition that particular cell layout restrictive conditions selected according to the particular detail degree and the particular program guide arrangement information are satisfied; and the output unit 14.

The information display control unit 261 comprises:

the information element storing unit 112; the information element selecting unit 113; the cell layout restrictive condition storing unit 122; the program guide arrangement information storing unit 123;

a display information table producing unit 262 for receiving the particular icons of the broadcasting program guides selected in the selecting unit 16, receiving the particular program guide arrangement information from the program guide arrangement information storing unit 123, classifying the broadcasting program guides into a plurality of groups of broadcasting program guides respectively corresponding to one cell according to the cell attribute information, calculating an information volume of each group of broadcasting program guides planned to be arranged in one cell, determining a maximum information volume of one group of broadcasting program guides among the information volumes, selecting one or more particular cell layout restrictive conditions from the cell layout restrictive conditions stored in the cell layout restrictive condition storing unit 122 according to the particular detail degree and the particular program guide arrangement information, determining an optimum cell size and optimum layout of particular cells on condition that the particular cell layout restrictive conditions are satisfied and an information volume of each particular cell is equal to or slightly larger than the maximum information volume, setting the particular cells in a broadcasting program guide table, determining a plurality of groups of particular broadcasting program guides planned to be arranged in the particular cells, and arranging one group of particular icons of one group of particular broadcasting program guides in one particular cell for each group of particular broadcasting program guides; and the display image producing unit 19.

In the above configuration, an operation performed in the display information table producing unit 262 is described with reference to FIG. 68.

Figure 68:
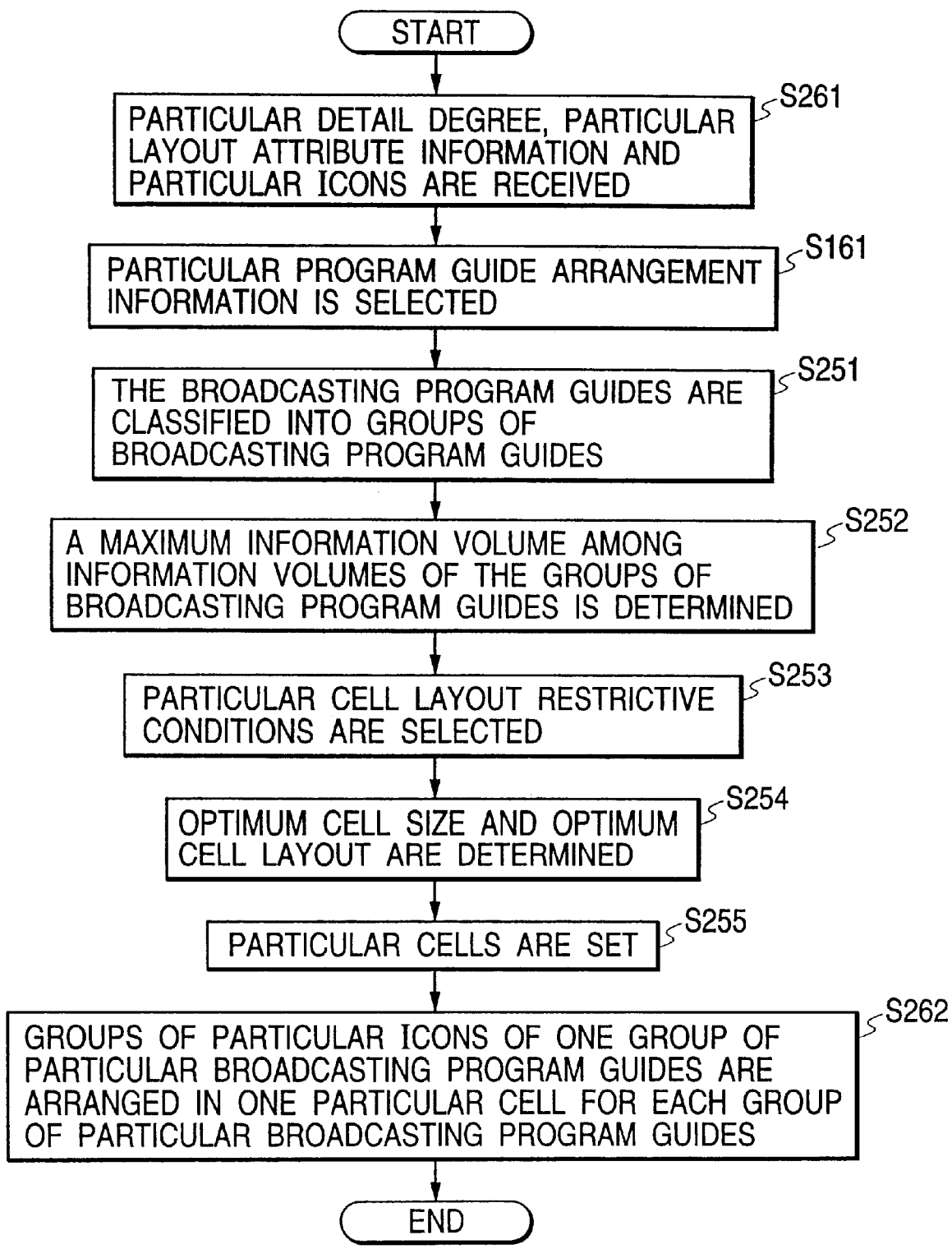
FIG. 68 is a flow chart showing the procedure performed in a display information table producing unit according to the twenty-sixth embodiment.

FIG. 68 is a flow chart showing an operation performed in the display information table producing unit 262.

As shown in FIG. 68, the particular detail degree and the particular icons of the broadcasting program guides transmitted from the selecting unit 113 are received in the table producing unit 262 (step S261). Thereafter, the steps S161 and S251 to S255 are performed in the same manner as in the twenty-fifth embodiment. Thereafter, a plurality of groups of particular broadcasting program guides planned to be arranged in the particular cells are determined from the groups of broadcasting program guides, and the groups of particular icons of one group of particular broadcasting program guides are arranged in one particular cell for each group of particular broadcasting program guides (step S262).

Accordingly, because an icon corresponding to each program guide element such as a genre code is arranged in a broadcasting program guide table, the user can visually recognize a plurality of broadcasting program guides at a look. Also, an optimum cell size and optimum layout of particular cells can be determined.

Finally, a computer system for the information display system according to each of the above embodiments is described.

Figure 69:
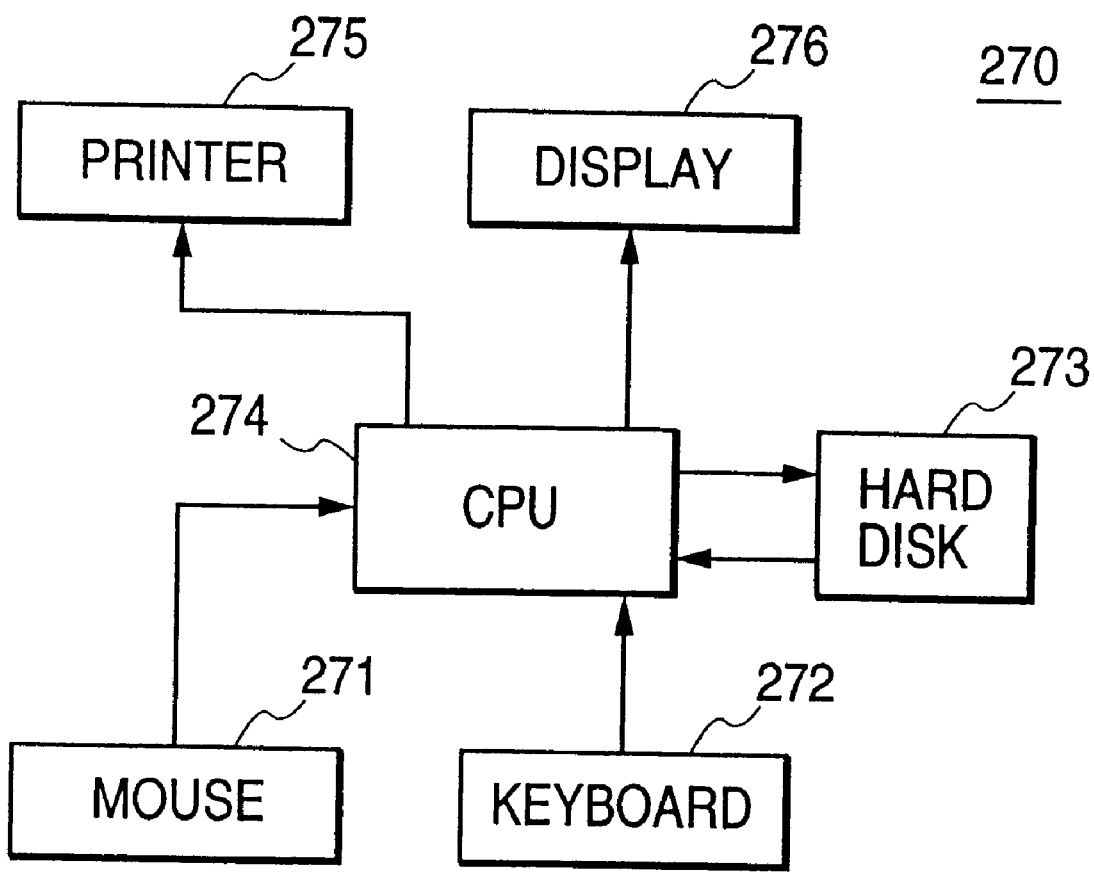
FIG. 69 is a block diagram of a computer system for each of the information display systems.

FIG. 69 is a block diagram of a computer system for each of the information display systems 10, 20, 30, 40, 50, 60, 70, 80, 90, 100, 110, 120, 130, 140, 150, 160, 170, 180, 190, 200, 210, 220, 230, 240, 250 and 260.

As shown in FIG. 69, a computer system 270 comprises:

a mouse 271 functioning as the input units 11, 25, 31, 81, 91, 101 and 211;

a keyboard 272 functioning as the input units 11, 25, 31, 81, 91, 101 and 211;

a hard disk 273 functioning as the storing units, 12, 15, 17, 23, 52, 72, 112, 122, 123, 133, 153, 214 and 242;

a central processing unit (CPU) 274 functioning as the selecting units 16, 42, 84, 93, 113 and 213 and functioning as the producing units 18, 19, 24, 33, 43, 53, 62, 73, 94, 95, 103, 114, 124, 132, 142, 154, 162, 172, 182, 192, 202, 215, 232 and 232;

a printer 275 functioning as the output unit 14; and a display 276 functioning as the output unit 14 and functioning as the displaying units 21 and 82.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

cell layout storing means for storing a group of cells fitting for a cell layout in an image display area for each cell layout, a size of the cell for one cell layout differing from that for another cell layout;

information arrangement storing means for storing a particular information arrangement indicating a particular attribute of each display axis to arrange pieces of information along each display axis on the basis of the particular attribute;

layout correspondence table holding means for holding a layout correspondence table in which the correspondence of one cell layout to one combination of one detail degree and one information arrangement stored in the information arrangement storing means is listed for each combination;

receiving means for receiving a particular detail degree indicating a detail degree of each piece of information to be displayed in each cell;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for receiving the particular information arrangement from the information arrangement storing means, specifying a particular cell layout corresponding to a particular combination of the particular detail degree received by the receiving means and the particular information arrangement by referring the layout correspondence table held in the layout correspondence table holding means, detecting a group of particular cells fitting for the particular cell layout from the cell layout storing means, setting the group of particular cells in the image display area at the particular cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

2. An information display apparatus according to claim 1 in which each piece of information stored in the information element storing means is a broadcasting program guide, and the information elements of each piece of information stored in the information element storing means are a plurality of program guide elements such as date information, day-of-week information, information of a program broadcasting time, information of a television channel, information of a broadcasting program title, information of a broadcasting program sub-title, information of the cast of the broadcasting program, auxiliary information of the broadcasting program, information of a G code of the broadcasting program, information of a genre code of the broadcasting program, information of a program commentary and information of a representative picture of the broadcasting program.

3. An information display apparatus according to claim 2 in which the particular information arrangement stored in the information arrangement storing means indicates a television channel of an X-axis and a program broadcasting start time of a Y-axis to arrange a plurality of broadcasting program guides along the X-axis for each television channel and to arrange the broadcasting program guides along the Y-axis in the order of the program broadcasting start time.

4. An information display apparatus according to claim 1 in which a specific information arrangement indicating a specific attribute along each display axis is received by the receiving means, and the specific information arrangement is used by the display information table producing means in place of the particular information arrangement to specify the particular cell layout.

5. An information display apparatus according to claim 1 in which a blank space of one particular cell, in which any particular information element of one piece of information is not arranged, is detected by the display information table producing means, a specific information element of the piece of information different from the group of particular information elements of the piece of information is selected by the information element selecting means from the information elements of the piece of information stored in the information element storing means, and the specific information element is arranged in the particular cell by the display information table producing means to fill the blank space of the particular cell with the specific information element.

6. An information display apparatus according to claim 1, further comprising:

simplified image information element storing means for storing a simplified image information element corresponding to a specific information element stored in the information element storing means, the specific information element included in one group of information elements of one piece of information being replaced with the simplified image information element by the display information table producing means to produce a specific group of information elements of the piece of information, and the specific group of information elements of the piece of information being arranged in one particular cell in place of the group of information elements of the piece of information by the display information table producing means.

7. An information display apparatus according to claim 6 in which the simplified image information element indicates an icon or a background color to color the particular cell with the background color.

8. An information display apparatus according to claim 1 in which one group of particular information elements of one piece of information, of which an information volume is too large to arrange the group of particular information elements in one particular cell, is detected by the display information table producing means, an important word indicating the gist of the piece of information is extracted from the group of particular information elements by the display information table producing means, and the important word is arranged in the particular cell in place of the group of particular information elements by the display information table producing means.

9. An information display apparatus according to claim 1 in which one group of particular information elements of one piece of information, of which an information volume is too large to arrange the group of particular information elements in one particular cell, is detected by the display information table producing means, a character size for the group of particular information elements of the piece of information is made small by the display information table producing means, and the group of particular information elements of the piece of information is arranged in the particular cell by the display information table producing means.

10. An information display apparatus according to claim 1, further comprising:

detail correspondence table displaying means for displaying the detail correspondence table held in the detail correspondence table holding means to make a user select the particular detail degree from the detail degrees listed in the detail correspondence table, the particular detail degree being input to the receiving means by the user.

11. An information display apparatus according to claim 1 in which a specific information element group indicating one or more specific information elements is received by the receiving means in place of the particular detail degree, one group of specific information elements indicated by the specific information element group is selected by the information element selecting means from the information elements of one piece of information stored in the information element storing means for each piece of information, and the group of specific information elements of one piece of information is arranged by the display information table producing means for each piece of information.

12. An information display apparatus according to claim 11 in which a specific cell layout is received by the receiving means, a group of specific cells fitting for the specific cell layout are detected from the cell layout storing means, the group of specific cells is set in the image display area at the specific cell layout by the display information table producing means, and the group of specific information elements of one piece of information is arranged in one specific cell by the display information table producing means for each piece of information.

13. An information display apparatus according to claim 1 in which cell attribute information indicating an attribute condition for arranging a group of information in the same cell is received by the receiving means, the pieces of information corresponding to the groups of particular information elements selected by the information element selecting means are classified into a plurality of groups of information according to the cell attribute information by the display information table producing means, and a plurality of groups of particular information elements of one group of information are arranged in one particular cell for each group of information by the display information table producing means.

14. An information display apparatus according to claim 13 in which each piece of information stored in the information element storing means is a broadcasting program guide, the information elements of each piece of information stored in the information element storing means are a plurality of program guide elements such as a program broadcasting time, the attribute condition indicated by the cell attribute information is to arrange a plurality of broadcasting program guides corresponding to a plurality of broadcasting programs planned to be broadcasted within a time zone in the same particular cell, and a plurality of groups of particular program guide elements of one group of broadcasting program guides are arranged in one particular cell for each time zone by the display information table producing means.

15. An information display apparatus according to claim 1 in which the information elements of the pieces of information stored in the information element storing means are indicated by a plurality of icons, and one group of particular icons of one piece of information selected by the information element selecting means is arranged in one particular cell for each piece of information by the display information table producing means.

16. An information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

cell layout storing means for storing a group of cells fitting for a cell layout in an image display area for each cell layout, a size of the cell for one cell layout differing from that for another cell layout;

information arrangement storing means for storing a plurality of information arrangements respectively indicating an attribute of each display axis to arrange pieces of information along each display axis on the basis of the attribute;

layout correspondence table holding means for holding a layout correspondence table in which the correspondence of one cell layout to one combination of one detail degree and one information arrangement stored in the information arrangement storing means is listed for each combination;

information arrangement displaying means for displaying the information arrangements stored in the information arrangement storing means;

receiving means for receiving a particular detail degree and selecting a particular information arrangement from the information arrangements displayed by the information arrangement displaying means, the particular information arrangement indicating a particular attribute of each display axis to arrange pieces of information along each display axis on the basis of the particular attribute;

information element selecting means for specifying a group of particular information elements corresponding to the particular detail degree received by the receiving means by referring the detail correspondence table held in the detail correspondence table holding means and selecting one group of particular information elements of one piece of information for each piece of information from the information elements of the pieces of information stored in the information element storing means;

display information table producing means for specifying a particular cell layout corresponding to a particular combination of the particular detail degree received by the receiving means and the particular information arrangement selected by the receiving means by referring the layout correspondence table held in the layout correspondence table holding means, detecting a group of particular cells fitting for the particular cell layout from the cell layout storing means, setting the group of particular cells in the image display area at the particular cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

17. An information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

information arrangement storing means for storing a particular information arrangement indicating a particular attribute of each display axis to arrange pieces of information along each display axis on the basis of the particular attribute;

cell layout restrictive condition storing means for storing a plurality of cell layout restrictive conditions respectively denoting a restrictive condition for cells arranged in a cell layout;

receiving means for receiving a particular detail degree indicating a detail degree of each piece of information to be displayed in each cell;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for receiving the particular information arrangement from the information arrangement storing means, selecting one or more particular cell layout restrictive conditions from the cell layout restrictive conditions stored in the cell layout restrictive condition storing means according to the particular detail degree and the particular information arrangement, determining an optimum cell size and optimum layout of particular cells according to the groups of particular information elements of the pieces of information selected by the information element selecting means on condition that the particular cell layout restrictive conditions are satisfied, setting the particular cells in an image display area at the optimum cell size and optimum cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

18. An information display apparatus according to claim 17 in which a maximum information volume among information volumes of the groups of particular program guide elements is detected by the display information table producing means, and the optimum cell size and optimum layout of the particular cells are determined on condition that an information volume of each particular cell is equal to or slightly larger than the maximum information volume.

19. An information display apparatus according to claim 17 in which each cell layout restrictive condition stored in the cell layout restrictive condition storing means indicates a ratio of a longitudinal side length to a lateral side length in each cell, a restrictive condition such that the number of characters capable to be arranged in each cell is equal to or slightly higher than the number of characters of one group of information elements actually arranged in each cell according to the particular detail degree or a restrictive condition such that the number of cells arranged in a broadcasting program guide table is set as large as possible.

20. An information display apparatus according to claim 17 in which each piece of information stored in the information element storing means is a broadcasting program guide, and the information elements of each piece of information stored in the information element storing means are a plurality of program guide elements such as date information, day-of-week information, information of a program broadcasting time, information of a television channel, information of a broadcasting program title, information of a broadcasting program sub-title, information of the cast of the broadcasting program, auxiliary information of the broadcasting program, information of a G code of the broadcasting program, information of a genre code of the broadcasting program, information of a program commentary and information of a representative picture of the broadcasting program.

21. An information display apparatus according to claim 20 in which the particular information arrangement stored in the information arrangement storing means indicates a television channel of an X-axis and a program broadcasting start time of a Y-axis to arrange a plurality of broadcasting program guides along the X-axis for each television channel and to arrange the broadcasting program guides along the Y-axis in the order of the program broadcasting start time.

22. An information display apparatus according to claim 17 in which a specific information arrangement indicating a specific attribute along each display axis is received by the receiving means, and the specific information arrangement is used by the display information table producing means in place of the particular information arrangement to specify the particular cell layout.

23. An information display apparatus according to claim 17 in which the particular information arrangement selected by the receiving means indicates a display unit of one particular attribute of one display axis, and one or more groups of particular information elements of one or more pieces of information corresponding to one display unit of the particular attribute are arranged in one or more particular cells for each display unit along the display unit by the display information table producing means.

24. An information display apparatus according to claim 23, further comprising:

cell-attribute relationship storing means for storing a cell-attribute relationship between a cell layout of one display unit and one information arrangement for each detail degree, one or more particular cell-attribute relationships corresponding to the particular information arrangement are selected by the display information table producing means for each of all detail degrees from the cell-attribute relationships stored in the cell-attribute relationship storing means, an optimum cell-attribute relationship common to all detail degrees is specified from the particular cell-attribute relationships by the display information table producing means, and an optimum layout of particular cells is determined according to the optimum cell-attribute relationship by the display information table producing means.

25. An information display apparatus according to claim 17 in which a maximum information volume among information volumes of the groups of particular program guide elements is detected by the display information table producing means, and the optimum cell size and optimum layout of the particular cells are determined on condition that an information volume of each particular cell is set to a prescribed value lower than the maximum information volume.

26. An information display apparatus according to claim 17 in which a blank space of one particular cell, in which any particular information element of one piece of information is not arranged, is detected by the display information table producing means, a specific information element of the piece of information different from the group of particular information elements of the piece of information is selected by the information element selecting means from the information elements of the piece of information stored in the information element storing means, and the specific information element is arranged in the particular cell by the display information table producing means to fill the blank space of the particular cell with the specific information element.

27. An information display apparatus according to claim 17, further comprising:
    simplified image information element storing means for storing a simplified image information element corresponding to a specific information element stored in the information element storing means, the specific information element included in one group of information elements of one piece of information being replaced with the simplified image information element by the display information table producing means to produce a specific group of information elements of the piece of information, and the specific group of information elements of the piece of information being arranged in one particular cell in place of the group of information elements of the piece of information by the display information table producing means.

28. An information display apparatus according to claim 27 in which the simplified image information element indicates an icon or a background color to color the particular cell with the background color.

29. An information display apparatus according to claim 17 in which one group of particular information elements of one piece of information, of which an information volume is too large to arrange the group of particular information elements in one particular cell, is detected by the display information table producing means, an important word indicating the gist of the piece of information is extracted from the group of particular information elements by the display information table producing means, and the important word is arranged in the particular cell in place of the group of particular information elements by the display information table producing means.

30. An information display apparatus according to claim 17 in which one group of particular information elements of one piece of information, of which an information volume is too large to arrange the group of particular information elements in one particular cell, is detected by the display information table producing means, a character size for the group of particular information elements of the piece of information is made small by the display information table producing means, and the group of particular information elements of the piece of information is arranged in the particular cell by the display information table producing means.

31. An information display apparatus according to claim 17 in which interest information indicating a specific type of attribute is received in the receiving means, one or more pieces of specific information relating to the specific type of attribute indicated by the interest information are specified by the information element selecting means, a group of specific information elements of one piece of specific information is selected by the information element selecting means from the information elements of the piece of specific information stored in the information element storing means for each piece of specific information on condition that an information volume of one group of specific information elements of each piece of specific information is larger than that of the group of particular information elements of the piece of specific information corresponding to the particular detail degree in the detail correspondence table, a specific size of a cell is calculated by the display information table producing means on condition that an information volume of the cell is equal to or slightly larger than a volume of each group of specific information elements, the optimum cell size of one particular cell, in which one group of specific information elements of one piece of specific information is planned to be arranged, is changed to the specific size by the display information table producing means, and the groups of specific information elements are arranged in the particular cells of the specific sizes by the display information table producing means.

32. An information display apparatus according to claim 17, further comprising:
    detail correspondence table displaying means for displaying the detail correspondence table held in the detail correspondence table holding means to make a user select the particular detail degree from the detail degrees listed in the detail correspondence table, the particular detail degree being input to the receiving means by the user.

33. An information display apparatus according to claim 17 in which a specific information element group indicating one or more specific information elements is received by the receiving means in place of the particular detail degree, one group of specific information elements indicated by the specific information element group is selected by the information element selecting means from the information elements of one piece of information stored in the information element storing means for each piece of information, and the group of specific information elements of one piece of information is arranged by the display information table producing means for each piece of information.

34. An information display apparatus according to claim 33 in which a specific cell layout is received by the receiving means, a group of specific cells fitting for the specific cell layout are detected from the cell layout storing means, the group of specific cells is set in the image display area at the specific cell layout by the display information table producing means, and the group of specific information elements of one piece of information is arranged in one specific cell by the display information table producing means for each piece of information.

35. An information display apparatus according to claim 17 in which cell attribute information indicating an attribute condition for arranging a group of information in the same cell is received by the receiving means, the pieces of information corresponding to the groups of particular information elements selected by the information element selecting means are classified into a plurality of groups of information according to the cell attribute information by the display information table producing means, and a plurality of groups of particular information elements of one group of information are arranged in one particular cell for each group of information by the display information table producing means.

36. An information display apparatus according to claim 35 in which each piece of information stored in the information element storing means is a broadcasting program guide, the information elements of each piece of information stored in the information element storing means are a plurality of program guide elements such as a program broadcasting time, the attribute condition indicated by the cell attribute information is to arrange a plurality of broadcasting program guides corresponding to a plurality of broadcasting programs planned to be broadcasted within a time zone in the same particular cell, and a plurality of groups of particular program guide elements of one group of broadcasting program guides are arranged in one particular cell for each time zone by the display information table producing means.

37. An information display apparatus according to claim 17 in which the information elements of the pieces of information stored in the information element storing means are indicated by a plurality of icons, and one group of particular icons of one piece of information selected by the information element selecting means is arranged in one particular cell for each piece of information by the display information table producing means.

38. An information display apparatus for displaying information arranged in each of a plurality of cells which are set along each display axis, comprising:

information element storing means for storing a plurality of information elements of a piece of information for each piece of information, each information element of the information indicating an attribute of the information;

detail correspondence table holding means for holding a detail correspondence table in which the correspondence of a group of information elements to a detail degree is listed for each of detail degrees, an information volume of one group of information elements corresponding to one detail degree being increased as the detail degree is heightened;

information arrangement storing means for storing a plurality of information arrangements respectively indicating an attribute of each display axis to arrange pieces of information along each display axis on the basis of the attribute;

cell layout restrictive condition storing means for storing a plurality of cell layout restrictive conditions respectively denoting a restrictive condition for cells arranged in a cell layout;

information arrangement displaying means for displaying the information arrangements stored in the information arrangement storing means;

receiving means for receiving a particular detail degree and selecting a particular information arrangement from the information arrangements displayed by the information arrangement displaying means, the particular information arrangement indicating a particular attribute of each display axis to arrange pieces of information along each display axis on the basis of the particular attribute;

information element selecting means for specifying a group of particular information elements corresponding to the particular detail degree received by the receiving means by referring the detail correspondence table held in the detail correspondence table holding means and selecting one group of particular information elements of one piece of information from the information elements of the piece of information stored in the information element storing means for each piece of information;

display information table producing means for selecting one or more particular cell layout restrictive conditions from the cell layout restrictive conditions stored in the cell layout restrictive condition storing means according to the particular detail degree and the particular information arrangement received by the receiving means, determining an optimum cell size and optimum layout of particular cells according to the groups of particular information elements of the pieces of information selected by the information element selecting means on condition that the particular cell layout restrictive conditions are satisfied, setting the particular cells in an image display area at the optimum cell size and optimum cell layout, and arranging one group of particular information elements of one piece of information selected by the information element selecting means in one particular cell for each piece of information to produce a display information table; and information displaying means for displaying an image of the display information table produced by the display information table producing means, in which one group of particular information elements of one piece of information is arranged in each particular cell.

* * * * *